US012783983B1

(12) United States Patent
Powers et al.

(10) Patent No.: US 12,783,983 B1
(45) Date of Patent: Nov. 3, 2026

(54) AGENTIC GUIDED WORKFLOW ANALYTICS WITH DYNAMIC ENTROPY-DRIVEN CROSS-DOMAIN NAVIGATION

(71) Applicant: Dimensional Insight Incorporated, Burlington, MA (US)

(72) Inventors: Frederick A Powers, Sudbury, MA (US); James Clark, Andover, MA (US)

(73) Assignee: Dimensional Insight Incorporated, Burlington, MA (US)

( * ) Notice: Subject to any disclaimer, the term of this patent is extended or adjusted under 35 U.S.C. 154(b) by 0 days.

(21) Appl. No.: 19/434,844

(22) Filed: Dec. 29, 2025

(51) Int. Cl.
*G06Q 10/0633* (2023.01)
*G06F 16/954* (2019.01)

(52) U.S. Cl.
CPC ................................ *G06Q 10/0633* (2013.01)

(58) Field of Classification Search
CPC ........... G06Q 10/06316; G06Q 10/067; G06Q 10/0633; G06F 16/957; G06F 16/958; G06F 16/9574; G06F 16/954
See application file for complete search history.

(56) References Cited

U.S. PATENT DOCUMENTS 6,009,429 A * 12/1999 Greer .................... G06F 16/954
6,085,226 A * 7/2000 Horvitz ............... G06F 16/9574 707/E17.12
6,182,133 B1 * 1/2001 Horvitz ............... G06F 16/9574 709/203
6,366,947 B1 * 4/2002 Kavner ............... H04L 67/5681 709/217
6,415,368 B1 * 7/2002 Glance ................ G06F 16/9574 711/158
6,572,662 B2 * 6/2003 Manohar .............. G06F 16/954 709/227
7,096,417 B1 * 8/2006 Bennett ................. G06F 16/957 707/E17.119
7,613,792 B2 * 11/2009 Zervas ............... H04N 21/4331 709/219

(Continued)

*Primary Examiner* — Scott L Jarrett
(74) *Attorney, Agent, or Firm* — NextWave IP Legal Services, LLC

(57) ABSTRACT

Improving computational efficiency in adaptive guided-page navigation includes use of a navigation map data structure embodied as a graph or adjacency matrix for low-latency traversal. User interactions and contextual signals are monitored by agentic artificial-intelligence modules to generate feature vectors used for navigation-map updates. Information-entropy gain values are computed by a reinforcement-learning engine for potential navigation transitions, while selective, local updates to edge weights or paths are performed by modification logic based on these values. Prerendering and/or caching guided-navigation sequences for presentation to a user interface is performed by a page-generation engine using predictions derived from the updated navigation map. Through iterative monitoring, entropy evaluation, map updating, and predictive rendering, navigation-update latency is substantially reduced with and guided-analytics responsiveness being enhanced. Real-time adaptive navigation within an analytical environment is provided by a corresponding set of code executed by one or more processors.

21 Claims, 34 Drawing Sheets

AUTONOMOUS NAVIGATION MAP EVOLUTION 1100

(56) References Cited

U.S. PATENT DOCUMENTS

| | | | | |
|---|---|---|---|---|
| 7,693,822 | B2 * | 4/2010 | Brunner | G06F 16/954 707/999.002 |
| 7,743,344 | B2 * | 6/2010 | Zervas | G06F 16/9574 715/831 |
| 7,831,921 | B2 * | 11/2010 | Wulfe | G06F 9/451 715/764 |
| 7,861,149 | B2 * | 12/2010 | Wang | G06F 16/3323 715/201 |
| 7,861,155 | B2 * | 12/2010 | Yaung | G06F 16/9574 715/255 |
| 8,111,257 | B2 * | 2/2012 | Axelrod | G06T 11/26 345/473 |
| 8,744,988 | B1 * | 6/2014 | Hamon | G06F 16/951 706/45 |
| 9,229,607 | B2 * | 1/2016 | Powers | G06Q 10/06316 |
| 9,274,668 | B2 * | 3/2016 | Powers | G06Q 10/06316 |
| 9,420,052 | B2 * | 8/2016 | Guo | H04L 67/535 |
| 10,671,955 | B2 * | 6/2020 | Powers | G06Q 10/0633 |
| 10,755,233 | B2 * | 8/2020 | Powers | G06F 3/04842 |
| 10,832,198 | B2 * | 11/2020 | Powers | G06Q 10/06316 |
| 11,309,076 | B2 * | 4/2022 | Vegas Santiago | G16H 10/60 |
| 11,429,914 | B2 * | 8/2022 | Powers | G06F 16/26 |
| 11,449,835 | B2 * | 9/2022 | Powers | G06F 3/04847 |
| 11,755,972 | B2 * | 9/2023 | Powers | G06F 16/26 715/708 |
| 11,922,349 | B2 * | 3/2024 | Powers | G06F 16/26 |
| 12,039,477 | B1 * | 7/2024 | Powers | G06F 16/26 |
| 12,229,699 | B2 * | 2/2025 | Powers | G06F 16/26 |
| 12,399,947 | B2 * | 8/2025 | Mangano | G06F 16/954 |
| 12,625,916 | B2 * | 5/2026 | Naruka | G06F 16/9538 |
| 12,632,271 | B1 * | 5/2026 | Selvam | G06F 8/38 |
| 12,651,030 | B2 * | 6/2026 | Marmor | G06F 16/9574 |
| 2002/0124021 | A1 * | 9/2002 | Yaung | G06F 16/9574 715/234 |
| 2002/0165925 | A1 * | 11/2002 | Hamilton, II | G06F 16/9574 709/224 |
| 2003/0172134 | A1 * | 9/2003 | Zervas | H04N 21/41407 348/E7.071 |
| 2004/0201619 | A1 * | 10/2004 | Zervas | G06F 16/9574 715/746 |
| 2005/0120021 | A1 * | 6/2005 | Tang | G06Q 30/02 |
| 2006/0218304 | A1 * | 9/2006 | Mukherjee | G06F 16/9574 707/E17.12 |
| 2006/0259453 | A1 * | 11/2006 | Gibbons | G06Q 10/10 |
| 2007/0219945 | A1 * | 9/2007 | Wang | G06F 16/3323 715/764 |
| 2008/0027932 | A1 * | 1/2008 | Brunner | G06F 16/954 |
| 2014/0053070 | A1 * | 2/2014 | Powers | G06Q 10/06316 715/708 |
| 2014/0068431 | A1 * | 3/2014 | Powers | G06Q 10/06316 715/708 |
| 2014/0122655 | A1 * | 5/2014 | Guo | G06F 16/954 709/219 |
| 2014/0289648 | A1 * | 9/2014 | Rowe | A63F 13/577 715/757 |
| 2016/0086120 | A1 * | 3/2016 | Powers | G06Q 10/06316 705/7.26 |
| 2016/0275453 | A1 * | 9/2016 | Powers | G06F 3/0483 |
| 2016/0306513 | A1 * | 10/2016 | Zhu | G06F 16/954 |
| 2016/0321589 | A1 * | 11/2016 | Powers | G06Q 10/0633 |
| 2017/0039241 | A1 * | 2/2017 | Bhagwan | G06F 16/24545 |
| 2017/0242828 | A1 * | 8/2017 | Alkhalifa | G06F 9/453 |
| 2018/0005149 | A1 * | 1/2018 | Dhingra | G06Q 10/0633 |
| 2018/0173716 | A1 * | 6/2018 | Alkhalifa | G06F 9/453 |
| 2020/0160986 | A1 * | 5/2020 | Vegas Santiago | G06N 20/00 |
| 2022/0366339 | A1 * | 11/2022 | Powers | G06F 16/26 |
| 2023/0385085 | A1 * | 11/2023 | Singh | G06F 9/451 |
| 2024/0028994 | A1 * | 1/2024 | Powers | G06F 16/26 |
| 2024/0403762 | A1 * | 12/2024 | Powers | G06F 16/26 |
| 2025/0156496 | A1 * | 5/2025 | Marmor | G06F 16/9574 |
| 2025/0209399 | A1 * | 6/2025 | Powers | G06F 16/26 |
| 2026/0004215 | A1 * | 1/2026 | Powers | G06Q 10/06316 |

* cited by examiner

GENERATIVE DIMENSION DISCOVERY 1400

SELF-TRAINING 'DIGGER' AGENTS 1800

CROSS-AGENT COLLABORATION PROTOCOL 3200

AGENTIC GUIDED WORKFLOW ANALYTICS WITH DYNAMIC ENTROPY-DRIVEN CROSS-DOMAIN NAVIGATION

CROSS-REFERENCE TO RELATED APPLICATIONS

This application is related to the following co-owned U.S. patent application publications, where the entire content of each is hereby incorporated herein by reference: (DMSL-0002-U01) US 2016-0321589 published Nov. 3, 2016; (DMSL-0004-U01) US 2017-0270452 published Sep. 21, 2017; (DMSL-0005-U01) US 2020-0019911 published Jan. 16, 2020; and (DMSL-0008-U01) U.S. application Ser. No. 19/335,320 filed Sep. 22, 2025.

TECHNICAL FIELD

The present disclosure relates to computer-implemented analytic systems employing agentic artificial-intelligence components integrated throughout a multi-layer analytics technology stack. More particularly, the disclosure concerns architectures, data structures, and machine-learning mechanisms that enable agentic AI modules to operate across navigation, workflow, data-modeling, and schema-management layers to improve computational efficiency, adapt analytical pathways, generate new analytical dimensions, and enhance real-time performance within guided-analytics environments.

BACKGROUND

Digital analytics systems often rely on predefined dashboards, predefined metrics, and manually prioritized navigation structures that limit a user's ability to discover relationships across heterogeneous datasets. Conventional analytical workflows typically may require users to specify queries or follow fixed sequences of dashboards, which restricts the system's capacity to adapt to evolving data patterns or user objectives. Existing artificial-intelligence techniques may provide recommendations or predictive insights, but they generally operate as isolated modules that do not modify analytical structures, navigation pathways, or dimensional models in response to user interactions.

In parallel, many organizations maintain diverse data sources organized across multiple domains, each with its own schemas, workflows, and analytical contexts. Identifying meaningful cross-domain relationships or constructing derived metrics often may require expert intervention and extensive manual configuration. Even where machine-learning models are integrated into analytic environments, such models typically serve to evaluate data rather than to reshape the analytic framework itself.

There remains a need for systems capable of adapting analytical navigation, generating new metrics, and expanding domain relationships in response to user behavior and contextual signals. There is further a need for AI-driven mechanisms that observe analytic workflows, detect latent cross-domain structures, and autonomously synthesize new guided pages or dimensional constructs without requiring explicit user programming. Systems that can incorporate reinforcement learning, generative modeling, and domain semantics to increase informational diversity and analytical reach may provide enhanced capabilities for navigating complex data environments.

The disclosed technologies address these challenges by integrating agentic artificial intelligence with guided-page navigation frameworks, columnar data structures, domain-leaping engines, and KPI-generation modules. Through such integration, the system may observe user interaction patterns, evaluate information-entropy metrics, discover cross-domain relationships, generate new analytical constructs, and adapt navigation pathways to evolving analytic contexts, thereby enabling a more flexible and dynamically constructed analytical environment.

SUMMARY

Figure 1:
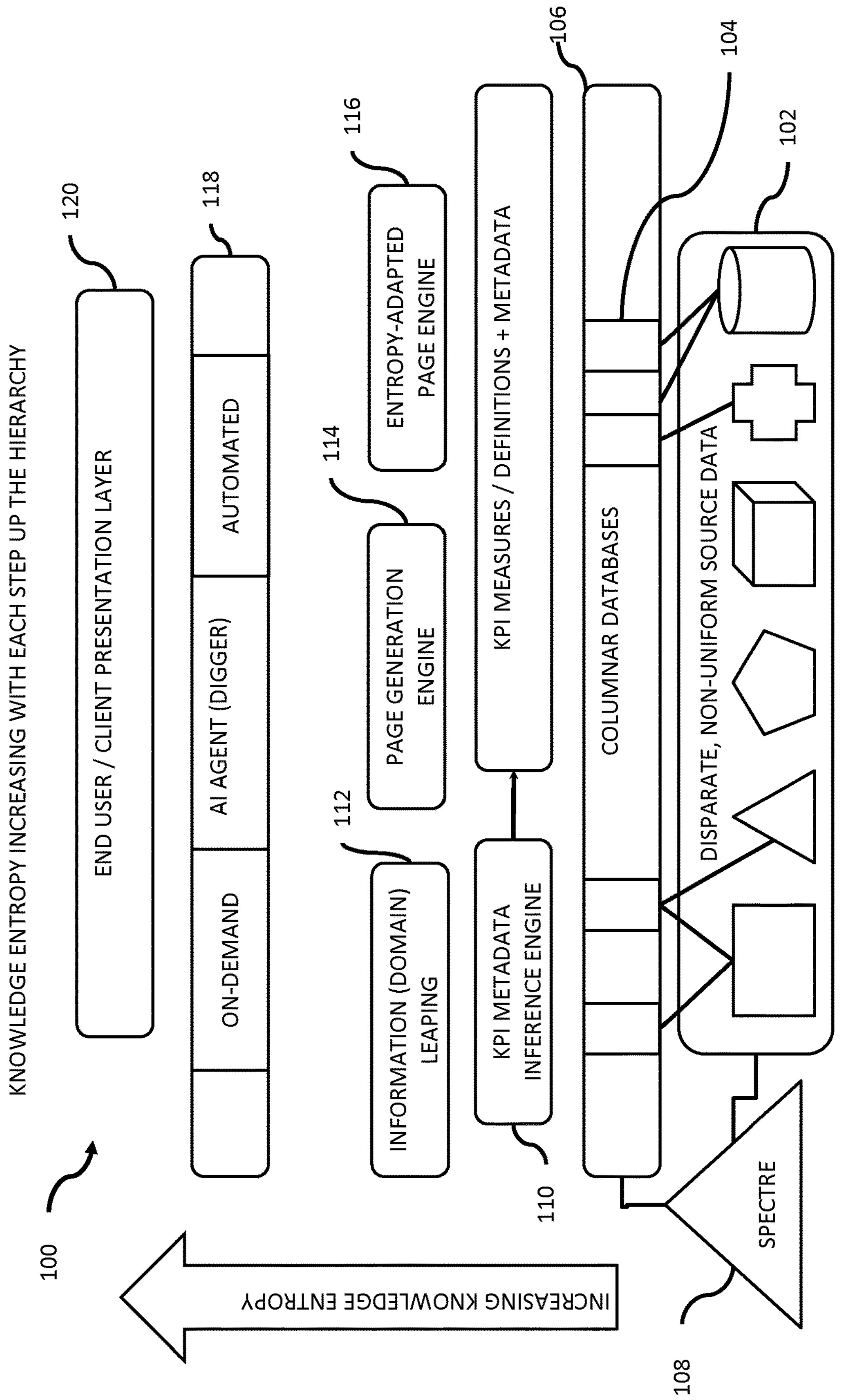
FIG. 1 depicts a block diagram of a components for AI-based knowledge entropy enhancement.

A computer-implemented system for adaptive guided-page navigation may include a navigation-map data structure stored in memory and implemented as a graph or adjacency matrix configured for low-latency traversal. Each page node may correspond to an analytical context or data domain, and each edge may store transition parameters indicating relevance, contextual association, or confidence weighting. At least one agentic artificial-intelligence module may be executed by one or more hardware processors and may monitor user interactions, workflow sequences, dwell times, query activity, and other contextual signals to generate behavioral and contextual feature vectors used for navigation-map updates. A reinforcement-learning engine coupled to the navigation-map data structure may calculate information-entropy gain values or related discovery-potential measures for potential navigation transitions and may compute reward signals using hardware-accelerated or parallelized numerical operations. Modification logic may perform selective, local updates to the navigation-map data structure-such as adjusting edge weights, creating or removing edges, or generating latent nodes-without reconstructing the full graph, thereby improving update latency and computational efficiency.

A page-generation engine may prerender or cache guided-navigation sequences based on predictions derived from the updated navigation map to reduce user-interface response time. Through iterative cycles of monitoring, calculating, updating, and rendering, the navigation map, learning engine, and generated guided pages may co-evolve over time. In some implementations, the system components, including the navigation-map data structure, the agentic artificial-intelligence module, the reinforcement-learning engine, the modification logic, and the page-generation engine, may operate collectively as an information-entropy-adaptive analytic network that autonomously adjusts navigation pathways in response to observed behavior while reducing computational overhead.

A corresponding computer-implemented method may include receiving signals describing user interaction with guided analytical pages, maintaining the navigation-map data structure in memory using a format optimized for low-latency access, computing entropy-gain values using hardware-accelerated processors, selectively updating adjacency relationships based on the computed values, and generating and presenting prerendered guided pages to reduce navigation latency. Additional steps may include defining metadata for nodes and edges, generating intent profiles from monitored behavior, applying reinforcement-learning updates to improve navigation accuracy over time, and iteratively performing these operations to increase both discovery potential and processing efficiency. A non-transitory computer-readable medium may store instructions that, when executed by one or more processors, cause the processors to carry out any of these operations.

A computer-implemented system for autonomous generation of analytical dimensions may include a columnar database stored in memory and configured for high-throughput analytical querying, the database comprising core and dynamic dimensions defined by metadata schemas specifying data types, lineage records, and update frequencies. A metadata-analysis engine executed by one or more hardware processors may extract semantic relationships, correlations, and usage patterns from stored datasets and schema definitions by performing computational operations such as semantic parsing, vector-embedding comparison, mutual-information scoring, lineage-dependency evaluation, and usage-frequency analysis. These operations may identify latent correlations and contextual dependencies among existing data fields, including inter-dimensional relationships inferred from lineage metadata.

An agentic generative-learning module trained on prior schema configurations, domain semantics, historical schema-evolution data, and columnar relationships may synthesize candidate dimension definitions by combining, transforming, weighting, or abstracting existing column structures. The generative-learning module may employ transformer-based, variational-autoencoder, diffusion-model, or similar architectures and may output candidate dimensions in a machine-readable schema format compatible with the columnar database to facilitate low-latency integration.

A schema-management component may evaluate each generated candidate dimension using computational metrics such as entropy gain, contextual relevance, predictive-improvement scores, correlation strength, and understandability measures. The schema-management component may filter, validate, or reject candidate dimensions using threshold-based scoring operations and may autonomously promote validated candidates to production status. Upon validation, logic executed by the hardware processors may update the database schema through local schema-extension operations that instantiate new analytical axes without requiring full-table reconstruction, thereby reducing schema-evolution latency, and improving analytical-processing efficiency.

Validated dimensions may be assigned unique identifiers and metadata and propagated to dependent analytic models, guided pages, and dashboards. A governance layer may maintain provenance records for each generated dimension, including originating columns, model versions, evaluation metrics, and deployment authorization data. A human-in-the-loop interface may allow domain experts to review, rename, merge, or reject candidate dimensions, with such expert input incorporated as feedback for retraining or refining the generative-learning module.

A corresponding computer-implemented method may analyze metadata and column relationships using processor-based feature-extraction operations, compute semantic-similarity or mutual-information scores, apply generative models to propose candidate dimension names or formulas, evaluate the candidates using entropy-based or predictive-accuracy metrics, and instantiate validated dimensions using local schema-update operations. The method may further propagate approved dimension definitions to downstream analytic components and record detailed provenance entries describing processing parameters, evaluation results, and deployment timestamps. In some implementations, the method may operate jointly with a reinforcement-learning navigation engine to improve both dimension generation and navigation-path optimization, enhancing information-entropy expansion across the analytical environment. A system for semantic workflow translation may include a semantic-interpretation module configured to receive natural-language instructions or queries and generate corresponding machine-readable intent representations using large-language-model architectures, transformer-based natural-language understanding models, symbolic parsers, or domain-adapted semantic-dependency analyzers. A contextual-analysis engine may resolve the extracted intent against a domain ontology or metadata catalog specifying available datasets, analytical dimensions, KPIs, workflows, and domain relationships, thereby mapping intent tokens to ontology elements or disambiguating ambiguous terms using user history, role context, or session metadata. A workflow-construction engine may generate ordered guided-analytics workflows or multi-domain navigation sequences, each navigation step assigned an entropy-gain estimate or confidence score and may select among multiple candidate workflows using entropy-based or confidence-ranking criteria. An agentic-orchestration layer may validate and execute the generated workflow using a knowledge graph or navigation map, adapt workflow elements in response to contextual feedback or user corrections, and regenerate elements as necessary during execution. A feedback-learning module may refine semantic interpretation and workflow-construction behavior based on reinforcement signals drawn from user approvals, corrections, modifications, or outcome measures. A presentation module may render the translated workflow as a guided analytical narrative or dashboard and may allow a user to modify the workflow through natural-language dialogue. A corresponding method may parse natural-language queries using domain-specific LLM models, resolve intent against an ontology, generate navigation sequences ranked by entropy or relevance, invoke guided-page generation for each sequence element, adapt the workflow based on user interactions, generate natural-language explanations describing the reasoning behind the sequence, and continuously improve translation accuracy through cooperative learning between the reinforcement-learning navigation engine and the generative dimension discovery engine.

A system for adaptive analytics employing self-training agents may instantiate a plurality of analytic agents, each specializing in a particular analytic domain such as finance, procurement, sales, logistics, compliance, or healthcare, and each maintaining its own learning memory including a short-term episodic buffer for current-session data and a long-term repository storing aggregated knowledge from prior sessions. An intra-agent communication framework may use entropy-weighted message-passing protocols or publish-subscribe channels to allow agents to exchange learned policies, navigation strategies, entropy metrics, model weights, or contextual indicators. A federated reinforcement-learning coordinator may aggregate local policy gradients from multiple agents without requiring transfer of underlying data, thereby preserving privacy while distributing refined global models back to each agent. A meta-learning agent may monitor agent interactions and adjust learning rates, collaboration weights, or reward functions to accelerate convergence. A governance layer may maintain audit logs of agent updates, collaboration events, entropy-gain measurements, and provenance metadata for compliance tracking. A corresponding method may collect user-interaction data and analytic-performance metrics as each agent executes guided workflows, update local policy parameters using reinforcement or self-supervised learning, exchange model parameters or entropy indicators at defined intervals, aggregate updates using federated reinforcement learning, detect under-performing agents and perform retraining or replacement using cloned models, share parameters via secure channels such as differential privacy or homomorphic encryption, and log agent lineage, update timestamps, and collaboration outcomes for audit and compliance.

A system for predictive guided-page synthesis may include a predictive-modeling engine trained using time-series forecasting models, sequence-modeling architectures, or attention-based neural networks to forecast user information needs, contextual events, or analytic states based on historical interaction data, navigation sequences, KPI trends, and workflow context. A page-synthesis engine may generate guided pages prior to explicit user invocation using template-based composition, generative-AI structures, or rule-driven layout synthesis and may populate such pages with datasets, KPIs, and visualizations aligned with predicted analytic objectives. An entropy-prioritization module may rank predicted guided pages according to expected information-entropy gain or novelty and retain at least those exceeding predefined thresholds. A navigation-integration component may insert or reorder synthesized pages in a live navigation map with relevance or entropy scores, while an evaluation-and-feedback module may monitor user interactions with synthesized pages and apply reinforcement-learning updates to refine predictive and synthesis models. A contextual trigger subsystem may initiate predictive generation based on workflow transitions, KPI anomalies, or semantic-intent cues from a semantic workflow translator. A corresponding method may analyze user-interaction histories to compute predictive features, forecast future analytic intent, generate guided pages using generative models, rank them using entropy metrics, trigger page generation based on workflow or KPI events, incorporate accepted pages into the navigation topology, update models based on user acceptance or revision behavior, and retain high-performing predictive pages as permanent portions of the guided-analytics structure.

A system for entropy-weighted query optimization may include a query-analysis module that receives candidate analytical queries generated by user actions, agentic processes, or predictive models and a data-entropy evaluation engine that computes expected information-entropy scores for each query using statistical measures such as Shannon entropy, KL divergence, mutual information, or generative-model uncertainty. An optimization controller may rank queries according to their entropy scores, apply reinforcement-learning or bandit algorithms to balance exploration of high-entropy queries with exploitation of high-confidence ones, and select queries for prioritized execution. A resource-allocation subsystem may interface with distributed schedulers to dynamically assign processor threads, memory pools, or network bandwidth in proportion to entropy-weighted priority values. A feedback-learning component may compute realized entropy from executed queries, retrain prediction models to improve accuracy, and log execution metadata including entropy scores, runtime performance, and user-interaction metrics for governance. An understandability layer may generate natural-language or visual narratives describing why a particular query was prioritized. A corresponding method may estimate entropy for candidate queries using metadata and historical-result distributions, rank queries using an exploration-exploitation parameter, allocate computational resources accordingly, execute prioritized queries, compute realized entropy, update reinforcement-learning models, log execution metadata, and provide interpretive explanations to users.

A system for agent-driven time-series anticipation may deploy multiple temporal-analysis agents that monitor historical and streaming records associated with analytical dimensions and generate forecasts using autoregressive models, recurrent neural networks, transformers, Gaussian processes, or hybrid statistical-neural architectures. A cross-agent collaboration framework may allow temporal agents to exchange forecasts, confidence intervals, and entropy signals using entropy-weighted message passing, and a forecasting engine may aggregate these signals to produce multi-domain predictive models using Bayesian averaging, attention-based fusion, or similar techniques. A contextual-integration module may embed forecast outputs into guided-page navigation maps to generate predictive pages, alerts, or recommendations, while a visual-explanation module may convert forecast outputs and entropy metrics into natural-language explanations or graphical summaries. A multi-horizon coordination agent may align short-term, mid-term, and long-term forecasts for consistency. A feedback-learning component may refine forecasting models based on realized outcomes, user interactions, or forecast divergence events. A corresponding method may generate time-series forecasts across multiple agents, exchange entropy-weighted summaries, aggregate multi-domain predictions, detect forecast divergence, trigger guided-page generation based on predicted KPI states, and update forecasting models using reinforcement-learning or online-adaptation techniques.

A system for cognitive cache management may include a context-aware cache controller that monitors user interactions, data-access patterns, and workflow context to build usage profiles and a predictive prefetching engine that forecasts future data or page requests using behavioral, temporal, and contextual indicators. An entropy-based prioritization module may assign dynamic retention weights to cacheable objects based on informational novelty, contextual relevance, expected discovery value, or variability in user workflows. A resource-allocation manager may apportion cache memory according to entropy-weighted relevance scores and may dynamically evict or refresh cache contents based on updated scores, usage changes, or feedback metrics. A self-learning adaptation component may update predictive and prioritization models using cache-hit statistics, dwell-time patterns, and user-interaction feedback. A corresponding method may monitor interaction patterns, forecast future object requests, compute entropy-based priority values, allocate cache memory accordingly, evict or refresh cached objects based on updated metrics, and retrain models using performance data.

A system for autonomous role-based personalization may include a role-inference engine that analyzes user-interaction patterns, workflow behaviors, and contextual signals to infer user roles, expertise levels, or analytic intents using clustering, Bayesian inference, neural-embedding models, or transformer-based sequence modeling. A profile-construction module may maintain dynamic user profiles represented as multi-vector structures describing dimension weights, KPI relevance scores, visualization preferences, and behavioral attributes evolving through reinforcement-learning feedback. An adaptive rendering controller may modify guided-page layouts, navigation paths, narrative tone, and workflow depth in accordance with the inferred role and may integrate with a page-generation engine to select visualization templates appropriate to user expertise. A cross-user generalization engine may detect emergent role archetypes and propagate personalization parameters across similar users or teams, while an agentic feedback layer may interpret user engagement metrics, corrective actions, and explicit ratings to refine role inference. A governance subsystem may maintain explainable-AI metadata describing personalization decisions and lineage. A corresponding method may collect interaction data, infer user roles via clustering or probabilistic modeling, merge inferred roles with enterprise directory data, assign entropy-weighted KPI relevance values, adapt narrative or visualization complexity, update role models through reinforcement learning, and generate explanatory summaries for transparency.

A system for generative storytelling and explanation may include a narrative-generation engine using large-language-model architectures, template-based text generators, or hybrid symbolic-neural systems to transform analytical outputs, KPI results, and workflow histories into natural-language or multimodal narratives. A contextual-interpretation module may determine semantic significance and causal relationships among data points using graph reasoning, semantic embeddings, or causal-inference models. A presentation composer may assemble text, graphics, auditory elements, and interactive components into guided-story pages and adjust narrative tone or visualization complexity according to personalization profiles. A multimodal synthesis component may combine visual, textual, and auditory storytelling, and a knowledge-provenance layer may maintain traceable links between narrative statements and underlying data sources for understandability. A feedback-learning component may update narrative parameters using reinforcement or preference-learning signals derived from user interactions. A corresponding method may interpret collected analytical data using a semantic knowledge graph, generate narratives with domain-specific language models, adjust narrative length and emphasis to match user roles, integrate charts and voice summaries, capture user-interaction signals such as reading duration or annotations, retrain narrative-generation models, and generate provenance metadata documenting linkage to underlying datasets.

A system for multi-agent collaboration may include a multi-agent communication framework implementing publish-subscribe or message-bus protocols with entropy-weighted priority queuing, allowing autonomous analytic agents to exchange data, policies, contextual metadata, model confidence, and entropy indicators. A collaboration-orchestration controller may maintain agent registries, schedule communication sessions, and enforce interaction rules, while an entropy-metadata exchange layer may normalize and aggregate entropy metrics to derive a global entropy index representing system-wide information diversity. A conflict-resolution and consensus engine may reconcile divergent analytic recommendations using consensus algorithms, fuzzy logic, or weighted voting. A governance subsystem may manage authentication, provenance logging, and understandability of cross-agent communications using cryptographically signed interaction records. A meta-learning agent may analyze collaboration outcomes and adjust communication weights to improve collective efficiency. A corresponding method may register agents, exchange entropy metadata, compute global entropy indexes, perform consensus formation, detect redundant or conflicting messages, update agent policies using reinforcement-learning signals, store encrypted collaboration logs, and generate explainable-AI reports describing collective reasoning.

A system for meta-rule induction and auto-programming may include a rule-extraction engine that analyzes historical system logs, workflow histories, and agent behaviors using sequence-mining, causal-inference, symbolic-learning, or Markov-chain analysis to identify recurring operational patterns. A meta-learning module may generalize extracted patterns into formalized operational rules using reinforcement or evolutionary algorithms that evaluate rule generality, stability, and entropy contribution. A generative code-synthesis engine may produce executable code segments, configuration scripts, workflow definitions, or analytic pipelines using transformer-based natural-language-to-code models trained on workflow syntax and analytic expressions. A validation-and-simulation environment may test generated rules using accuracy, stability, KPI-impact, and entropy-gain criteria and simulate potential operational effects prior to deployment. A deployment-governance controller may approve, version, and propagate validated rules, recording lineage metadata such as originating agents, training data, evaluation metrics, and approval timestamps. A self-optimization scheduler may trigger induction cycles in response to system drift or entropy-growth stagnation. A corresponding method may collect operational logs, identify recurring sequences using causal discovery or association-rule mining, rank induced rules using entropy-weighted utility functions, generate executable code using transformer-based models, evaluate code in sandbox environments, deploy validated rules with version control and rollback capabilities, and generate understandability artifacts documenting rule-induction reasoning.

DETAILED DESCRIPTION

The present disclosure relates to systems and methods for integrating agentic artificial intelligence with guided-page navigation frameworks to enable autonomous, adaptive, and generative analytic behavior. Conventional guided navigation systems typically rely on predefined rules, manually constructed workflows, and predefined domain relationships, which limit a system's ability to expand analytic structures or discover new cross-domain relationships dynamically. In contrast, the technologies described herein introduce an agentic artificial-intelligence layer capable of learning from user interactions, modifying analytic pathways, and generating entirely new guided pages, dimensions, and analytical constructs without explicit human programming. Through this integration, the system is configured to increase information entropy within analytical environments, thereby enabling continuous growth in the diversity and depth of insight available to users.

Guided Page Navigation (GPN) provides a structured environment in which multi-domain, multi-page analytical workflows are generated from columnar-based dimensional datasets and domain-specific metadata. GPN enables dynamic "information leaping" between domains that share common dimensions or data structures and incorporates learning mechanisms that refine navigation paths based on user behavior. These capabilities offer a foundation for guided discovery but traditionally operate as a transactional system, responding at least to current user queries or workflow states. The present disclosure extends this framework by positioning agentic artificial intelligence as a continuous, persistent analytical process that observes, adapts to, and modifies the underlying navigation structures over time.

Agentic artificial intelligence, as used herein, refers to autonomous AI entities that operate through persistent learning loops, maintain internal goals or priorities, and are capable of modifying their operational context. Such agents may apply generative modeling techniques, reinforcement-learning mechanisms, and self-supervised training to evolve internal policies, infer new domain relationships, or restructure analytic pathways. In the context of GPN, these agents may learn user behavior patterns, workflow intent, analytic preferences, and cross-domain transitions, and may autonomously adjust navigation maps, create new guided pages, or synthesize new KPIs and analytical narratives. Through such persistent operation, the agentic layer functions as a cognitive substrate that continuously enriches and expands the analytic environment.

The result is a system capable of increasing information entropy within an enterprise analytic framework. Information entropy, as used here, represents the diversity, breadth, and novelty of cross-domain relationships and analytical constructs available within the system. A system that increases entropy over time becomes progressively better at representing complex analytic contexts, identifying previously unrecognized relationships, and enabling deeper forms of guided discovery. The integration of agentic AI with GPN therefore produces a self-training analytic ecosystem in which each iteration of user interaction or agentic reasoning yields additional structures-new navigation pathways, derived metrics, or synthesized analytical narratives—that expand the system's informational capacity.

The agentic layer may operate both within and above the conventional navigation hierarchy. Within the navigation layer, agentic AI may adjust edge weights, modify graph structures, or reconfigure domain transitions in response to observed user behavior or computed entropy signals. Above the navigation layer, agentic AI may generate entirely new guided pages, propose novel dimension constructs, or derive KPI hierarchies based on synthesized semantic relationships across disparate data domains. In some embodiments, the agentic layer may evaluate its own outputs, revise its internal rules, or update schema-level relationships autonomously.

By integrating these autonomous reasoning capabilities with the foundational structures of GPN—columnar datasets, domain dimensions, guided-page generation engines, and navigation-optimization logic—the system transforms from a guided analytical tool into a self-guiding, generative, and continuously adapting cognitive environment. The combination of persistent agentic learning with dynamic navigation structures establishes a unified analytic substrate capable of evolving over time, increasing entropy with each interaction, and generating novel analytical constructs that reflect emerging patterns across the underlying data. This integration aligns with the hierarchical entropy-growth model described herein and provides a generalized framework for self-adaptive analytic intelligence across the broader analytics stack and ecosystem.

FIG. 1 illustrates an integrated, entropy-amplifying analytical architecture in which heterogeneous data is ingested, transformed, semantically structured, related across dimensions, converted into KPI- and domain-level knowledge objects, synthesized into guided analytical pages, optimized through entropy-driven navigation logic, and ultimately delivered through agentic reasoning and adaptive multimodal presentation. The FIG. 1 depicts the major processing layers that together form a hierarchical analytics stack, beginning with disparate source data and progressing through columnar storage, semantic modeling, deep-dimensional correlation, KPI inference, domain leaping, guided-page generation, entropy-adaptive navigation, and agentic presentation. Each element contributes to a cumulative progression by which information structure, semantic richness, and discovery potential increase at successive hierarchical levels.

The hierarchy begins with the source data 102, which represents disparate, non-uniform datasets originating from multiple enterprise systems, external platforms, user-generated content streams, and operational data feeds. The source data 102 encompasses structured, semi-structured, and unstructured information for normalization and semantic alignment before incorporation into higher-level analytical processes, such as columnar data base layer 104.

At a next hierarchical level, a columnar database layer 104 is configured to store vertically decomposed records that have been derived from the source data 102. The columnar database layer 104 provides a dimensionally aligned analytical substrate optimized for vectorized operations, compressed storage, and high-performance retrieval across multi-domain analytical workloads.

A semantic database 106 serves as a semantic abstraction layer built upon the columnar database layer 104 In embodiments, the semantic database 106 may be stored in association with the columnar database 104. The semantic database 106 incorporates semantic relationships, normalized metadata, domain attributes, and inferred context models that unify heterogeneous data structures into a consistent conceptual framework usable by subsequent analytical engines.

Within the architecture 100, a Spectre columnar deep-dimensional relationship engine 108 computes multi-domain dimensional relationships within the semantic database 106. The Spectre engine 108 derives cross-domain correlations, graph-based relational structures, and high-order dimension linkages, thereby increasing relational entropy and enabling downstream analytic reasoning over a broad and interconnected dimensional space.

A KPI metadata inference engine 110 generates and maintains KPI definitions derived from relational information produced by the Spectre engine 108. The KPI metadata inference engine 110 establishes semantic definitions, analytic lineage, and transformation rules associated with each KPI, forming a set of analytic primitives consumed by higher workflow and navigation layers.

At a next hierarchical level, a domain leaping generation and inference engine 112 computes contextual transitions, semantic jumps, and cross-domain workflow paths based on relationships identified by the Spectre engine 108 and the KPI metadata inference engine 110. The domain leaping engine 112 identifies logical navigation or workflow progressions that exceed single-domain boundaries and contribute to multi-domain analytic insight.

A page generation engine 114 synthesizes guided analytical pages, contextual views, workflow-specific screens, and narrative summaries using information derived from the Spectre engine 108, the KPI metadata inference engine 110, and the domain leaping engine 112. The page generation engine 114 produces dynamically generated pages aligned with the analytic context inferred from user interactions or agentic reasoning.

At a next hierarchical level, an information-entropy adaptive domain leaping engine 116 evaluates potential navigation transitions using entropy-based metrics, expected contextual relevance, and discovery potential. The entropy-adaptive engine 116 enables the guided navigation system to self-optimize by prioritizing analytic pathways that yield greater informational novelty or contribute to enhanced discovery efficiency.

The hierarchy culminates in a digger AI agentic intelligence layer 118 and a presentation-ai layer 120. The digger AI agentic intelligence layer 118 orchestrates analytical operations across all subordinate layers, interprets behavioral and contextual signals, performs adaptive reasoning, and autonomously adjusts navigation structures to maximize information entropy. The presentation-ai layer 120 renders interactive narratives, multimodal output formats, guided analytical explanations, and adaptive visualizations for presentation to users.

Together, elements 102 through 120 constitute an integrated hierarchical architecture represented in FIG. 1, enabling a continuous transformation of raw data into progressively more structured, semantically rich, and contextually adaptive analytical outputs that ultimately support agentic navigation and guided analytic decision-making.

Figure 2:
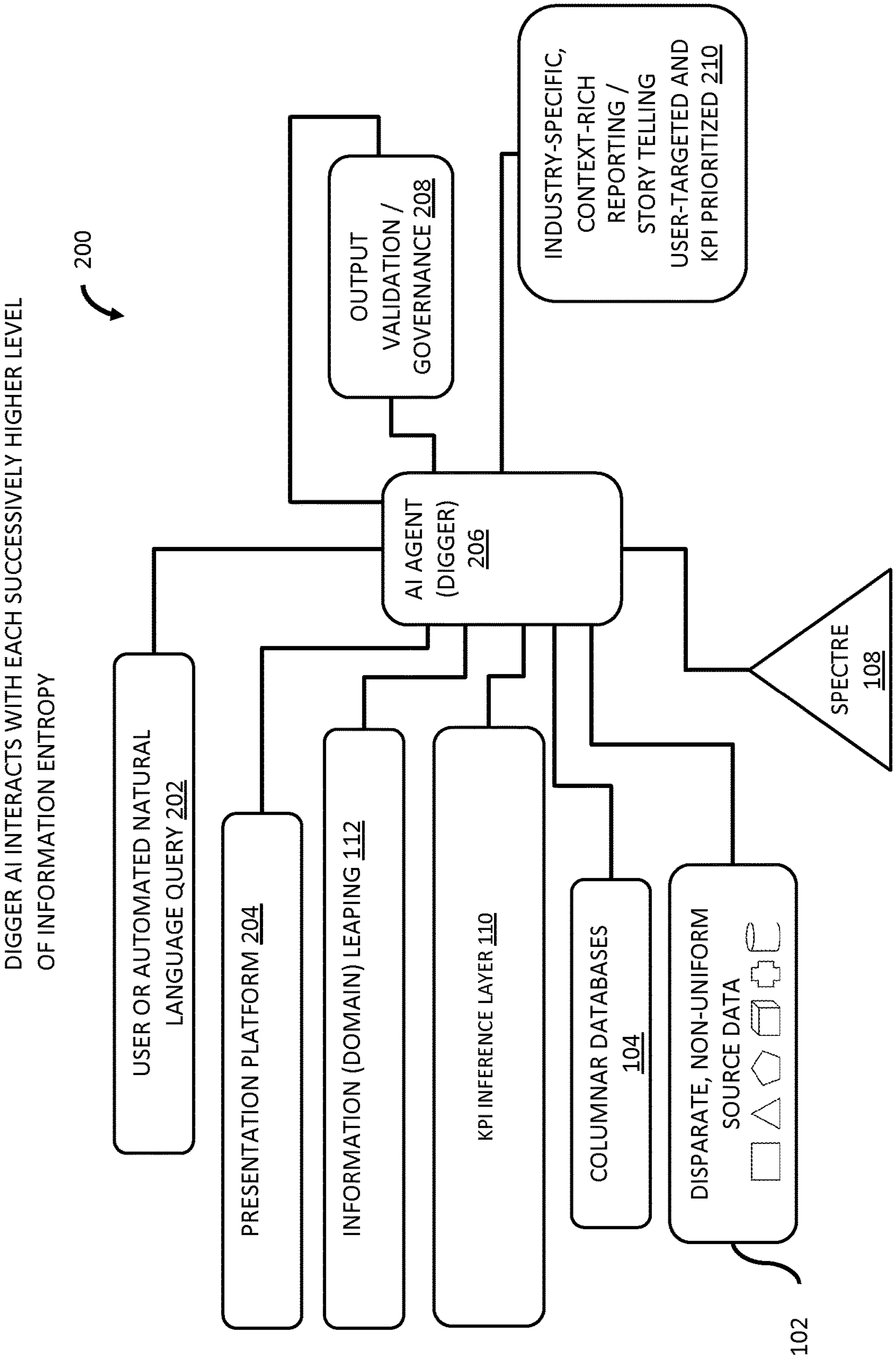
FIG. 2 depicts a block diagram of an ai agent interacting with a plurality of successive levels of information entropy enhancement.

FIG. 2 illustrates a multi-layer integration architecture through which an AI agentic reasoning layer interacts with the technologies disclosed herein and in the documents incorporated herein by reference. This FIG. 2 depicts a guided-analytics ecosystem in which natural-language user intent, columnar data structures, KPI metadata, domain-leaping logic, and presentation capabilities are coordinated and synthesized through an agentic intelligence substrate to enable industry-specific, entropy-amplifying analytic workflows. The architecture shown in FIG. 2 emphasizes bidirectional interoperability between user-facing interfaces, underlying data-structural layers, and agent-driven analytic orchestration.

At a base of the figure, the disparate, non-uniform source data 102 represents heterogeneous input originating from transactional feeds, operational datasets, external information sources, and unstructured content streams. The columnar databases 104 ingest and organize this data into vertically decomposed structures that support dimensional correlation, relational inference, and high-performance analytical operations. The Spectre engine 108 synthesizes deep-dimensional relationships among the columnar databases 104, providing multi-domain correlation structures that form the substrate for domain inference and KPI derivation.

At a next hierarchical level, the KPI metadata inference layer 110 corresponds to KPI measures, definitions, and metadata derived from dimensional relationships computed by the Spectre engine 108. The domain leaping generation and inference engine 112 produces semantic transitions and cross-domain navigation trajectories using the dimensional and KPI relationships defined by 110 and 108. Together, layers 108, 110, and 112 form the analytic core through which data is transformed into semantically weighted, workflow-aligned analytical constructs.

The user or automated natural-language query 202 represents the entry point for user intent, conversational interaction, and automated analytic task invocation. The presentation platform 204 receives analytic instructions and contextual signals from 202 and acts as a rendering substrate for guided analytics defined by the downstream layers. The AI agent digger 206 centrally orchestrates analytic operations by interpreting natural-language intent, invoking domain-leaping logic, generating guided pages, and coordinating metadata, dimensional, and KPI reasoning.

At a next hierarchical level, the output validation and governance layer 208 evaluates analytic outputs, recommended insights, and navigation sequences produced by the AI agent digger 206, ensuring fidelity, interpretability, and compliance with data-governance requirements. An industry-specific reporting and storytelling engine 210 synthesizes domain-adapted narratives, KPI-prioritized outputs, contextual explanations, and user-targeted analytical summaries directly from the agentic reasoning performed by the AI agent digger 206 and the semantically enriched objects generated by layers 108 through 112.

This figure illustrates an integrated architecture in which the AI agent digger 206 coordinates and interacts with each embodiment described in the documents incorporated herein by reference—ranging from columnar array technologies to guided navigation, domain leaping, assisted analytics, and presentation-layer synthesis. By routing natural-language input 202 through semantically structured layers 104 through 112 and validating results via 208 and 210, the system achieves successive increases.

Figure 3:
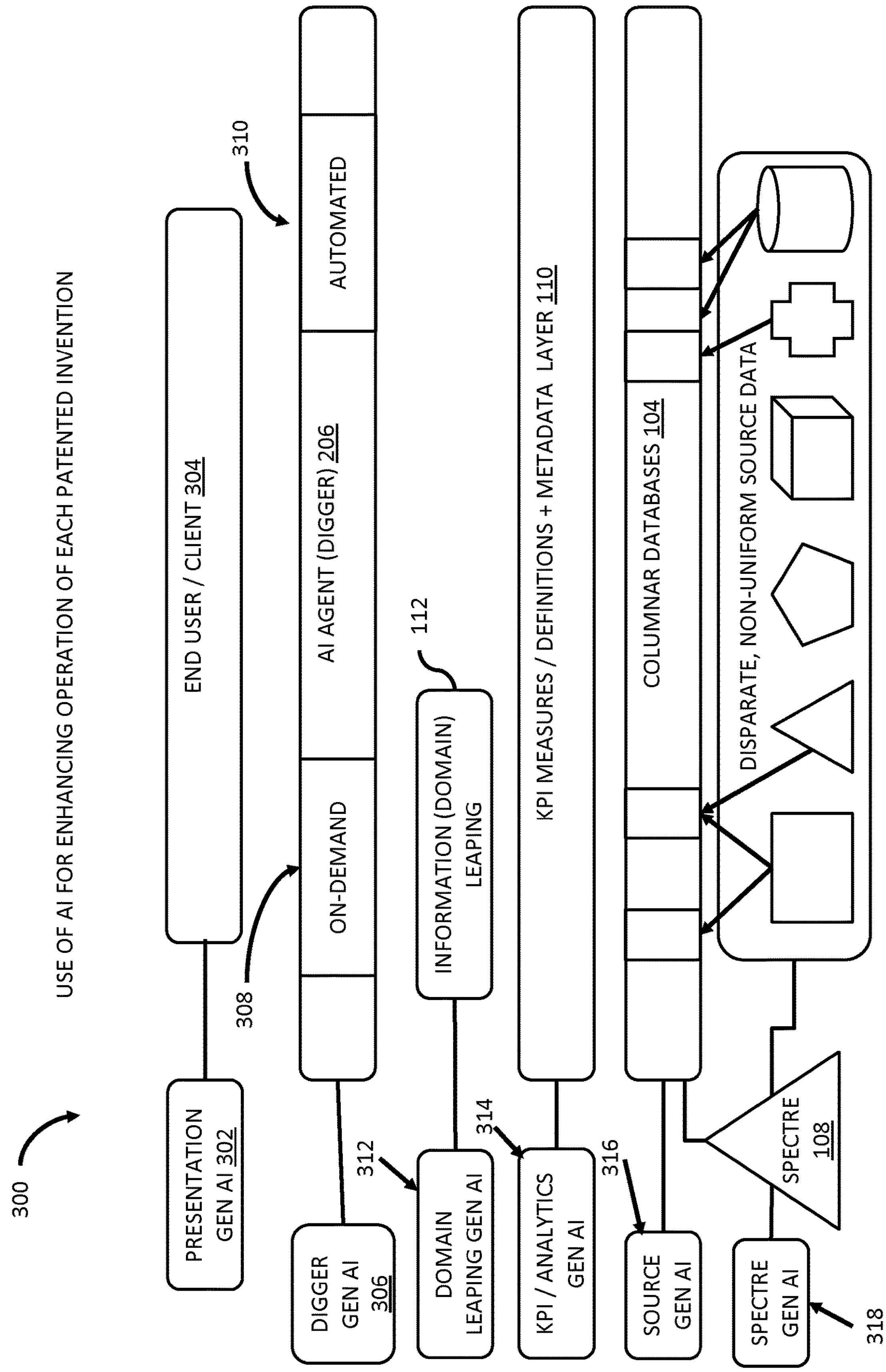
FIG. 3 depicts a block diagram of use of AI for enhancing operation of a plurality of layers of a guided page data analytics architecture.

FIG. 3 illustrates an agentic-ai integration architecture 300 in which generative AI modules interact with corresponding subsystems to enhance the operation within a unified guided-analytics environment. The FIG. 3 depicts a layered arrangement of generative AI modules, columnar and semantic data-processing layers, domain-leaping subsystems, KPI metadata systems, and an agentic reasoning layer. The architecture shown in FIG. 3 demonstrates how AI-driven generative techniques may operate in parallel with and augment the end-user interface, the digger agentic processes, columnar database structures, Spectre-based dimensional inference, and other analytical engines.

At the user-interaction layer, a presentation genAI module 302 is configured to generate adaptive visualizations, narratives, and guided-analytics content responsive to user queries. An end user or client interface 304 serves as the interaction point through which user intent, instructions, or conversational prompts are received.

At a next hierarchical level, a digger genAI module 306 provides generative reasoning support to the AI agent digger 206. The digger genAI module 306 may operate in an on-demand mode 308 or an automated mode 310, enabling AI-driven query synthesis, workflow assembly, analytic explanation, or decision routing depending on the operational state. The AI agent digger 206 orchestrates interactions across the surrounding gen-ai modules, navigation logic, data layers, and KPI structures.

A domain leaping genAI module 312 enhances the operation of the domain leaping generation and inference engine 112 by generating semantic transitions, cross-domain workflows, and analytic pathways using generative modeling techniques. Similarly, a KPI and analytics genAI module 314 is configured to generate KPI relationships, analytic expressions, or derived metadata that complement the KPI metadata inference layer 110 and the analytic constructs supported by the documents incorporated herein.

At a next hierarchical level, a source genAI module 316 interacts with underlying columnar databases 104 and supports generative discovery of data relationships, schema-level inferences, or column-pair abstractions. The columnar databases 104 contain structured, vertically decomposed records used across the analytical stack. These columnar databases 104 receive data from the disparate, non-uniform source data 102, which represents heterogeneous input from multiple operational and external systems.

A Spectre genAI module 318 supplements the Spectre engine 108 by generating candidate dimensional relationships, high-order inference structures, or analytic-graph augmentations that expand the dimensional entropy produced by Spectre-based deep-dimensional correlation. The Spectre engine 108 computes dimensional relationships that integrate with the gen-ai-supported domain leaping and KPI inference processes.

Collectively, the generative AI modules 302 through 318 operate in conjunction with the AI agent digger 206, the domain leaping structures 112, the KPI metadata systems 110, the Spectre engine 108, and the columnar database layer 104 to enhance analytic generation, workflow creation, domain inference, KPI synthesis, and guided navigation. Through these interactions, the architecture illustrated in FIG. 3 provides a unified system in which generative AI augments a plurality of subsystems and increases the effective information entropy, navigation relevance, and analytic adaptability of the overall platform.

Figure 4:
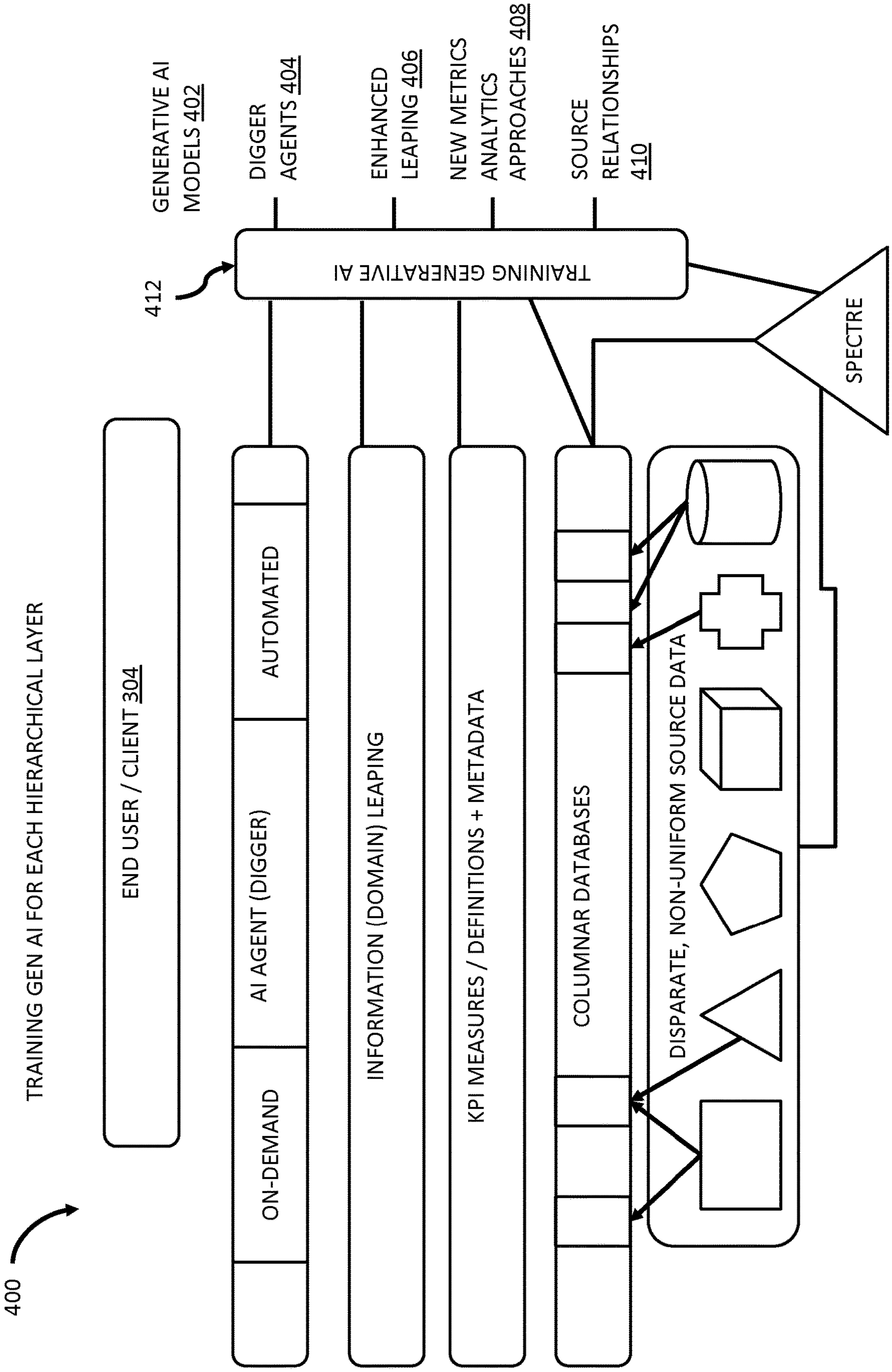
FIG. 4 depicts a block diagram of training generative AI for each of a plurality of hierarchical layers of an information analysis architecture.

FIG. 4 illustrates a training-oriented generative AI architecture in which generative models are developed, refined, and deployed to enhance the operation of multiple analytic engines. The FIG. 4 depicts an integrated arrangement of user-interface elements, agentic processing layers, columnar data structures, dimensional analytics engines, and a dedicated generative AI training subsystem. Together, these elements enable the system to continuously improve its domain-leaping capabilities, metric generation techniques, analytical modeling operations, and source-relationship inference.

At a user-interaction layer, an end user or client interface 304 corresponds to a user-facing environment through which natural-language instructions, workflow cues, and analytic triggers originate. The interface 304 communicates intent signals or analytic directives to downstream agentic processes.

At another hierarchical level, the AI agent digger 206 operates in conjunction with an on-demand mode 308 and an automated mode 310. The AI agent digger 206 performs context interpretation, workflow assembly, navigation orchestration, and analytic reasoning using the data structures and domain relationships established by lower layers. The modes 308 and 310 allow agentic behavior to be activated in response to user-driven queries or autonomously through predictive or periodic triggers.

A domain leaping engine 112 provides the semantic-transition capabilities used to traverse analytical contexts beyond local dimensional boundaries. The domain leaping engine 112 interacts with a KPI metadata layer 110 responsible for computing and maintaining KPI definitions, metric structures, and analytic metadata derived from multi-domain relationships.

At a next hierarchical level, the columnar databases 104 store dimensionalized and vertically decomposed records derived from disparate, non-uniform source data 102. The source data 102 encompasses heterogeneous operational inputs including structured enterprise tables, semi-structured business artifacts, and unstructured content streams. The columnar databases 104 support high-performance analytical inference, dimension correlation, and downstream generative AI training.

A Spectre engine 108 connects to the columnar databases 104 to compute multi-domain dimensional relationships, semantic similarity structures, analytical graph linkages, and high-order relational inferences. The outputs of the Spectre engine 108 contribute to the dimensional context utilized by both domain-leaping operations and generative AI training.

A training generative AI module 412 is configured to consume the analytical structures produced by the Spectre engine 108, the columnar databases 104, the domain leaping engine 112, and the AI agent digger 206. The training generative AI module 412 refines generative AI models 402 using supervised, unsupervised, and reinforcement-based signals derived from historical analytic operations, KPI metadata, domain-leaping transitions, and user-interaction patterns.

The generative AI models 402 provide a hierarchy of domain-adaptive generative capabilities that improve the performance of multiple analytic subsystems. The digger agents 404 represent generative AI-augmented versions of the AI agent digger 206 used for scale-out reasoning, distributed workflow evaluation, and multi-agent analytic exploration. Enhanced leaping 406 represents generative improvements applied to the domain leaping engine 112, enabling deeper cross-domain transitions and richer semantic inference. The new metrics analytics approaches 408 correspond to generative methods for synthesizing novel KPIs, context-specific calculations, and analytic transformations. The source relationships 410 correspond to generatively inferred linkages among input data sources, columnar dimensions, and relational structures.

Collectively, the training generative AI module 412 interacts with the generative AI models 402, digger agents 404, enhanced leaping 406, new metrics analytics approaches 408, and source relationships 410 to continually improve analytic reasoning, navigation fluidity, dimensional inference depth, and KPI-level insight generation. The architecture shown in FIG. 4 demonstrates how generative AI training cycles amplify the analytical abilities of the platform 100 and its corresponding subsystems.

Figure 5:
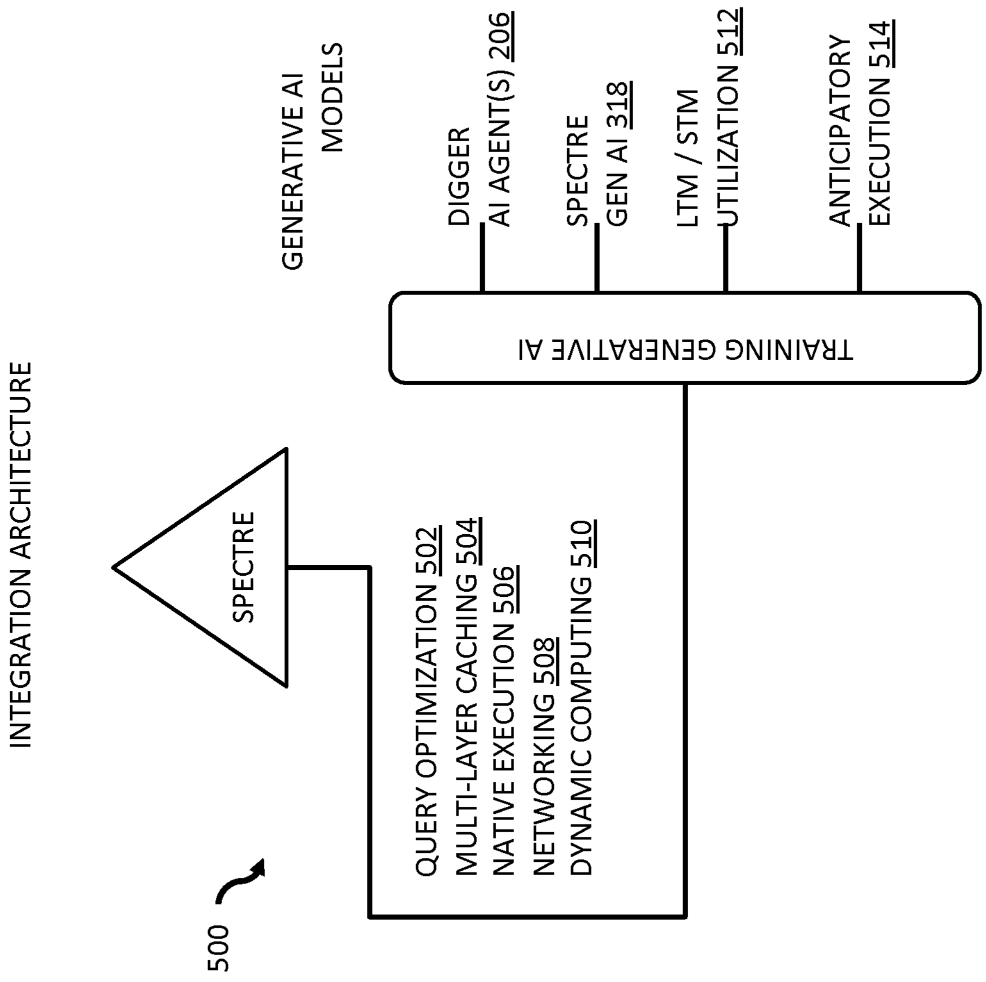
FIG. 5 depicts a block diagram of integration of AI with a Spectre-based data analysis architecture.

FIG. 5 illustrates an integration architecture in which a training generative AI subsystem interacts with system-level computational capabilities and multiple analytic engines to improve execution efficiency, predictive behavior, and operational adaptability within the guided-analytics environment. The FIG. 5 emphasizes the relationship between Spectre-driven dimensional inference, gen-ai-enhanced agentic reasoning, and advanced execution-layer optimizations.

The Spectre engine 108 provides the foundational dimensional correlation structures that inform downstream training and generative inference. The Spectre engine 108 supplies multi-domain relationships, semantic alignments, and cross-dimensional graph structures that are utilized by both execution-layer optimizations and generative AI training cycles.

At a next hierarchical level, a set of execution-layer capabilities includes query optimization 502, multi-layer caching 504, native execution 506, networking 508, and dynamic computing 510. The query optimization 502 capability supports adaptive restructuring of analytical queries based on dimensional patterns, KPI definitions, and entropy metrics. The multi-layer caching 504 capability provides caching and retention logic that operates across semantic, columnar, and execution layers. The native execution 506 capability corresponds to direct, low-level execution of analytical processes using columnar, Spectre, or agentic primitives. Networking 508 represents inter-node or inter-agent communication mechanisms used to support distributed analytic execution. Dynamic computing 510 supports load-adaptive or event-driven computational behavior.

A training generative AI module 412 is configured to incorporate execution-layer features 502 through 510 into generative training cycles. The training generative AI module 412 uses execution outcomes, performance metrics, and dimensional response patterns as training signals for the generative AI models 402.

The generative AI models 402 encompass generative mechanisms used for synthesizing domain transitions, predicting analytic pathways, optimizing execution plans, and enhancing agentic reasoning. These models interact with digger AI agents 206, which interpret signals from the generative AI subsystem and coordinate analytic operations across the system. The Spectre gen AI module 318 augments Spectre-driven inference with generative modeling techniques to derive expanded dimensional relationships and higher-order analytical constructs.

At a next hierarchical level, the architecture includes LTM/STM utilization 512 representing the coordinated use of long-term memory and short-term memory structures within the agentic-ai environment. The LTM/STM utilization 512 mechanism enables generative models and analytic agents to incorporate both persistent semantic knowledge and transient contextual information. The anticipatory execution 514 capability enables predictive or expectation-driven execution of analytic operations based on generative AI forecasts, Spectre-based relational cues, or observed user-behavior patterns.

Together, the elements 108, 402, 412, 206, 318, 502 through 514 represent an integrated system in which generative AI training cycles improve analytical efficiency, execution fluidity, dimensional inference depth, and predictive behavior. FIG. 5 demonstrates how execution-oriented features such as query optimization and dynamic computing are integrated within a generative AI training framework that continually adapts analytic reasoning and operational performance across the guided-analytics environment.

Figure 6:
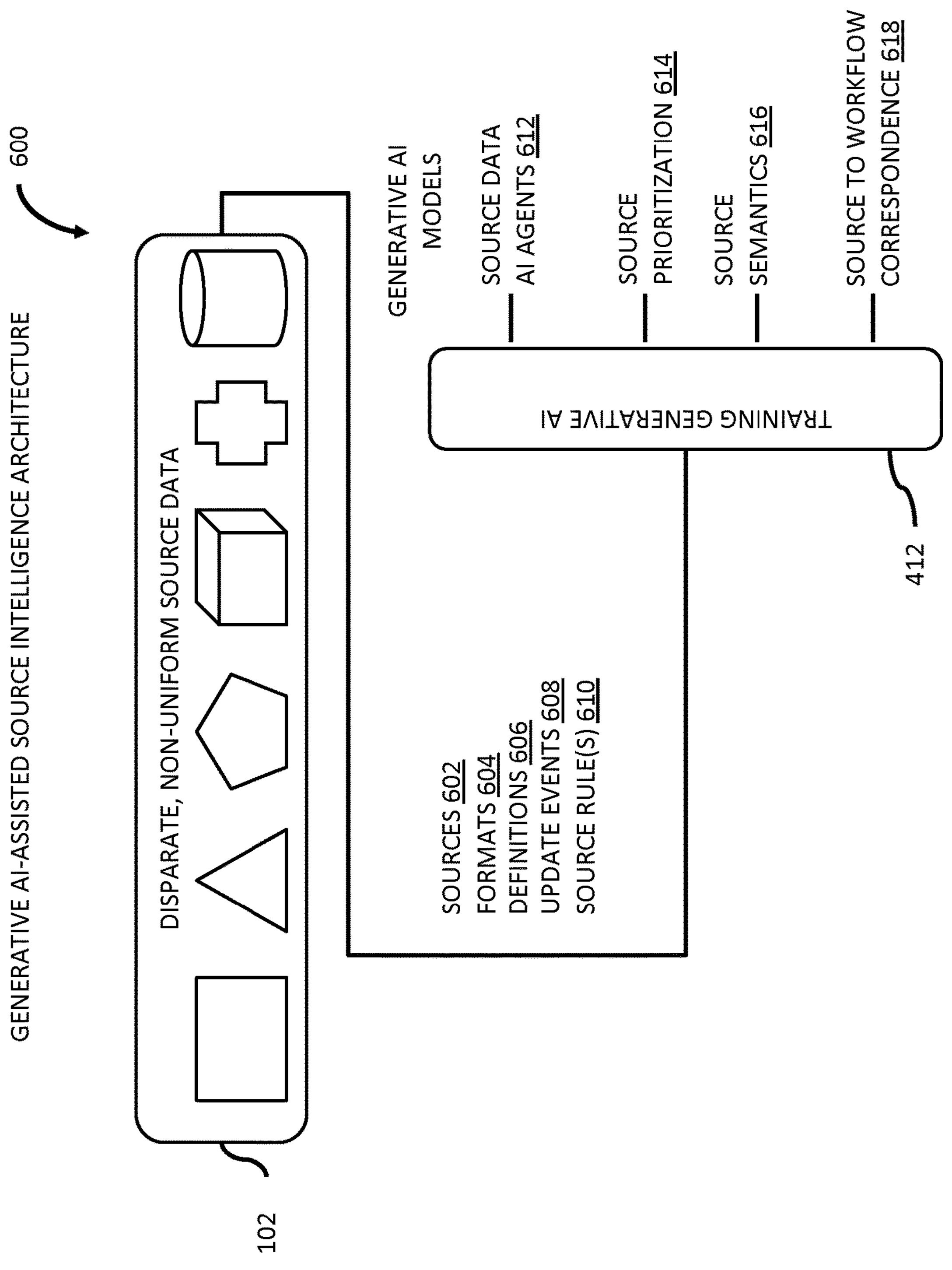
FIG. 6 depicts a block diagram of a generative AI-assisted source integration architecture.

FIG. 6 illustrates a generative AI-assisted source-intelligence architecture in which disparate, non-uniform source data 102 is analyzed, structured, and semantically interpreted to support guided-analytics workflows. The FIG. 6 depicts a training generative AI environment that uses source-level metadata, rule structures, and semantic variations to improve source prioritization, workflow mapping, and downstream analytic reasoning. The architecture emphasizes how generative AI models interact with source-specific attributes to infer relationships, detect update patterns, and align source semantics with operational workflows.

The disparate, non-uniform source data 102 represents heterogeneous data originating from multiple operational systems, file formats, streaming inputs, and diverse enterprise sources. The source data 102 includes structured, semi-structured, and unstructured elements that may require identification, normalization, and rule assignment prior to integration with analytic pipelines.

At a next hierarchical level, a set of source-intelligence attributes includes sources 602, formats 604, definitions 606, update events 608, and source rules 610. The sources 602 represent identifiers or classifications of individual data-origin points. The formats 604 describe structural and syntactic representations associated with each data source. The definitions 606 specify semantic interpretations, data-type associations, or domain-context descriptions. The update events 608 indicate change triggers, refresh intervals, or temporal-update characteristics of each source. The source rules 610 represent explicit or inferred constraints, validation rules, and transformation requirements associated with the source data 102.

A training generative AI module 412 consumes the source-intelligence attributes 602 through 610 and uses them as training signals for the generative AI models 402. The generative AI models 402 apply supervised, unsupervised, or reinforcement-learning techniques to infer source-level semantics, detect correlation patterns, generate prioritization schemes, and produce source-aware workflow recommendations.

At a next hierarchical level, the architecture includes source data AI agents 612 representing specialized agentic modules that interpret raw source metadata using generative AI-derived cues. The source prioritization 614 mechanism rates and orders source data according to relevance, entropy contribution, reliability, or alignment with analytic objectives. The source semantics 616 mechanism assigns semantic contextualization to source data, enabling alignment with domain models, KPI structures, or dimensional relationships.

The source-to-workflow correspondence 618 capability maps source-level attributes and inferred semantics to guided-analytics workflows generated by higher-level AI agents. The correspondence 618 ensures that source variations, update patterns, and semantic definitions are properly translated into workflow logic, navigation sequences, and page-generation criteria.

The training generative AI module 412, in conjunction with the generative AI models 402, refines the capabilities represented by 612 through 618 through iterative learning cycles. Collectively, the elements in FIG. 6 provide a generative AI-driven system for interpreting, prioritizing, and semantically aligning source data, thereby enabling more effective domain leaping, KPI computation, and guided analytic navigation across this agentic analytics platform.

Figure 7:
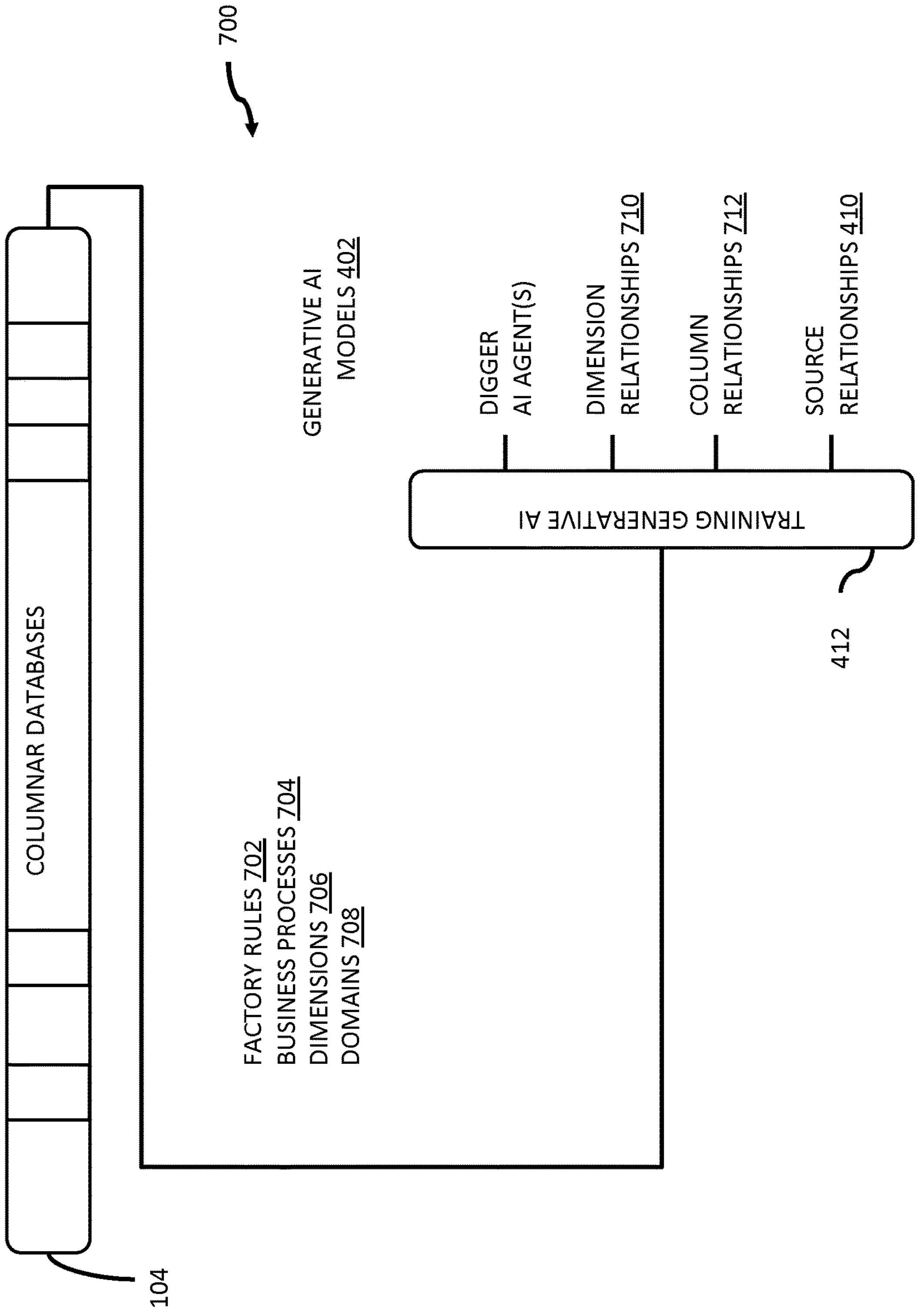
FIG. 7 depicts a block diagram of use of factory rules, processes, dimensions, and domains to train a plurality of generative AI models.

FIG. 7 illustrates an architecture in which generative AI training integrates enterprise operational structures, dimensional analytics, and columnar relationships to enhance analytic reasoning within a guided-analytics environment. The FIG. 7 depicts a flow in which factory rules, business processes, dimensions, and domains are ingested and interpreted through generative AI mechanisms that refine agentic behavior, dimensional inference, and source-relationship modeling. The architecture demonstrates how operational logic and domain structures contribute to the training cycles used by agentic analytics.

At the highest layer, the columnar databases 104 represent the structured storage substrate that organizes enterprise data into vertically decomposed records. The columnar databases 104 provide dimensionally consistent structures that are used across analytic engines, source-interpretation systems, and generative AI training cycles.

At a next hierarchical level, a set of enterprise and analytic structures includes factory rules 702, business processes 704, dimensions 706, and domains 708. The factory rules 702 represent operational constraints, system procedures, and repeatable workflow primitives defined within organizational processes. The business processes 704 correspond to operational sequences, transactional workflows, or functional activities modeled within the enterprise. The dimensions 706 provide analytical axes derived from domain data, user-defined attributes, or semantic structures extracted from the columnar databases 104. The domains 708 represent higher-level analytical categories or business contexts that group dimensions, metrics, and relationships.

A training generative AI module 412 processes the enterprise and analytic structures 702 through 708 to train the generative AI models 402. The training generative AI module 412 uses these structures as learning signals for deriving analytic rules, semantic constraints, dimensional transitions, and contextual inference capabilities.

At a next hierarchical level, the generative AI models 402 support multiple analytic-enhancing outputs, including digger AI agents 206, dimension relationships 710, column relationships 712, and source relationships 410. The digger AI agents 206 leverage generative AI training to enhance their ability to navigate workflows, evaluate dimensional transitions, and synthesize analytic outputs. The dimension relationships 710 represent generatively inferred links among dimensions 706 that describe analytic dependencies or cross-dimensional correlation patterns. The column relationships 712 represent generatively enhanced linkages among columnar structures, contributing to deeper semantic modeling of stored data. The source relationships 410 represent connections among disparate source datasets and source rules in a manner that refines source interpretation and data-flow alignment across workflows.

Together, the structures 702 through 712, along with the generative AI models 402 and training generative AI module 412, provide an integrated system in which enterprise operational logic, dimensional analytics, and columnar data structures inform generative AI training cycles. FIG. 7 demonstrates how both operational and analytic constructs contribute to the evolution of agentic intelligence, enhancing the system's ability to reason, adapt, and navigate within multi-domain analytical environments.

Figure 8:
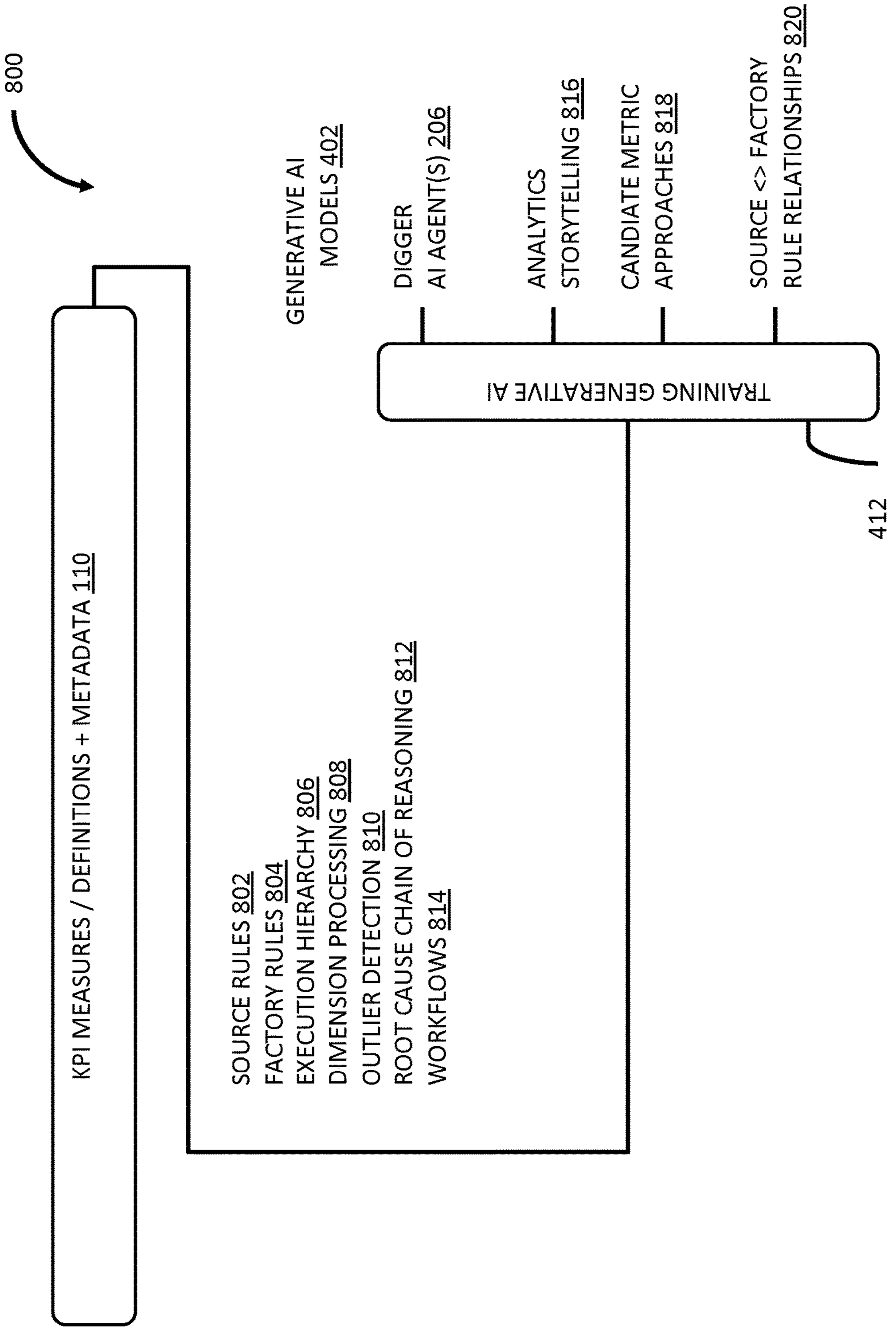
FIG. 8 depicts a block diagram of use of KPI measures, definitions, and metadata to train a plurality of generative AI models.

FIG. 8 illustrates a generative AI training architecture in which KPI metadata structures interact with enterprise rule frameworks, analytic workflows, and agentic reasoning modules to enhance metric generation, analytics storytelling, and source-to-rule interpretation. The FIG. 8 depicts the relationship between KPI metadata, operational rule systems, and generative AI outputs that refine analytic reasoning and metric construction within a guided-analytics environment.

At the highest layer, the KPI measures, definitions, and metadata 110 represent the analytic structures defined by the columnar array 104 and assisted-analytics modules (not shown). The KPI measures, definitions, and metadata 110 include KPI formulas, metric dependencies, semantic metadata, and analytic lineage used throughout the guided analytics architecture.

A set of enterprise and analytic constructs includes source rules 802, factory rules 804, execution hierarchy 806, dimension processing 808, outlier detection 810, root-cause chain of reasoning 812, and workflows 814. The source rules 802 represent validation requirements, transformation constraints, and semantic mappings associated with specific data sources. The factory rules 804 correspond to operational rules, workflow primitives, and repeatable business procedures. The execution hierarchy 806 represents structured execution sequences or layered analytic operations. The dimension processing 808 capability defines dimensional aggregation, dimensional derivation, and dimensional correlation behavior. The outlier detection 810 capability identifies anomalous behavior or data deviations based on KPI definitions and dimensional structures. The root-cause chain of reasoning 812 represents derived dependency paths that connect data anomalies or KPI deviations to explanatory causal factors. The workflows 814 include guided analytic operations, sequential domain transitions, and context-driven analytic flows.

A training generative AI module 412 processes the constructs 802 through 814 as training signals for the generative AI models 402. As part of its training cycles, the training generative AI module 412 evaluates rule patterns, workflow structures, dimension transformations, anomaly signals, and explanatory reasoning patterns to generate improved analytic capabilities across the system.

At a next hierarchical level, the generative AI models 402 produce multiple analytic enhancements, including digger AI agents 206, analytics storytelling 816, candidate metric approaches 818, and source-to-factory rule relationships 820. The digger AI agents 206 interpret generative AI outputs to support guided navigation, contextual reasoning, and cross-domain analytic interpretation. The analytics storytelling 816 capability synthesizes narrative explanations, insight summaries, and contextual descriptions from KPI metadata and enterprise rule systems. The candidate metric approaches 818 represent generatively derived KPI formulas, analytic transformations, or metric variations that extend the analytic capabilities of the metadata layer 110. The source-to-factory rule relationships 820 represent generatively inferred mappings between source-level structures and factory-level rules, enabling improved consistency between operational behaviors and analytic models.

Together, the structures 802 through 820, along with the KPI metadata 110 and generative AI systems 402 and 412, form an integrated architecture in which analytic rules, operational processes, and dimensional constructs contribute to iterative generative AI training cycles. FIG. 8 demonstrates how enterprise rule frameworks and KPI metadata collaboratively inform generative AI-based metric discovery, causal explanation, and analytic storytelling capabilities across the guided-analytics platform.

Figure 9:
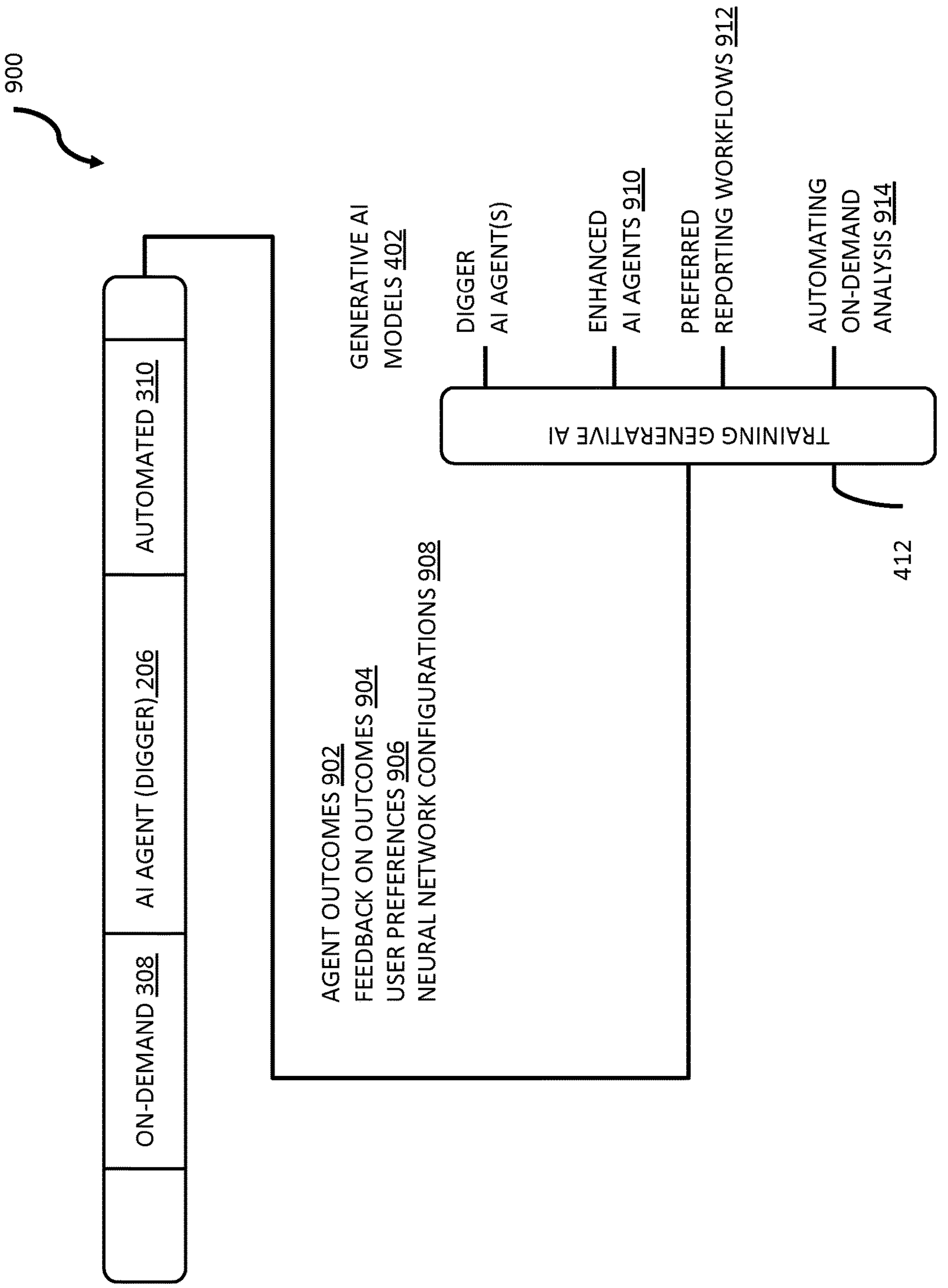
FIG. 9 depicts a block diagram of use of outcomes, feedback, user preferences, and digger modules to train a set of generative AI models.

FIG. 9 illustrates a generative AI training feedback architecture in which agentic outcomes, user behavior signals, and configurational parameters interact with the digger agent and its operational modes to produce enhanced analytic agents and adaptive reporting workflows. The FIG. 9 depicts how feedback loops, neural-network configuration patterns, and user-preference signals inform generative AI training cycles that refine both automated and on-demand operations within the guided-analytics platform.

The on-demand mode 308, AI agent digger 206, and automated mode 310 represent the primary operational states in which analytic reasoning is initiated or executed. The on-demand mode 308 corresponds to user-triggered analytic actions, whereas the automated mode 310 corresponds to system-initiated analytic behavior driven by predictive signals, workflow context, or generative AI inference. The AI agent digger 206 functions as the central reasoning mechanism that synthesizes navigation paths, evaluates analytic transitions, and interprets multi-domain relationships based on both user input and autonomous logic.

Several categories of training signals contribute to generative AI refinement: agent outcomes 902, feedback on outcomes 904, user preferences 906, and neural network configurations 908. The agent outcomes 902 represent the analytic results, navigation sequences, calculations, and insights produced by the AI agent digger 206 in either mode. The feedback on outcomes 904 includes acceptance signals, user corrections, workflow adjustments, or performance indicators reflecting how well analytic outputs aligned with user expectations. The user preferences 906 correspond to inferred or explicit indicators about presentation formats, metric selection, narrative depth, or navigation style. The neural network configurations 908 represent tunable architectural parameters or weighting patterns associated with underlying generative or agentic models.

A training generative AI module 412 processes the signals 902 through 908 and incorporates them into iterative generative AI training cycles. The training generative AI module 412 modifies generative modeling parameters, reward functions, or contextual embeddings to support improved analytic behavior, personalization depth, and workflow adaptation.

At a next hierarchical level, the generative AI models 402 produce expanded or refined analytic abilities including digger AI agents 206, enhanced AI agents 910, preferred reporting workflows 912, and automating on-demand analysis 914. The enhanced AI agents 910 extend or refine the baseline capabilities of the digger agent using the generative AI training signals 902 through 908. The preferred reporting workflows 912 represent adaptively generated analytic flows, sequence structures, or visualization arrangements tailored to historically observed user patterns. The automating on-demand analysis 914 capability represents generatively derived logic used to predict when an on-demand action should be automatically triggered based on context, preferences, or behavioral patterns.

Together, the elements 902 through 914, along with the operational modes 308 and 310, the AI agent digger 206, and the generative AI systems 402 and 412, establish a feedback-driven architecture in which observed agentic performance, user behavior, and neural-network parameters contribute to improved analytic reasoning, workflow adaptability, and automation potential. FIG. 9 demonstrates how continual feedback loops refine both agentic reasoning and on-demand analytical responsiveness within the guided-analytics ecosystem.

Figure 10:
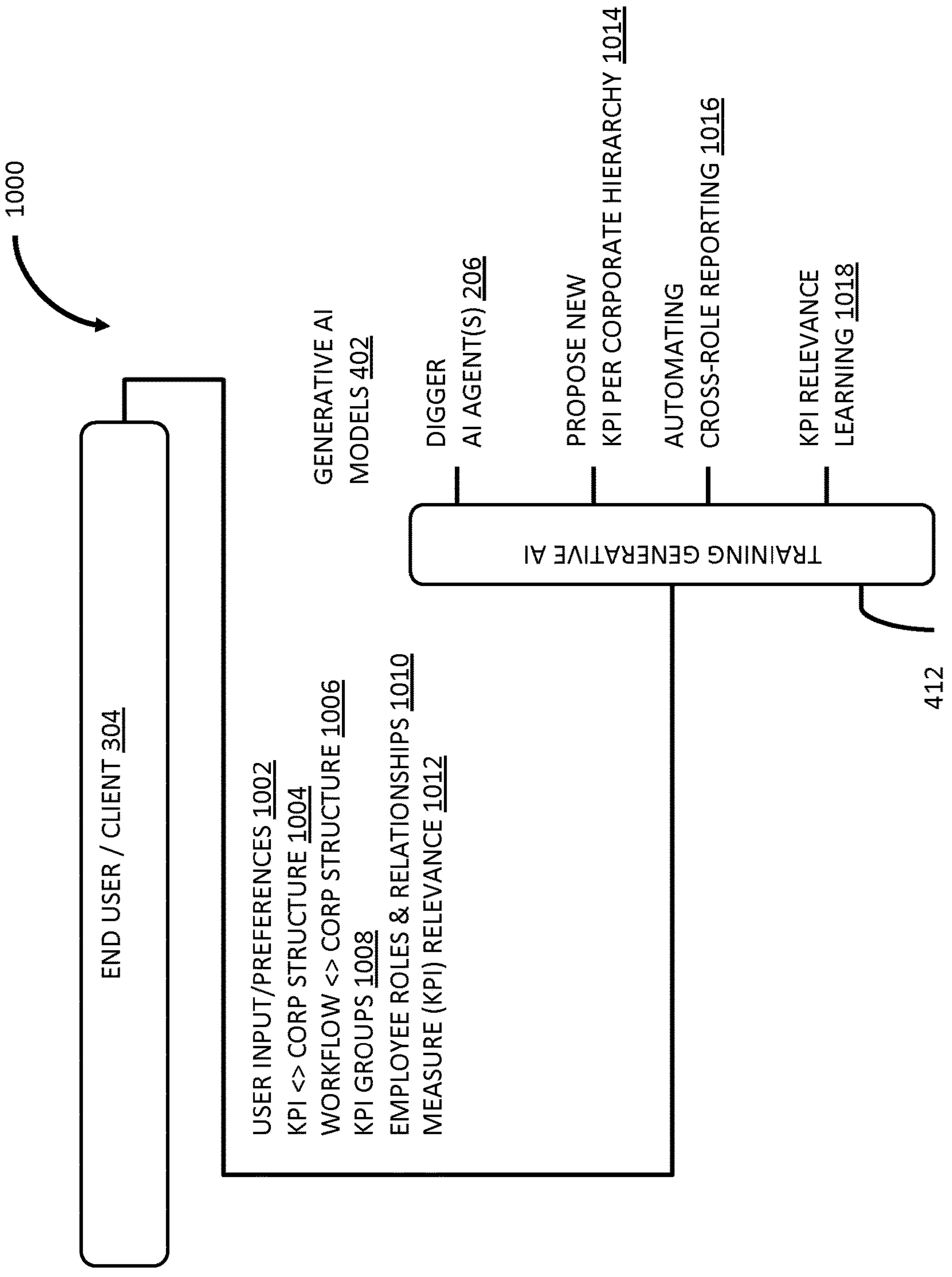
FIG. 10 depicts a block diagram of use of corporate structures, workflows, employee roles, relationships, KPI measures and the like to train a set of generative AI models.

FIG. 10 illustrates a generative AI-driven corporate-alignment architecture in which user preferences, organizational structures, KPI definitions, and employee-role relationships interact with agentic learning mechanisms to produce personalized metric structures and automated cross-role reporting. The FIG. 10 depicts how the generative AI training environment integrates hierarchical corporate information and user behavior to refine analytic relevance, propose new measures, and enhance the digger agent's reasoning across organizational contexts.

At a first layer, an end user or client interface 304 corresponds to an interface through which users submit preferences, role information, analytic inputs, or workflow directives. The interface 304 acts as the origin point for corporate-contextual signals that influence generative AI training and metric relevance calculations.

At another hierarchical level, several forms of organizational and analytic information contribute to generative AI training: user input/preferences 1002, KPI-to-corporate-structure relationships 1004, workflow-to-corporate-structure relationships 1006, KPI groups 1008, employee roles and relationships 1010, and measure (KPI) relevance 1012.

The user input/preferences 1002 represent stated or inferred user tendencies such as analytic priorities, layout choices, and domain interests. The KPI-to-corporate-structure relationships 1004 represent connections that tie specific metrics or metric hierarchies to organizational divisions, reporting lines, or functional hierarchies. The workflow-to-corporate-structure relationships 1006 correspond to guided analytic sequences aligned to corporate operational structures or inter-departmental processes. The KPI groups 1008 represent clusters or families of metrics organized by functional alignment, analytical similarity, or corporate relevance. The employee roles and relationships 1010 represent corporate-role hierarchies, team structures, or functional dependencies within the organization. The measure (KPI) relevance 1012 describes the contextual importance or utility of individual KPIs based on user role, workflow context, or corporate reporting requirements.

A training generative AI module 412 processes the structures 1002 through 1012 and uses them to refine the generative AI models 402. The training generative AI module 412 incorporates corporate hierarchies, metric relevance patterns, role-based preferences, and workflow structures into its training cycles to enable improved analytic interpretation, metric generation, and reporting automation.

The generative AI models 402 yield expanded analytic capabilities including digger AI agents 206, propose new KPI per corporate hierarchy 1014, automating cross-role reporting 1016, and KPI relevance learning 1018. The digger AI agents 206 leverage corporate-contextual generative outputs to adapt navigation paths, metric explanations, and analytic transitions to role-specific requirements. The propose new KPI per corporate hierarchy 1014 capability generates new or refined KPIs aligned to the structure of the organization, including departments, teams, and functional units. The automating cross-role reporting 1016 capability produces analytics that automatically reconcile differences in reporting needs between roles, departments, or corporate layers. The KPI relevance learning 1018 capability adapts and updates relevance scores for KPIs based on usage, corporate evolution, and user feedback patterns.

Together, the elements 1002 through 1018, along with the end user interface 304 and generative AI systems 402 and 412, form an architecture in which corporate structures, user preferences, and analytic metadata are integrated into generative AI training cycles. FIG. 10 demonstrates how organizational context enhances the digger agent's ability to interpret metrics, propose new analytic constructs, and automate role-aligned reporting within the guided-analytics environment.

Figure 11:
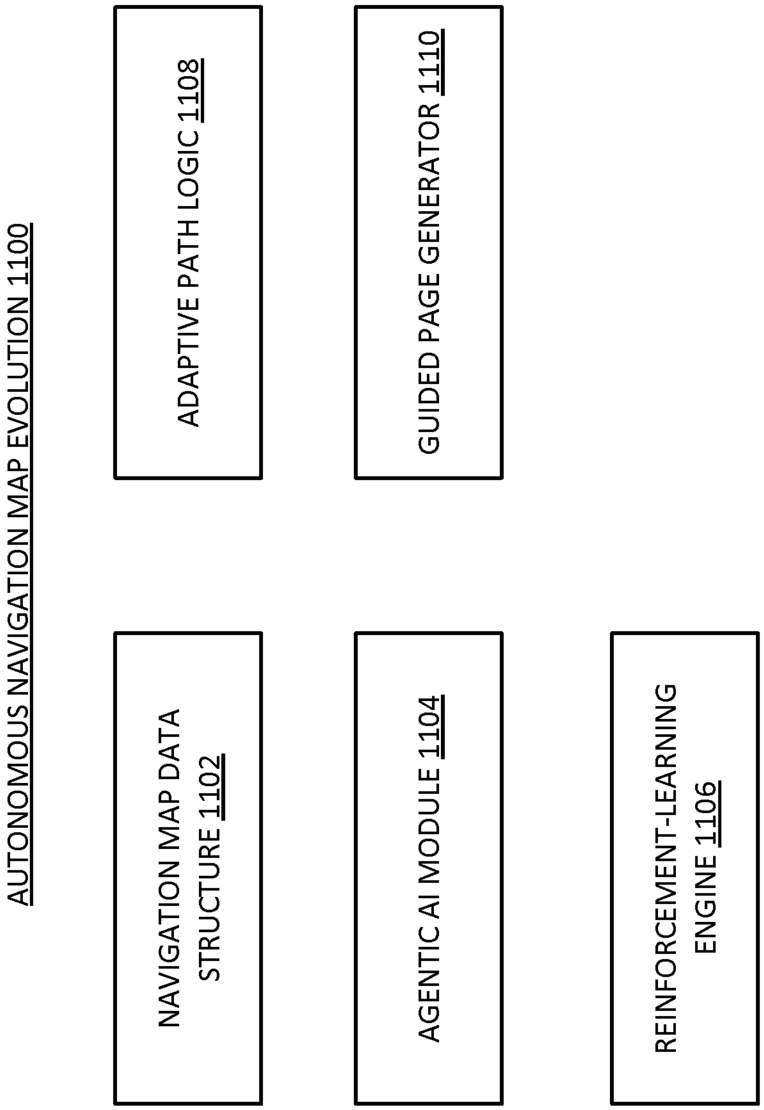
FIG. 11 depicts a block diagram of autonomous navigation map evolution.

Referring to FIG. 11, the following detailed description sets forth representative embodiments of systems, methods, and computer-readable media for autonomous navigation map evolution 1102 and related adaptive analytics techniques. In an embodiment, a self-training agent dynamically updates the navigation map based on learned entropy gain and contextual value, optimizing page sequences for discovery. These embodiments extend and enhance the functionality of the Guided Page Navigation (GPN) system disclosed the documents incorporated herein by reference, integrating Agentic AI Module 1104 capabilities, thereby creating a self-training, entropy-maximizing analytics environment. It will be appreciated that the features and components described herein may be implemented individually or in any operative combination, and that references to specific figures or modules from the documents incorporated herein by reference are illustrative and not limiting.

In embodiments, the guided navigation framework includes a Navigation Map Data Structure 1102 configured to represent a plurality of page nodes, each corresponding to a distinct analytical context, domain, or workflow. The navigation map 1102 may be realized as a graph, adjacency list, matrix, tree, or other relational model capable of expressing inter-node relationships and traversal sequences. Each page node may encapsulate metadata identifying a domain identifier, associated dimensions, relevant datasets, workflow triggers, and one or more transition parameters defining relationships to other nodes within the map. The navigation map 1102 governs guided transitions between analytical views, establishing hierarchical and cross-domain linkages. In the enhanced embodiment, the map may further include edge objects storing weight values, contextual attributes, or semantic association data. The navigation map 1102 may be persisted as an object-oriented schema in memory, a relational store, or a columnar database and may be dynamically modified by one or more AI components. Alternate embodiments include distributed or replicated navigation maps 1102 synchronized across multiple analytic devices or user sessions, and latent nodes generated by predictive AI models representing future or inferred analytical contexts. The map may further maintain version histories or checkpoints enabling rollback and audit of navigation evolution.

In certain embodiments, the Navigation Map Data Structure 1102 may be stored using a cache-aware hierarchical memory layout, where frequently accessed node-edge pairs are positioned within higher-speed cache regions to minimize traversal delay. The data structure may also utilize sparse-matrix encodings or compressed-adjacency formats that reduce memory-access overhead during graph traversals. These memory-optimization techniques allow the system to perform low-latency updates and queries without reconstructing or scanning the entire navigation topology.

During navigation-map updates, the system may selectively invalidate at least those adjacency entries, edge-weight objects, or node-relationship indicators that have changed due to new behavioral or contextual feature vectors. This targeted invalidation avoids recalculating global map structures and substantially reduces update-cycle computation time across large analytical topologies.

The analytics platform may include an agentic AI module 1104 configured to monitor, interpret, and learn from user interactions within the guided navigation environment. As described in regards to learning facilities, user selections, dwell time, query composition, and workflow transitions are collected as behavioral signals. The agentic module 1104 functions as an autonomous or semi-autonomous software agent operating locally, remotely, or across a distributed network. It generates a context model reflecting workflow stage, user role, and analytical intent, which may be continuously refined as interactions occur. The agentic module 1104 may maintain short-term memory for recent interactions and long-term learning memory for behavioral trends over time. In various implementations, multiple sub-agents cooperate to handle discrete functions such as context inference, domain correlation, or behavioral pattern recognition. These sub-agents may communicate via a shared message bus to form a composite agent network. The module 1104 may execute as part of the GPN runtime, a server process, or a federated agent pool integrated with other analytic engines in the platform. Alternative embodiments enable multi-user learning, wherein aggregated anonymized data across users or teams may be analyzed to enhance collective navigation optimization.

A reinforcement-learning engine 1106 may be operatively coupled to the navigation map 1102 to autonomously refine navigation behavior. Documents incorporated herein by reference disclose feedback-driven improvement of navigation guidance; the reinforcement-learning implementation formalizes this by associating reward values with navigation outcomes. Each possible transition between page nodes may be evaluated in terms of information-entropy gain—a quantification of informational novelty, diversity, or contextual relevance achieved through that transition. The reinforcement-learning engine 1106 may employ Q-learning, actor-critic, Bayesian, or hybrid algorithms, or alternative machine-learning models capable of policy optimization. Reward signals can derive from user feedback, completion of analytical tasks, data variance, or novelty of discovered relationships. The engine 1106 adjusts its transition policy to maximize cumulative entropy gain, thus directing users toward information-rich and non-redundant exploration paths. In other embodiments, supervised or unsupervised neural learning may approximate reinforcement learning, with loss functions constructed to minimize redundancy and maximize discovery diversity.

In some implementations, the reinforcement-learning engine 1106 may execute entropy-gain calculations using GPU tensor cores, vectorized SIMD instructions, or other parallel-numerical hardware accelerators. These hardware features enable rapid computation of reward functions and transition-weight updates, thereby reducing inference latency and improving overall responsiveness of the adaptive navigation subsystem.

In conjunction with the reinforcement-learning engine 1106, the system includes adaptive path logic 1108 configured to modify edge weights or paths in the navigation map 1102 based on learned results. The adaptive path logic 1108 may operate continuously, periodically, or upon detection of specific events, such as workflow completion or user feedback submission. Each edge connecting two nodes may be associated with a weight value representing the strength, confidence, or probability of that navigation path. As entropy-gain metrics are recalculated, edge weights are dynamically adjusted to favor high-value transitions. Edges with diminished significance may be suppressed or pruned, while new edges may be created to represent emerging relationships discovered through AI inference. Alternative embodiments apply probabilistic or Bayesian routing in which edge weights are updated through posterior estimation based on observed interaction frequencies. The adaptive path logic 1108 may further create virtual or latent nodes, merge or split nodes representing multi-domain intersections, and enforce threshold-based updates that may require statistical confidence prior to committing topological changes. Through these mechanisms, the navigation map 1102 continuously reorganizes itself into an optimized, knowledge-rich topology.

The system includes a page-generation engine 1110 that transforms the updated navigation topology into user-facing guided pages. The page-generation subsystem 1110, as illustrated in figures of the documents incorporated herein may assemble guided pages using stored templates, rules, or generative AI models. Each generated page can incorporate analytical visualizations, KPI metrics, and workflow controls relevant to its domain. When the navigation map 1102 changes, the page-generation engine 1110 regenerates affected pages, updating inter-page links and guidance prompts accordingly. In some embodiments, the engine performs predictive or anticipatory rendering, preloading guided pages most likely to be accessed next. Alternative embodiments integrate natural-language narrative generation to produce textual explanations or storytelling summaries describing why a given path was prioritized. Generated pages may be synchronized across desktop, mobile, and embedded interfaces, and may also be exposed via APIs for third-party analytics systems.

To further reduce user-interface latency, the page-generation engine 1110 may maintain a predictive cache of prerendered interface fragments, such as visualization components, KPI tiles, or navigation headers. These fragments are generated based on predicted next-step transitions and can be assembled at runtime using lightweight composition operations, allowing the interface to render updated guided pages with minimal computation.

In an example, the navigation map 1102, agentic module AI 1104, learning engine 1106, adaptive path logic 1108, and page-generation engine 1110 may collectively function as an information-entropy-adaptive analytic network. The system establishes a closed feedback loop wherein observed behavior informs learning, learning alters the navigation topology, and new topology definitions generate updated user experiences. Over successive iterations, this self-evolving network maximizes contextual discovery efficiency and overall information entropy. In embodiments, the adaptive cycle executes continuously within a single analytics instance. In another, multiple distributed instances participate in a federated learning arrangement, each contributing localized training updates that collectively inform a global navigation model. This architecture permits cross-enterprise intelligence sharing without requiring centralization of underlying data.

A corresponding computer-implemented method executes the adaptive navigation process. The method includes receiving user interaction data, maintaining a navigation map 1102 comprising page nodes and edges, computing entropy-gain values for possible transitions, updating navigation paths based on learned results, and generating revised guided-navigation sequences. These operations may be performed asynchronously or synchronously and can be executed on one or more processors, servers, or distributed nodes.

During execution, the navigation map 1102 may be defined and maintained as a graph-based structure in memory or persisted as records in a database. Each node record stores identifiers for domain dimensions, KPIs, and workflow contexts, while each edge record stores weight values, confidence levels, and timestamps of last modification. The map can be serialized for transfer to client devices or replicated across analytic servers to ensure consistent guided-navigation behavior across a multi-user deployment.

The method further comprises agentic AI module 1104 to develop contextual profiles. Data such as page selections, applied filters, search queries, and dwell time are captured to determine user intent and workflow stage. The system may maintain separate short-term interaction memory and long-term behavioral models to balance immediate responsiveness with historical insight. In multi-user configurations, context information can be aggregated to provide cross-user learning, improving accuracy of predictive navigation for collaborative teams.

The adaptive method applies reinforcement learning 1106 to evaluate potential navigation transitions. Each edge may be assigned a reward signal reflecting its contribution to information entropy or user satisfaction. In certain embodiments, entropy may be computed using Shannon entropy, variance-based heuristics, or divergence metrics that measure informational novelty. The reinforcement-learning engine 1106 adjusts navigation policy parameters to maximize expected cumulative entropy. The learning cycle can operate in real time using active user data or in offline training sessions using archived navigation logs.

Following entropy evaluation, adaptive path logic 1108 modifies edge weights or map structure accordingly. Updates may occur as incremental weight adjustments, probabilistic reweighting, or structural reconfiguration involving edge creation, removal, or rerouting. When confidence values fall below a threshold, edges may be pruned to maintain clarity of navigation. In predictive variants, new "virtual" nodes are generated to represent anticipated analytical contexts not yet explicitly instantiated in the data. Transactional or batch update mechanisms may be used to maintain atomicity across distributed instances.

Subsequent to topology modification, the system invokes a page-generation process 1110 to produce guided pages consistent with the updated map. Pages are rendered using template-driven or generative processes, populated with relevant data visualizations, KPIs, and contextual annotations. Predictive rendering may pre-load likely next pages to minimize latency. In some embodiments, a storytelling or explanation engine generates textual narratives summarizing insights along the optimized navigation path, thereby improving interpretability and decision-making value.

In extended embodiments, the monitoring, learning, modifying, and page-generation processes execute iteratively to create a continuous closed adaptive loop. Each iteration refines the system's understanding of user objectives, adjusts navigation topology, and regenerates analytical pages, leading to progressively higher information-entropy states. Iterations may occur in near-real time, at periodic intervals, or in response to specific triggers such as data refresh events or workflow completions. This adaptive process ensures that the guided navigation framework evolves alongside changing user needs and data landscapes.

Figure 12:
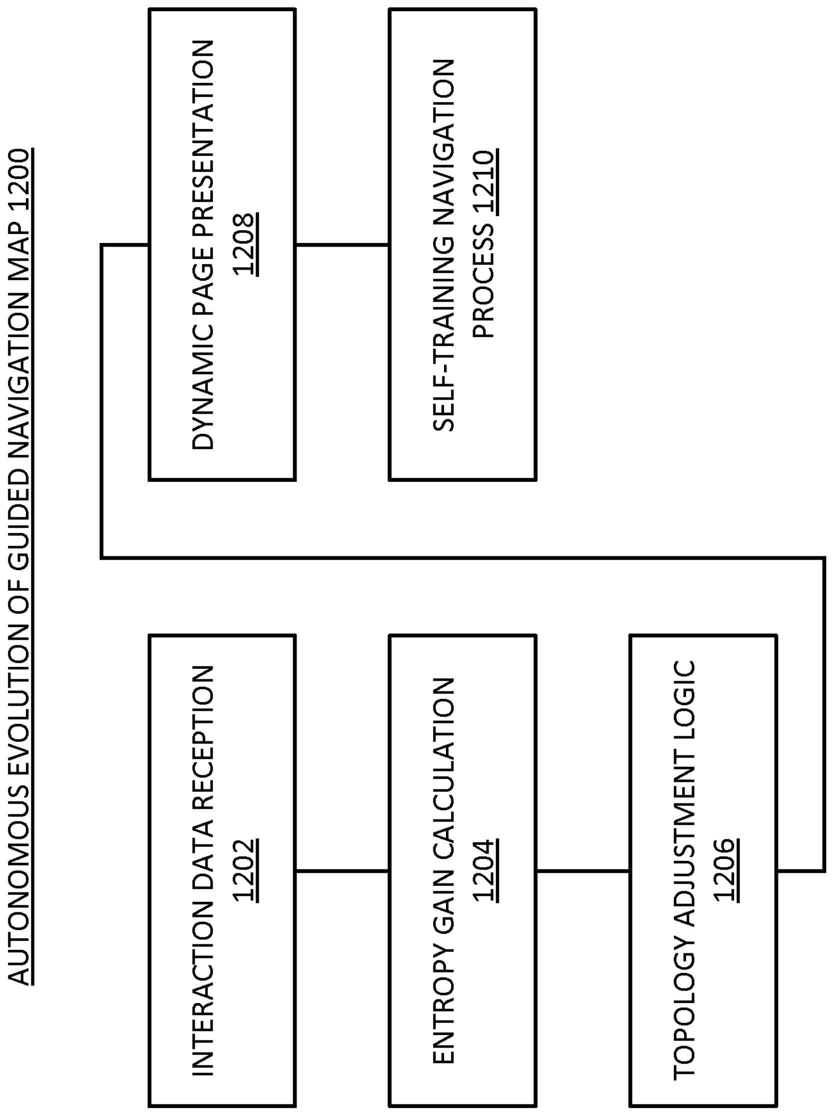
FIG. 12 depicts a flow diagram of autonomous evolution of guided navigation mapping.

The adaptive functionality may be embodied in a non-transitory computer-readable medium as depicted in FIG. 12 storing program instructions executable by one or more processors. The instructions, when executed, perform the operations of maintaining the navigation map 1200, monitoring interactions 1202, calculating entropy gain 1204, modifying topologies 1206, and presenting guided pages 1208 as described herein. The medium may include magnetic, optical, or solid-state memory, and may be distributed across multiple hardware components. Execution of the instructions causes the computing system to self-evolve its guided-navigation topology in real time, yielding a continuously learning and context-aware navigation process 320.

Alternative embodiments may substitute other forms of adaptive learning such as fuzzy-logic controllers, evolutionary algorithms, or contextual bandit systems in place of reinforcement learning while achieving similar entropy-optimization behavior. The navigation map may be coupled with external systems such as assisted analytics systems for KPI generation, or presentation modules for context-aware user interfaces. Additional embodiments may employ multi-agent collaboration protocols enabling multiple Digger AI instances to exchange entropy metadata and jointly optimize global discovery potential.

Through these embodiments, the described system provides a self-optimizing guided-navigation framework that continuously learns from user interactions and adapts navigation pathways to maximize informational entropy 1204 and discovery potential. By combining structural components of the architectures described in the documents incorporated herein with adaptive intelligence mechanisms introduced herein, the system evolves from a guided analytic platform into a generative, agentic cognitive framework capable of autonomous reconfiguration, predictive insight generation, and continuous self-improvement across analytical domains.

Figure 13:
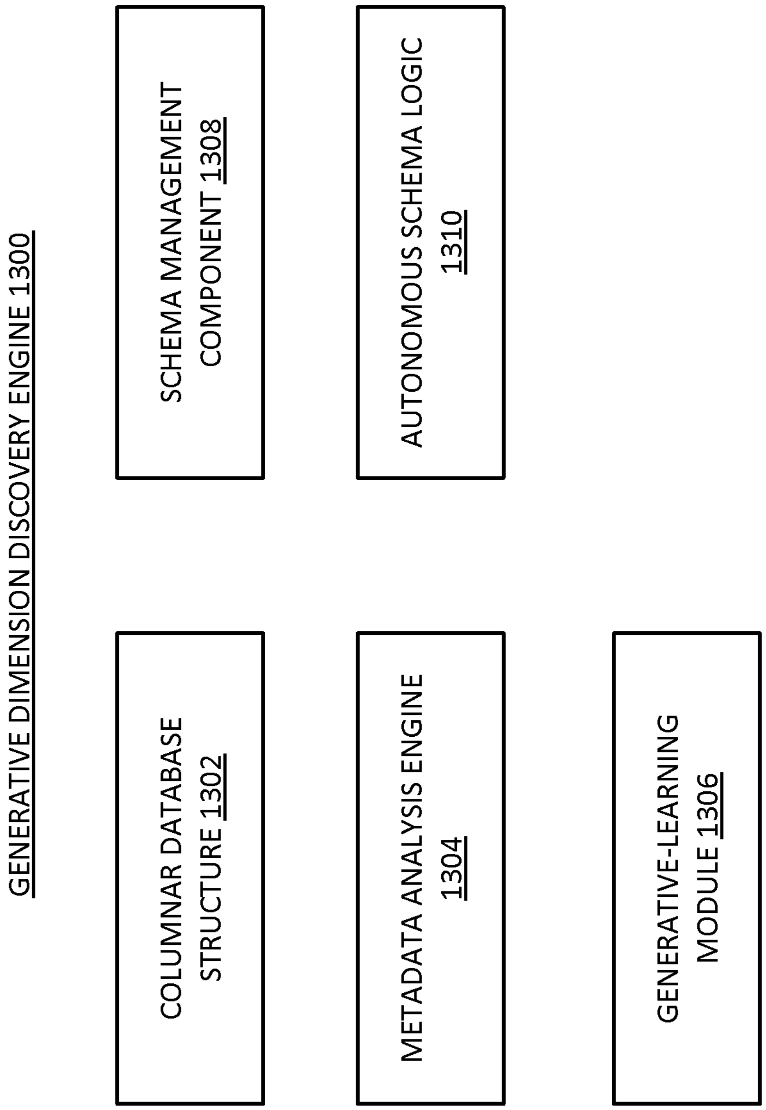
FIG. 13 depicts a block diagram of a generative dimension discovery engine.

Referring to FIG. 13, the following detailed description pertains to embodiments of a Generative Dimension Discovery Engine 1300 that autonomously analyzes metadata, columnar database structures 1302, and relational semantics to generate new analytical dimensions within a data analytics environment. This capability extends the Guided Page Navigation (GPN) framework described herein and/or in the documents incorporated herein and integrates the agentic and generative-learning module 1306 techniques described herein. Through such integration, the system enables the autonomous evolution of the analytical schema, producing new core and dynamic dimensions that increase analytical depth, improve model adaptability, and enhance overall information entropy.

In an exemplary implementation, guided analytics operations rely on pre-defined data dimensions and relationships encoded within columnar database structures 1302 or metadata repositories. While such dimensions are often sufficient for conventional analysis, they may not account for emergent relationships or domain-specific contextual features that arise over time. The Generative Dimension Discovery Engine (GDDE) 1300 addresses this limitation by employing AI-driven pattern discovery, generative synthesis, and entropy-based evaluation to propose, validate, and incorporate new dimension constructs automatically.

In embodiments, the GDDE 1300 includes a metadata analysis engine 1304 configured to extract and analyze metadata from a columnar database structure 1302. The metadata may include column definitions, data types, lineage records, update frequencies, and usage statistics reflecting how columns have been employed in prior analytical operations. The analysis engine 1304 parses this information to identify latent relationships among existing columns, such as correlations, dependencies, or semantic similarity. This analysis may employ statistical correlation methods, natural-language processing of metadata labels, or embedding-space similarity measures trained on prior domain data.

The GDDE further includes a generative-learning module 1306 responsible for synthesizing candidate dimension definitions. In various embodiments, this module 1306 may employ transformer-based, variational-autoencoder, or diffusion-model architectures, trained on historical schema data or observed analytical workflows. The generative module 1306 may combine, abstract, or transform existing column relationships to propose new dimension definitions. For instance, the module 1306 may detect that "physician experience level" and "patient risk score" together yield an emergent analytical construct such as "care-complexity index." Each proposed dimension may include a definition formula, a semantic description, and associated lineage metadata identifying contributing source fields.

Candidate dimension definitions produced by the generative-learning module may be packaged in a compact machine-readable schema format that aligns with internal memory structures used by the schema-management component. This reduces the conversion overhead typically required when introducing new schema entities and allows candidate dimensions to be validated or instantiated with minimal computational delay.

Once a set of candidate dimensions is generated, a schema-management component 1308 evaluates each candidate using one or more entropy-based or predictive metrics. The evaluation may include calculating an information-entropy gain score to measure the diversity or novelty introduced by the new dimension or testing predictive improvement against existing analytical models. Additional metrics may include understandability, correlation strength, or data coverage. The schema-management component 1308 may promote validated candidate dimensions to active schema status when thresholds for performance or entropy gain are satisfied. Alternatively, candidates may be retained in a provisional state pending review or additional training data.

When instantiating validated dimensions, the system may modify at least the affected schema-registry entries and localized columnar-metadata blocks rather than regenerating full dimension tables. This selective-update approach enables real-time schema evolution suitable for high-performance analytic environments and minimizes disruption to ongoing query processing.

In certain embodiments, a governance layer records the provenance and lineage of every generated dimension, maintaining audit information such as originating columns, generative-model version, evaluation results, and timestamps. This governance data supports traceability and regulatory compliance, ensuring that autonomous schema evolution remains transparent and reversible. The system may also include a human-in-the-loop interface enabling domain experts to review, merge, rename, or reject AI-generated dimensions. Expert feedback may be captured as reinforcement signals used to retrain the generative model 1306, thereby improving alignment between AI-discovered constructs and human analytical intuition.

The GDDE may operate in conjunction with the broader agentic AI 1104 framework described herein. In such embodiments, the generative module 1306 operates as a specialized agent within the Digger AI network. This agent collaborates with other domain-specific agents, such as the navigation optimization agent and KPI storytelling agent, to ensure that newly generated dimensions are immediately available for guided-page creation and cross-domain navigation. The interaction of these agents produces a self-reinforcing cycle: as new dimensions expand schema complexity, the reinforcement-learning engine 1106 discovers additional entropy-rich analytical paths, which in turn expose new opportunities for generative dimension synthesis 1306.

Alternative implementations may employ different AI strategies for dimension generation. In some variants, the GDDE uses genetic algorithms or evolutionary learning to evolve dimension formulas through iterative mutation and selection. In others, contextual bandit or active-learning models prioritize generation efforts toward data regions with high uncertainty or sparse coverage. Rule-based or symbolic-AI components may also be incorporated, enabling the system to encode domain-specific heuristics that constrain or guide generative outputs.

The method corresponding to operation of the GDDE may be summarized as follows. First, the system extracts metadata and column relationships from a columnar database 1302, including data-type definitions, lineage data, and prior usage statistics. Next, it identifies latent correlations among column pairs using similarity or information-theoretic metrics, such as mutual information or cosine similarity of embedded metadata vectors, via the metadata analysis engine 1304. The generative model 1306 then proposes candidate dimensions that abstract, combine, or transform these column relationships. Each candidate dimension may be evaluated for entropy gain, predictive utility, and contextual relevance by the schema-management component 1308, and high-scoring candidates are autonomously integrated into the schema as new dimension objects through the autonomous schema logic 1310. The process may conclude with propagation of new dimension definitions to dependent analytics, dashboards, or data-discovery tools. Optionally, all generated dimensions are logged with full provenance metadata, including input sources, model parameters, and evaluation results.

In certain embodiments, the system may operate continuously, monitoring data-source changes and automatically initiating generative synthesis 1306 when new fields or correlations are detected. In other embodiments, it functions as an on-demand engine triggered by analytic events, user queries, or system-detected entropy thresholds indicating schema stagnation. The generative process 1306 can be scheduled or governed by policies specifying allowable frequency, validation authority, or required review before promotion to production through schema-management component 1308.

In some embodiments, schema-update operations may be executed using vectorized schema-modification routines that operate directly on in-memory columnar blocks. These routines may adjust metadata, lineage structures, or dimension registries without re-materializing full tables. By applying localized schema-extension logic, the system reduces schema-evolution latency and avoids high-cost reorganization operations typically associated with large columnar-store modifications.

Additional variations enable federated or distributed dimension discovery across multiple organizations or data environments. In such cases, local GDDE instances may perform domain-specific learning on private data while contributing anonymized model parameters or entropy statistics to a shared global model. This approach allows global schema evolution and cross-domain learning without direct sharing of sensitive data.

The generative dimension discovery process 1306 may also be combined with the reinforcement-learning navigation engine 1106 described above, forming a two-tier adaptive system. The navigation engine identifies entropy-rich analytical pathways and highlights under-represented domains, while the generative engine responds by synthesizing new dimensions that expand those domains' analytical capacity through autonomous schema logic 1310. Together, these subsystems create a continuous feedback cycle that drives schema innovation and cross-domain knowledge expansion through the coordinated operation of 1300.

Figure 14:
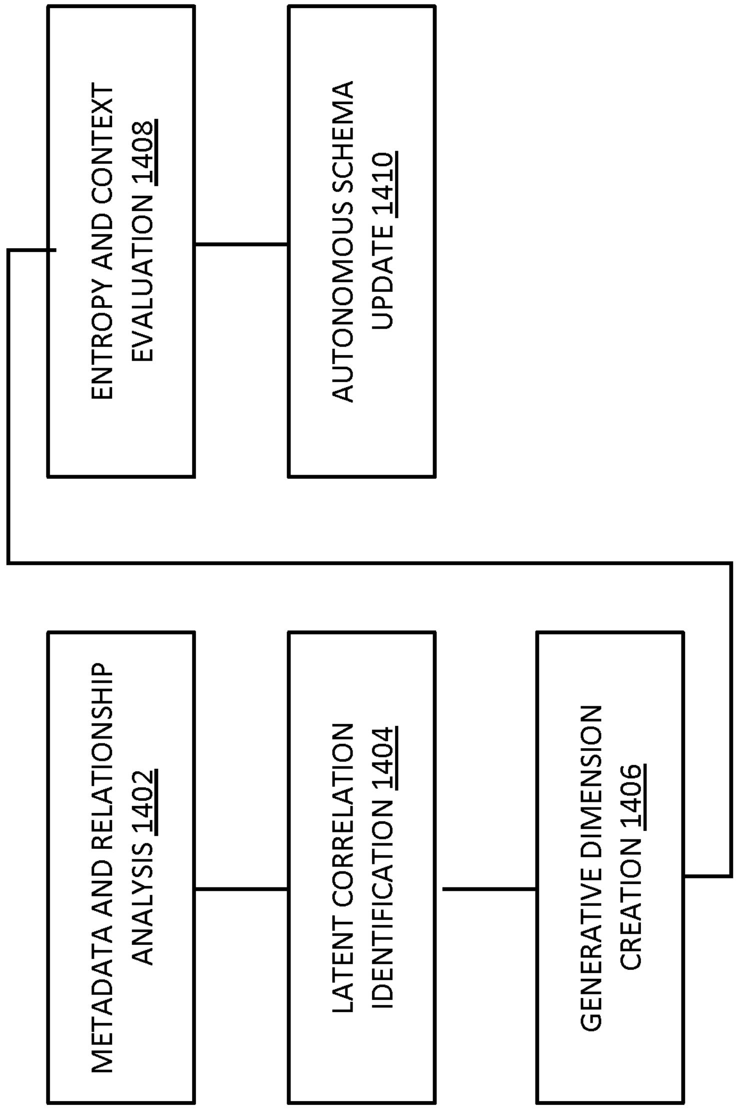
FIG. 14 depicts a flow diagram of generative dimension discovery.

The described methods and systems may be embodied as software, hardware, or hybrid implementations. A non-transitory computer-readable medium embodied in FIG. 14 may store instructions executable by one or more processors to perform the operations of metadata extraction 1402, latent-correlation analysis 1404, generative dimension synthesis 1406, evaluation 1408, schema update 1410, and governance recording. The underlying database structures may include columnar stores, relational tables, or graph-based schemas, and communication among system components may occur through APIs, message queues, or publish-subscribe frameworks.

Metadata-extraction routines may employ hardware-optimized vector operations to process lineage vectors, semantic embeddings, or usage-frequency matrices in parallel. By distributing correlation-analysis workloads across GPU kernels or SIMD pipelines, the system reduces the time required to compute latent relationships and prepare feature sets for the generative-learning module. This configuration enables low-latency preparation and rapid evaluation of candidate dimension structures.

Through these embodiments, the Generative Dimension Discovery Engine 1400 extends the guided page capabilities by enabling self-evolving analytical schema construction. By coupling metadata intelligence, generative modeling, and entropy-driven validation with autonomous schema logic, the engine continuously expands the system's ability to interpret and correlate disparate data sources. The result may be a continuously learning analytical substrate that augments human-defined schema with AI-discovered structure, thereby enriching the overall informational entropy and contextual awareness of the platform.

Figure 15:
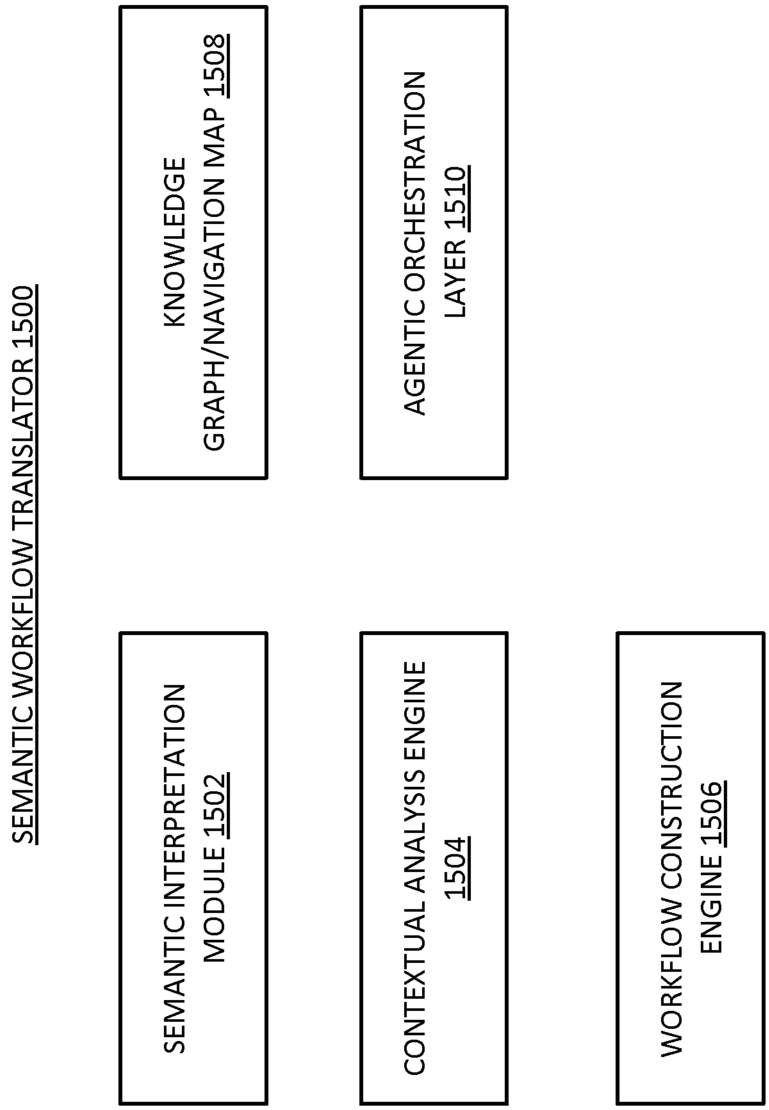
FIG. 15 depicts a block diagram of a semantic workflow translator.

Referring to FIG. 15, a semantic workflow translator system is depicted. The following detailed description relates to embodiments of a Semantic Workflow Translator SWT 1500 configured to interpret human-readable, natural-language instructions and to translate those expressions into structured analytical workflows executable within the Guided Page Navigation GPN and agentic AI framework. The SWT extends the capabilities of the GPN architecture by enabling direct natural-language control of guided analytic navigation, effectively allowing users to "speak or type workflows" that are automatically converted into machine-executable guided-page sequences. In this manner, the SWT operates as a semantic bridge between human cognitive expression and machine-driven analytical reasoning.

In a representative embodiment, the Semantic Workflow Translator 1500 comprises a semantic interpretation module 1502 that receives a user query or instruction expressed in natural language. The input may take the form of typed text, speech-to-text conversion, or other dialogic input. The semantic interpretation module 1502 employs natural language understanding NLU techniques to generate a structured intent representation, identifying analytical actions such as "compare," "forecast," or "rank," target metrics or KPIs such as "revenue growth" or "inventory turnover," and domain references such as "supplier performance" or "regional sales." The module 1502 may implement transformer-based language models, recurrent neural networks, symbolic parsers, or hybrid neuro-symbolic architectures that combine deep learning with rule-based semantic logic. The intent representation may be stored as a structured object or knowledge-graph fragment containing both syntactic and semantic tokens.

Coupled to the semantic interpretation module 1502 is a contextual analysis engine 1504 configured to interpret the semantic tokens in the context of a domain ontology or metadata catalog. In embodiments, the ontology may be derived from a dimensional model, comprising definitions of data domains, KPIs, relationships, and workflows. The contextual analysis engine 1504 maps recognized entities to ontology elements, disambiguates homonyms or abbreviations using session context, and resolves references to previously defined analytical constructs. The engine 1504 may also infer unstated dependencies, such as identifying that "margin drop" refers to a calculated KPI derived from "revenue" and "cost" dimensions. In some variants, the contextual analysis engine 1504 consults the agentic knowledge graph 1508, integrating context from other modules such as KPI GenAI or Domain Leaping GenAI.

Once contextual resolution is achieved, a workflow construction engine 1506 generates a structured navigation sequence or guided-page workflow corresponding to the interpreted intent. The workflow construction engine 1506 may employ rule-based planning, graph traversal, or generative sequencing models to determine the ordered set of guided pages that collectively fulfill the user's analytical objective. Each step in the workflow may be represented as a node within the navigation map 1508, associated with metadata including analytical operations, input parameters, and visualization requirements. The workflow construction engine 1506 may assign confidence scores or entropy-gain estimates to each generated transition, reflecting the system's assessment of contextual completeness or discovery potential. Alternative embodiments utilize reinforcement-learning agents trained to assemble workflow sequences that maximize task success and informational entropy.

The SWT further includes an agentic orchestration layer 1510 that coordinates execution of the generated workflow across multiple components of this analytic framework. The orchestration layer 1510 may invoke a page-generation engine to render guided pages corresponding to each workflow step, retrieve data from appropriate columnar or federated sources, and sequence the pages dynamically according to context. In some embodiments, the orchestration layer 1510 interacts with the autonomous navigation map 1102 evolution subsystem to optimize path selection based on historical success metrics or entropy gain. In other embodiments, the SWT interfaces with the Generative Dimension Discovery Engine 1306, requesting the creation of new analytical dimensions required to fulfill a previously unseen semantic intent.

The SWT may further include a feedback-learning component configured to improve translation accuracy through user interaction. As users accept, refine, or correct the generated workflows, the system records feedback signals representing the success or failure of the translation. These signals may be converted into reinforcement-learning rewards or may trigger fine-tuning of the semantic interpretation model 1502. Over time, the system adapts its vocabulary, context mapping, and workflow assembly logic to align with user preferences and domain-specific idioms. In enterprise deployments, collective user feedback can be aggregated to produce organizational language models that reflect company-specific terminology, abbreviations, and procedural norms.

In operation, a user might enter a command such as "show supplier risk trends by cost over the last quarter." The semantic interpretation module 1502 identifies the primary action "show," the subject "supplier risk," the modifier "by cost," and the time filter "last quarter." The contextual analysis engine 1504 resolves "supplier risk" to a predefined KPI dimension within the procurement domain and identifies "cost" as a secondary grouping dimension from the finance domain. The workflow construction engine 1506 then generates a navigation sequence that links a supplier-risk overview page to a cost-segmentation view, filtered to the most recent quarter. The agentic orchestration layer 1510 executes this sequence, dynamically generating guided pages and presenting the results to the user as an interactive analytic pathway. In another example, a user may enter "forecast next month's revenue for regions with declining margins," prompting the system to synthesize a cross-domain workflow linking sales, financial, and predictive-forecasting pages in sequence.

Alternative embodiments may vary the implementation of the semantic interpretation module 1502. Some systems may use symbolic linguistic parsers coupled with domain-specific grammars to construct intent representations deterministically. Others may use neural attention networks fine-tuned on enterprise workflow corpora, allowing robust handling of ambiguous or incomplete input. Similarly, the contextual analysis engine 1504 may operate on hierarchical knowledge graphs 1508 that integrate external ontologies or industry taxonomies, expanding the system's capacity to interpret cross-domain queries. In certain variants, the workflow construction engine 1506 may employ probabilistic planning algorithms, generating multiple candidate workflows ranked by confidence or entropy scores.

In addition to generating analytical workflows, the SWT may produce natural-language narratives explaining its reasoning process. A presentation module may render these narratives alongside the guided pages, providing transparency into how the user's request was translated into concrete analytical operations. For example, the narrative might state: "Your instruction was interpreted as a request to analyze supplier risk segmented by cost category for Q2 data. The workflow includes pages from Procurement and Finance domains linked through shared supplier identifiers."

In further embodiments, the SWT operates collaboratively with other agentic modules 1104. The Digger AI orchestrator may delegate sub-tasks to specialized agents-such as a KPI-generation agent to derive new metrics, or a domain-leaping agent to explore related data domains. These agents share contextual metadata through an entropy-governed collaboration protocol, ensuring coherent workflow generation across multiple analytic engines. The semantic translator thereby functions as the front-end linguistic interface to the broader agentic analytic system, enabling seamless translation from human cognitive expression to AI-optimized analytical execution.

From an implementation perspective, the SWT may be realized as software executing on one or more processors, as dedicated microservices within a cloud-based analytics platform, or as a hybrid local-cloud environment integrated with GPN components. The module may communicate through REST APIs or message buses with the navigation map, dimension engines, and page-generation subsystems. In some embodiments, the SWT may be embedded directly into the user interface, allowing interactive conversation with the analytics engine via text or voice, coordinated through the agentic orchestration layer 1510.

Figure 16:
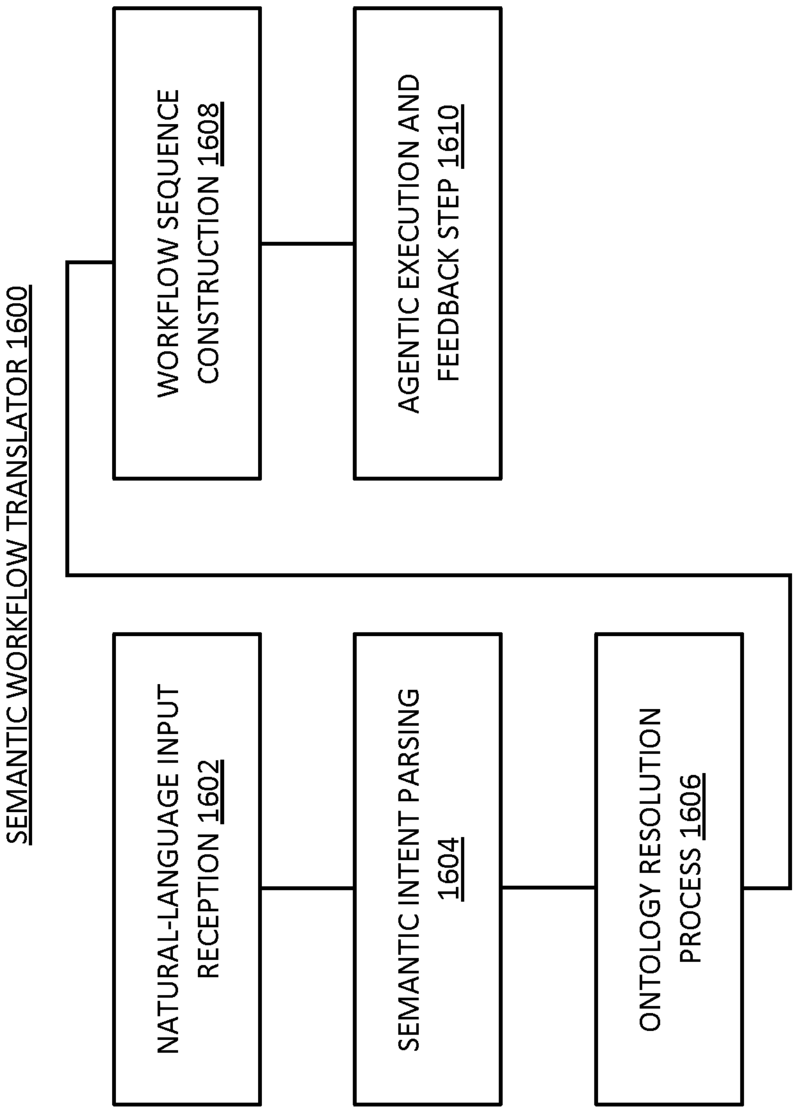
FIG. 16 depicts a flow diagram of semantic workflow translation.

A corresponding method embodiment depicted in FIG. 16 includes steps of receiving a natural-language query 1602, parsing it into a semantic intent representation 1604, resolving it against an ontology or metadata catalog 1606, constructing an ordered workflow sequence 1608, and executing that sequence through the agentic execution layer 1610. Optional steps include ranking alternative workflows, monitoring user feedback, updating language models, and producing explanatory narratives. Each iteration of workflow translation may yield entropy-gain metrics 1610 used to optimize future translation accuracy and analytical coverage.

Entropy-gain metrics, predictive-improvement scores, and correlation-strength values may be computed using hardware-accelerated numerical functions executed on GPU tensor cores or vectorized CPU instructions. These accelerators enable the schema-management component to evaluate large sets of candidate dimensions in parallel, improving throughput and reducing overall processing time for schema-evolution cycles.

Alternative embodiments may incorporate multilingual translation capabilities, enabling workflow interpretation across different human languages by aligning each to a unified semantic intent space 1604. Other embodiments may integrate ontology resolution 1606, wherein the system infers likely follow-up queries or next analytical actions based on conversational history, effectively constructing a dynamic, AI-curated dialogue of discovery.

Through these embodiments, the Semantic Workflow Translator establishes a key integration layer between natural-language cognitive processes and machine-driven analytics. By combining linguistic understanding, ontology mapping, and agentic orchestration, the SWT transforms human workflow intent into structured guided-analytics execution paths. The result may be an adaptive, explainable, and self-improving analytic interface that dramatically expands user accessibility and analytical creativity within this technology stack.

Figure 17:
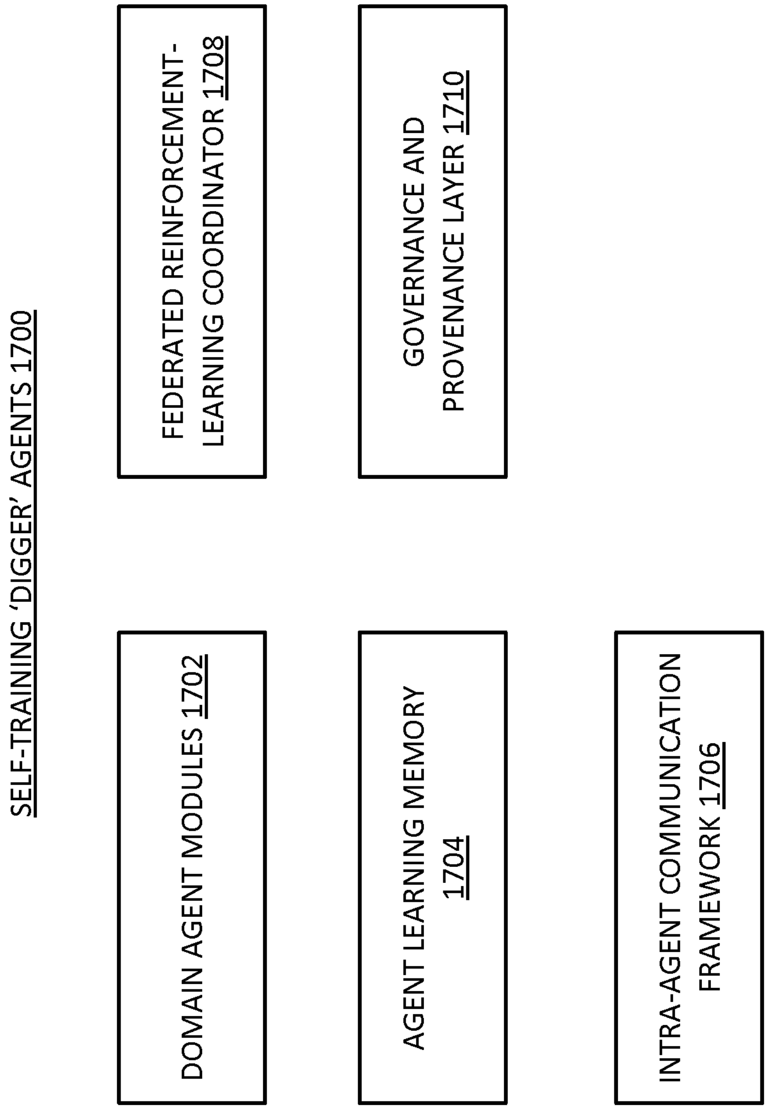
FIG. 17 depicts a block diagram of self-training digger agents.

Referring to FIG. 17, self-training digger agents are depicted. The following detailed description pertains to embodiments of Self-Training Digger Agents 1700 that autonomously learn, adapt, and collaborate within the Guided Page Navigation environment. These agents implement the agentic intelligence framework, extending it to provide distributed, federated learning and cooperative reasoning across multiple analytic domains. The self-training architecture enables continuous optimization of analytic discovery, navigation efficiency, and entropy expansion.

In embodiments, the system includes a plurality of specialized agent modules 1702, each configured to operate within a defined analytical context such as financial performance, supplier management, sales forecasting, or healthcare outcomes. Each agent functions semi-autonomously, learning local policies that optimize navigation and analysis within its domain. The agents collectively form an agentic swarm, capable of self-organization and knowledge sharing under the coordination of a federated reinforcement-learning coordinator 1708.

Each agent maintains a learning memory 1704 that captures both immediate and historical experience. The agent learning memory 1704 may include a short-term episodic buffer for recording current-session interactions such as user navigation paths, query structures, and page-level results, and a long-term policy repository for retaining cumulative learning parameters and reward histories. This two-tier memory structure allows the agent to respond adaptively in the moment while retaining strategic learning across multiple user sessions.

Agents communicate via an intra-agent communication framework 1706, which may employ message queues, publish-subscribe protocols, or asynchronous API calls. In some embodiments, communication messages carry learned model weights, reward signals, or entropy metrics. An entropy-weighted message-passing protocol can be employed to prioritize the exchange of knowledge that may be expected to yield the greatest improvement in collective discovery potential. For example, an agent discovering a novel KPI relationship may broadcast that finding to peer agents with high entropy value, enabling others to adapt their models to incorporate that insight.

A federated reinforcement-learning coordinator 1708 aggregates updates from the individual agents without requiring transfer of the raw data used in local training. Each agent transmits model gradients, policy parameters, or entropy statistics to the coordinator 1708, which performs a weighted aggregation to produce a refined global model. The updated global parameters are redistributed to each agent, allowing the local models to benefit from collective learning. This process enables system-wide improvement while preserving data privacy and security—an important consideration for multi-tenant or regulated deployments.

In certain embodiments, the system further includes a meta-learning agent responsible for supervising the learning process itself. The meta-learning agent may adjust hyperparameters such as learning rate, reward scaling, or collaboration weights between agents to improve convergence speed or avoid overfitting. The meta-agent may also evaluate agent diversity to ensure the collective system maintains a balance of exploration and exploitation across domains.

The governance layer 1710 provides auditability and oversight for all agent activities. Governance functions include logging agent interactions, recording model lineage, maintaining performance metrics, and verifying compliance with organizational or regulatory policies. Each training cycle and collaboration event may be timestamped and stored in an immutable ledger, enabling transparency and reproducibility of analytical decisions.

In operation, a typical training cycle proceeds as follows. Each Digger Agent 1700 observes user interactions within its domain—such as navigational choices, query results, or page dwell times—and computes reward signals based on defined objectives like entropy gain or user satisfaction. The agent then performs local reinforcement learning to update its policy. Periodically, the agent participates in a federated learning round, contributing its updated gradients to the coordinator 1708 and receiving the aggregated global model in return. Over successive rounds, the agents converge toward optimal navigation and discovery policies tailored to their respective domains yet informed by the collective experience of the network.

Alternative embodiments employ evolutionary or population-based learning, wherein multiple variants of an agent compete or cooperate to maximize entropy gain, with superior variants propagating to replace weaker ones. Other embodiments use contextual bandit frameworks to dynamically allocate exploration focus across agents based on real-time analytics demand. Agents may also share synthetic training data or compressed experience representations such as replay buffers to accelerate collective learning.

The self-training agent framework 1700 is designed for continuous operation, functioning as an always-learning background process within the GPN environment. When integrated with the Semantic Workflow Translator 1500 and Generative Dimension Discovery Engine 1300, Digger Agents 1702 provide autonomous reasoning that spans the full analytics stack: translating intent, generating new dimensions, optimizing navigation, and refining KPIs. Together, these components constitute an evolving analytic ecosystem that continually enriches its knowledge base and increases informational entropy.

From an implementation standpoint, each agent may execute as a containerized microservice or process, communicating through secured APIs with peer agents via the intra-agent communication framework 1706 and the federated coordinator 1708. The federated coordinator 1708 may be deployed centrally or distributed across nodes. The framework 1706 supports scalable horizontal expansion—new agents can be added for emerging domains without retraining the entire network. Communication security may be ensured through encryption, differential privacy, or homomorphic parameter exchange, preventing exposure of proprietary data during learning.

Figure 18:
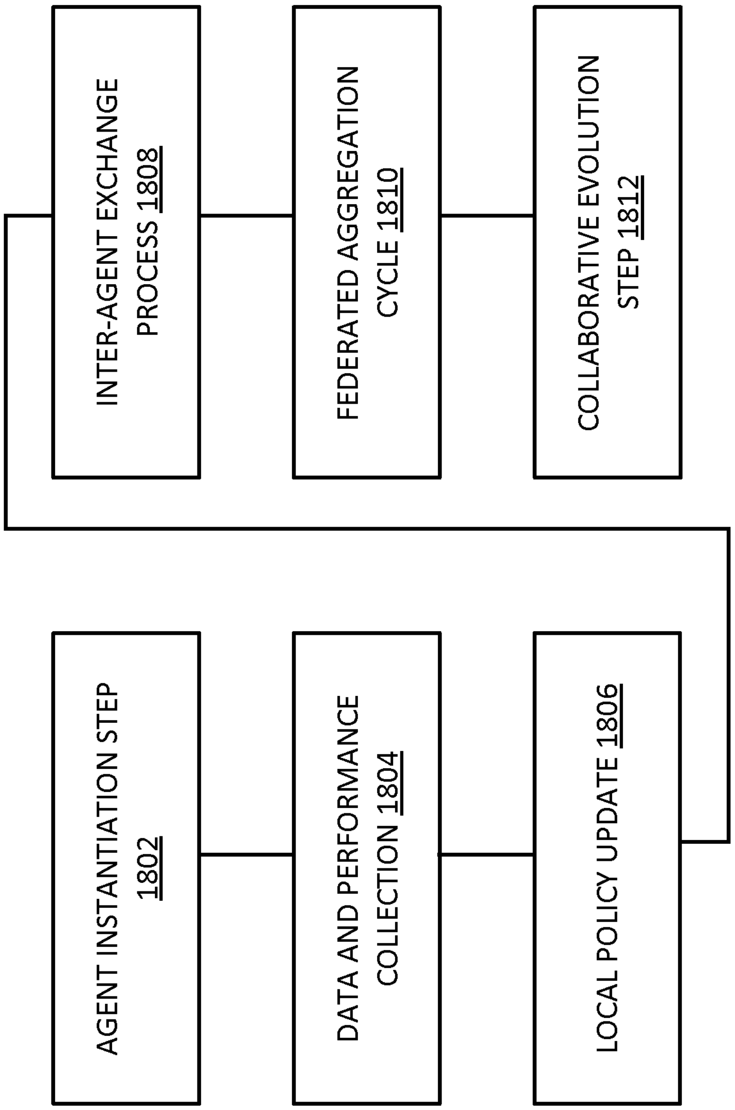
FIG. 18 depicts a flow diagram of self-training digger agents.

A corresponding method embodiment depicted in FIG. 18 encompasses instantiating multiple agents 1802, collecting experience data 1804, performing local policy updates using reinforcement or self-supervised learning 1806, exchanging model updates through the communication framework 1808, aggregating updates via federated coordination 1810, and redistributing refined policies to agents 1812. The method optionally includes weighting contributions according to entropy metrics, pruning under-performing agents, and maintaining comprehensive governance metadata.

Alternative embodiments provide hierarchical agent architectures, where higher-level agents reason about strategy or meta-policy while lower-level agents handle specific analytic tasks. In other variants, agent collaboration may extend beyond a single organization through secure cross-enterprise federations, allowing multiple entities to benefit from shared model evolution while retaining data confidentiality 1812.

Through these embodiments, the Self-Training Digger Agent 1800 architecture delivers a continuously adaptive analytic intelligence fabric. It distributes learning across specialized AI agents that autonomously evolve, share insights, and refine their collective intelligence without explicit programming. By integrating this federated, entropy-weighted learning paradigm with the Guided Page Navigation and agentic AI 1104 systems, the result establishes a foundation for a self-organizing, ever-improving analytic environment capable of perpetual discovery and knowledge expansion.

Figure 19:
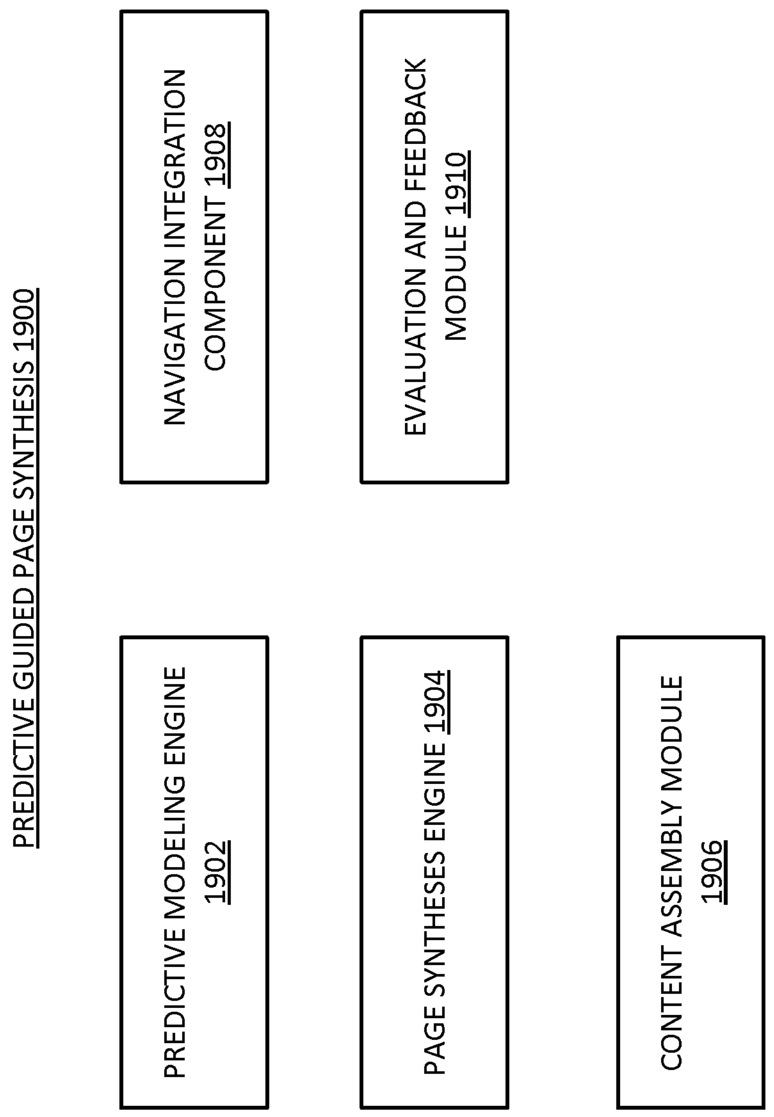
FIG. 19 depicts a block diagram of predictive guided page synthesis.

Referring to FIG. 19 methods and systems of predictive guided page synthesis are depicted. The following detailed description pertains to embodiments of a Predictive Guided Page Synthesis 1900 subsystem that anticipates user analytical needs and autonomously generates guided pages in advance of explicit requests. The PGPS module 1900 extends the Guided Page Navigation GPN framework and leverages the agentic AI 1104 orchestration concepts defined herein. By predicting user intent and generating corresponding analytic content pre-emptively, the system enhances analytical flow, reduces latency, and increases informational entropy within the overall analytic ecosystem.

In embodiments, the PGPS system includes a predictive modeling engine 1902 trained on historical navigation data, user interaction logs, and domain-specific metrics. The engine 1902 may employ machine-learning architectures such as time-series models, recurrent neural networks, transformers, or graph neural networks. The model learns to forecast probable next analytical actions, such as the next guided page to visit, the next KPI to explore, or the next domain to traverse. Predictions may be based on contextual features including recent queries, session history, workflow stage, and detected anomalies in data trends.

Coupled to the predictive modeling engine 1902 is a page-synthesis engine 1904 responsible for generating guided pages corresponding to predicted analytic needs. The synthesis engine 1904 may operate using template-driven assembly, drawing from predefined page blueprints described in the documents incorporated herein, or may employ generative AI to design new page compositions dynamically. Generative methods may utilize transformer or diffusion models trained on historical page designs and KPI hierarchies, enabling the system to create entirely new layouts or visualizations. Each synthesized page includes metadata specifying its domain context, data sources, dimensions, and intended analytical purpose.

A content-assembly module 1906 populates the generated page with the appropriate datasets, KPIs, charts, and narrative elements. Data retrieval may occur from columnar stores, domain APIs, or data-lake connections. The module 1906 ensures that the data populating the predictive page reflects the most current state of the system at the time of synthesis. In certain embodiments, the module 1906 incorporates real-time data streams or predictive KPI calculations derived from the agentic AI 1104 subsystem.

The PGPS integrates its outputs into the broader GPN architecture through a navigation integration component 1908. This component 1908 registers each newly synthesized guided page as a node within the existing navigation map, assigning a relevance score or entropy-gain value. These scores may be computed based on the novelty of information provided, the expected user benefit, or historical acceptance rates of predictive pages. Pages predicted to yield higher entropy or discovery potential are prioritized within the navigation sequence. Lower-value predictions may be retained in a staging state until validated by user engagement.

To refine its predictive accuracy, the system employs an evaluation and feedback module 1910 that monitors user interactions with synthesized pages. Metrics such as time spent, subsequent navigation choices, and explicit user feedback are analyzed to generate reward signals for the predictive modeling engine 1902. These reward signals support continuous reinforcement learning, allowing the predictive model to adjust its forecasting policy over time. In embodiments, feedback weighting may be entropy-proportional, so that interactions yielding higher informational diversity exert stronger influence on model updates.

Predictive page generation may be triggered in several ways. A contextual trigger subsystem can monitor system events such as data-refresh cycles, workflow transitions, semantic-intent cues from the Semantic Workflow Translator 1500, or threshold crossings in monitored KPIs. When such events occur, the subsystem invokes the predictive modeling engine 1902 to forecast new analytical directions and initiate page synthesis 1904. This mechanism allows the PGPS 1900 to operate both reactively in response to changing data and proactively anticipating user needs.

Alternative embodiments implement hierarchical prediction architectures, where short-term models forecast immediate next actions while long-term models anticipate strategic analytical objectives. Other variants integrate probabilistic planning or Monte-Carlo sampling to explore multiple hypothetical analytic paths and generate pages for those with highest expected reward. The system may further employ active-learning loops to identify under-represented data domains and synthesize pages targeting those gaps, thereby increasing the overall informational entropy of the analytic corpus.

Figure 20:
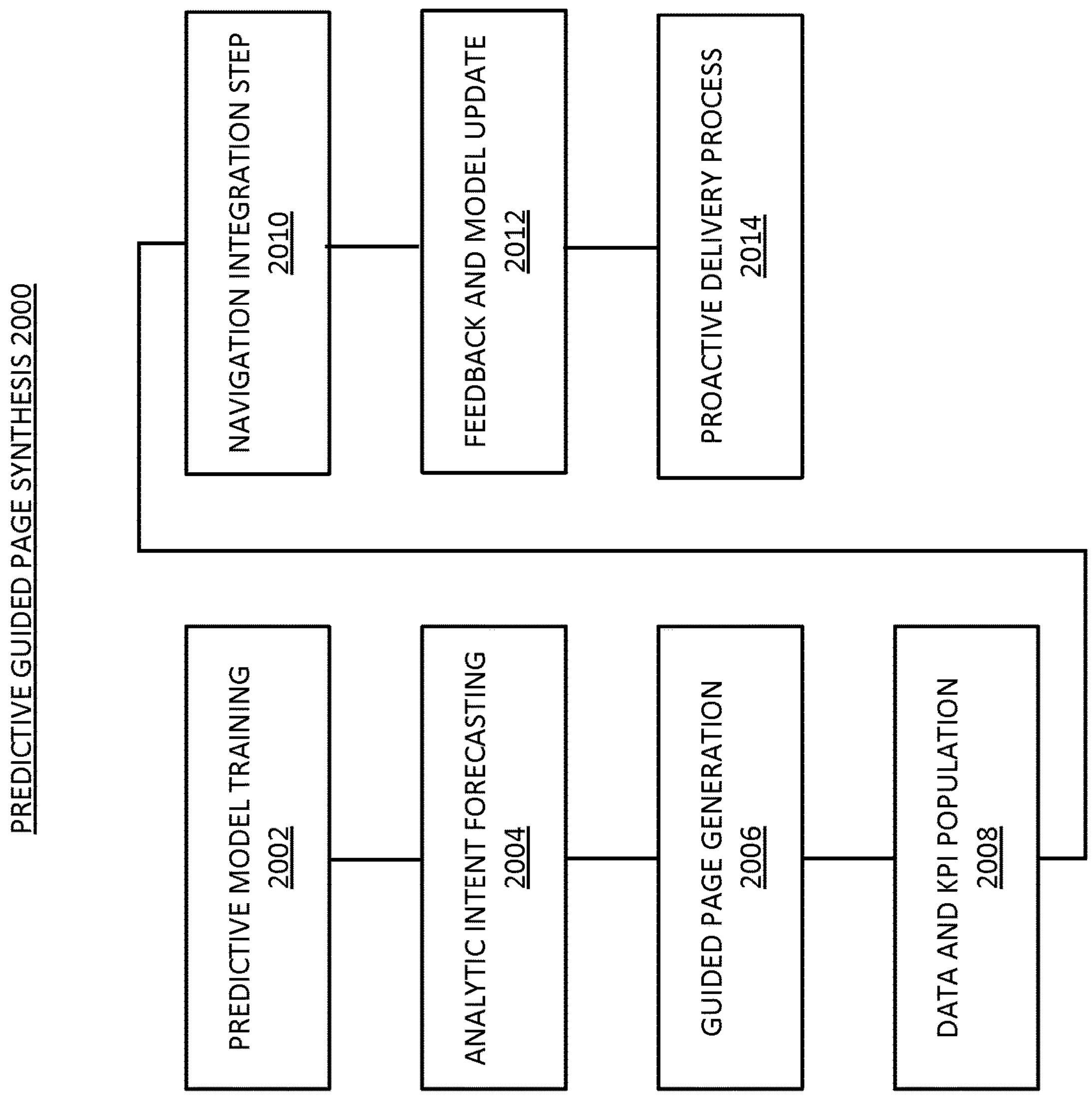
FIG. 20 depicts a flow diagram of predictive guided page synthesis.

A corresponding method embodiment depicted in FIG. 20 begins by analyzing historical user and system data to train the predictive model 2002. The method forecasts future analytic intents 2004, generates guided pages for those intents 2006, populates the pages with contextually relevant data 2008, and integrates them into the navigation topology 2010. As users interact with the predictive pages, the method collects feedback and retrains the predictive model 2012. Over successive iterations, the system converges toward a state of anticipatory analytics 2014 in which most user navigation requests are pre-fulfilled by proactively generated pages.

In embodiments, the predictive model 2002 may forecast next best pages similar to next-word prediction in language models. For example, if a user frequently navigates from a supplier risk dashboard to a cost variance report, the model learns to synthesize and present the latter page automatically when similar conditions are detected. In another case, the system may detect seasonality in demand-planning analytics and generate future quarter forecast pages ahead of schedule.

Additional embodiments incorporate natural-language narrative generation, where the synthesized page includes an AI-generated explanation summarizing predicted insights. Other variants include multimodal synthesis, combining visual, textual, and interactive components dynamically. The system may also generate explanatory provenance metadata, recording which data, models, and rules contributed to each synthesized page for audit and compliance purposes.

Predictive Guided Page Synthesis 2000 may operate continuously in background mode or on a scheduled basis. In multi-tenant or enterprise deployments, federated learning may allow predictive models trained on local usage patterns to contribute anonymized model updates to a shared global model 2012. This arrangement supports collective intelligence across organizations while maintaining privacy and data isolation.

Through these embodiments, the Predictive Guided Page Synthesis subsystem 2000 enables the Guided Page Navigation framework to evolve from a responsive system into a proactive, self-anticipating analytics engine. By coupling predictive modeling 2002, generative page creation 2006, and entropy-based evaluation, the system delivers analytical insights at or before the point of user need, enhancing efficiency, reducing friction, and expanding the informational entropy of the entire analytic environment.

Figure 21:
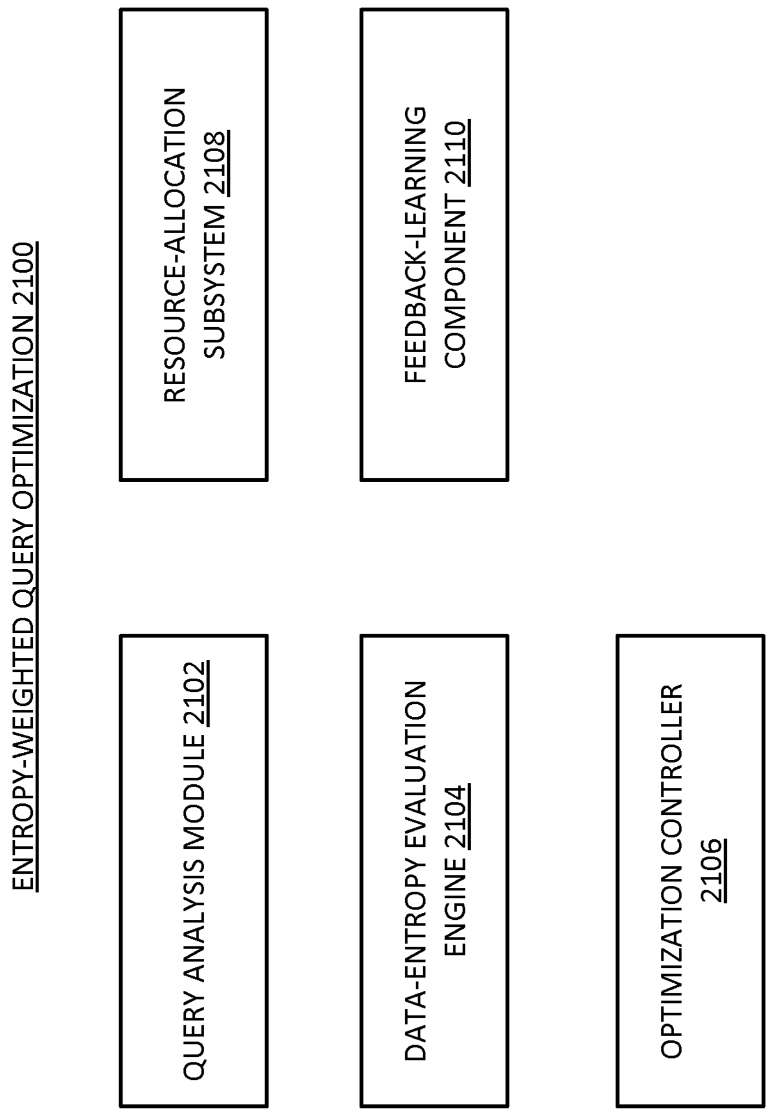
FIG. 21 depicts a block diagram of entropy-weighted query optimization.

Referring to FIG. 21, the following detailed description pertains to embodiments of an Entropy-Weighted Query Optimization (EWQO) system 2100. Query analysis subsystem 2102 0 may dynamically prioritize analytical query execution based on expected information entropy and contextual discovery value. This subsystem augments the Guided Page Navigation (GPN) framework and integrates seamlessly with the agentic AI 1104 architecture, providing adaptive control over analytic computation to maximize insight generation efficiency.

In traditional GPN implementations, queries are executed sequentially or by predefined workflow priority. The EWQO module includes a data-entropy evaluation engine 2104 that introduces a quantitative entropy metric as an additional optimization criterion, enabling the analytics engine to allocate computational effort toward queries that promise greater informational novelty. This approach increases discovery richness while minimizing redundant computation.

In embodiments, the system includes a query-analysis module 2102 that aggregates candidate queries originating from multiple sources-user requests, predictive guided-page synthesis 1904, or agentic automation 1104. Each query may be represented by a metadata record containing contextual attributes such as domain, KPI targets, parameter filters, and estimated cost.

Coupled to this is a data-entropy evaluation engine 2104 that calculates an expected entropy score for each candidate query prior to execution. The engine 2104 may analyze schema characteristics, prior result distributions, correlation matrices, or feature-importance data. Statistical measures such as Shannon entropy, variance, or divergence metrics can be used, or machine-learning models may predict entropy based on query features and historical performance. In some embodiments, generative-model uncertainty—for example, the spread of predicted outputs from a probabilistic model—is used as a proxy for expected information gain.

An optimization controller 2106 ranks the candidate queries according to their entropy scores. To balance discovery and efficiency, the controller 2106 may employ reinforcement-learning policies or multi-armed-bandit strategies that adaptively choose between exploring new query spaces and exploiting proven high-value ones. The controller 2106 then produces a prioritized execution plan communicated to a distributed scheduler.

A resource-allocation subsystem 2108 receives the prioritized plan and dynamically assigns computational and I/O resources. For instance, queries with higher entropy weights may receive additional CPU threads, expanded memory caches, or preferential database access. In a distributed-processing environment, the subsystem 2108 may coordinate with cluster orchestrators to adjust node scheduling and load balancing in real time. This adaptive allocation ensures that computational effort correlates with expected analytical payoff.

A feedback-learning component 2110 monitors execution results and user-interaction metrics. For each executed query, realized entropy may be computed by measuring diversity or variance within the result set. The difference between expected and realized entropy constitutes an error signal used to retrain the predictive entropy model. Reinforcement signals derived from user actions—such as acceptance, exploration, or rejection of query results—can further refine future prioritization. Over time, the EWQO system converges toward an equilibrium where query-selection probabilities align with true information value.

In some embodiments, the EWQO subsystem operates continuously, evaluating candidate queries generated by background agents or predictive engines. In other variants, it functions on-demand, invoked when computational resources are limited or when query volumes exceed thresholds. The entropy-weighting logic may also operate hierarchically, with local instances optimizing within domain-specific contexts and a global controller harmonizing priorities across domains.

The EWQO system can cooperate with other agentic AI 1104 components. For example, the Predictive Guided Page Synthesis engine 1900 may produce candidate queries associated with forecasted analytic pages, while the Semantic Workflow Translator 1500 may issue multiple alternative formulations of a workflow query. The EWQO module 2100 evaluates and ranks these options by expected entropy gain, selecting those likely to yield the most informative or novel outcomes. Likewise, the Self-Training Digger Agents 1700 may exchange entropy statistics to improve global coordination of analytic focus.

In embodiments, entropy weighting extends beyond query selection to include result-presentation optimization. The system may reorder or highlight query results with higher internal entropy, guiding user attention toward diverse or unexpected insights. In another variant, entropy weighting influences caching policy, prioritizing storage of high-entropy results for reuse in subsequent analyses.

Alternative embodiments utilize Bayesian optimization, genetic algorithms, or particle-swarm methods to approximate entropy-optimal query schedules. Some implementations include a probabilistic exploration factor that stochastically samples lower-ranked queries to maintain discovery breadth. Others incorporate cost-benefit balancing, dividing each query's entropy score by estimated computational cost to achieve maximal entropy per resource unit.

Figure 22:
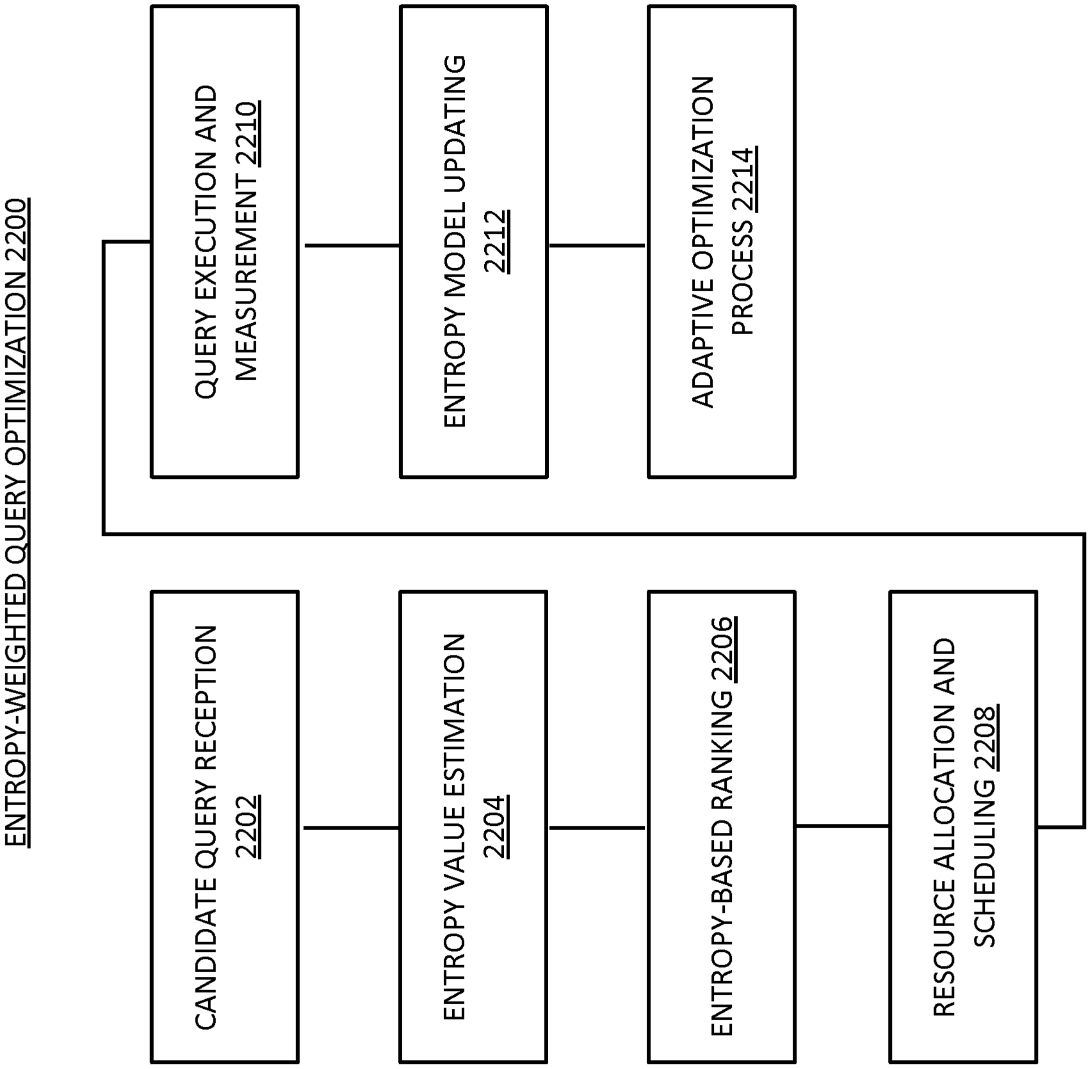
FIG. 22 depicts a flow diagram of entropy-weighted query optimization.

A corresponding method embodiment depicted in FIG. 22 includes receiving candidate queries 2202, estimating entropy 2204, ranking queries 2206, allocating resources 2208, executing prioritized tasks 2210, computing realized entropy 2212, and updating predictive models. Additional steps may include generating interpretive visualizations that explain why certain queries were favored or suppressed. The method can operate iteratively, creating a feedback loop in which every executed query contributes to more accurate future entropy estimation.

An exemplary use case illustrates the advantages of the disclosure. Suppose a financial analyst initiates several queries related to supplier cost variance, risk exposure, and regional performance 2202. The EWQO engine calculates expected entropy for each 2204: supplier cost variance (low entropy—well-known), regional performance (moderate), and emerging-supplier risk (high). The system prioritizes and executes the high-entropy query first, discovering an unexpected correlation between supplier risk and logistics delays. The learned outcome updates the model 2212 so that similar queries receive increased priority in future sessions.

In distributed or cloud-based environments, the EWQO subsystem may be implemented as a microservice integrated with a query-orchestration bus. Entropy metrics, model weights, and performance logs may be shared among federated nodes, enabling enterprise-wide optimization without exposing underlying data. The system may also employ differential privacy to preserve confidentiality of entropy-calculation features.

Through these embodiments, the Entropy-Weighted Query Optimization subsystem introduces a novel approach to analytic resource management-one that treats information entropy as the governing principle for prioritization and scheduling. By aligning computational expenditure with discovery potential, the disclosure transforms guided analytics from a reactive query-execution model into a proactive, self-optimizing analytic fabric 2214 that continually seeks to expand knowledge entropy and analytic insight within this technology stack.

Figure 23:
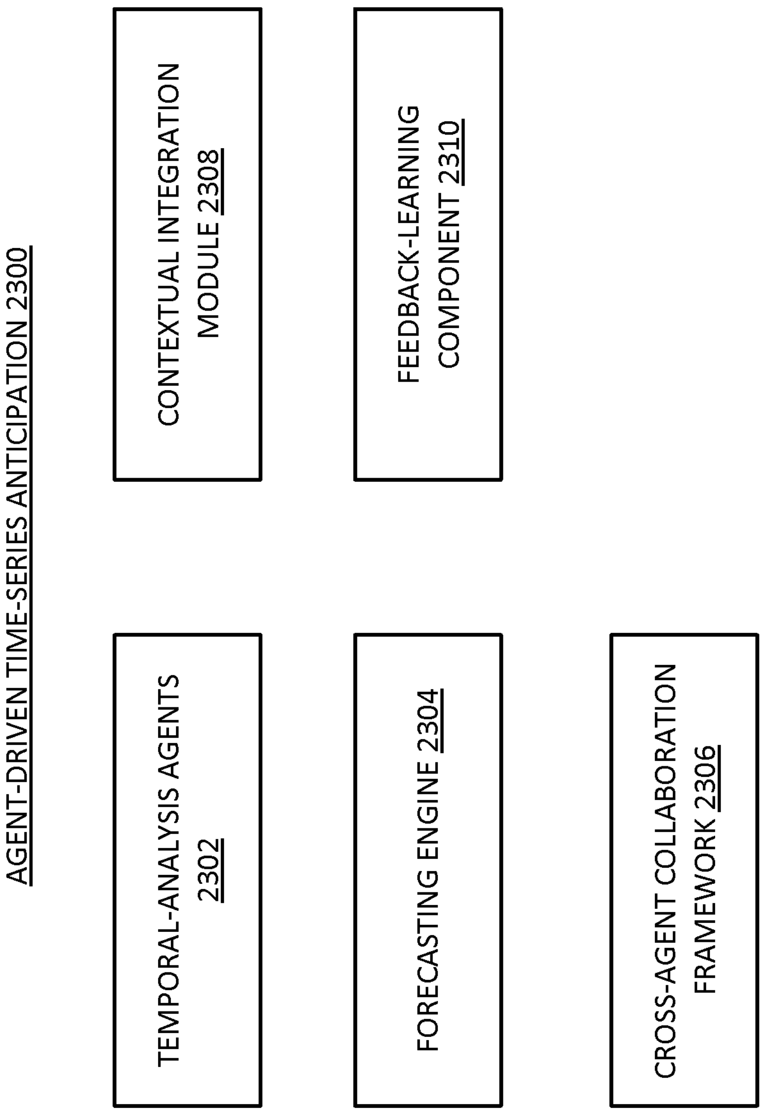
FIG. 23 depicts a block diagram of agent-driven time-series anticipation.

Referring to FIG. 23, the following detailed description pertains to embodiments of an Agent-Driven Time-Series Anticipation (ADTSA) subsystem 2300 that enables proactive forecasting and cross-domain temporal reasoning within the Guided Page Navigation (GPN) framework. By leveraging distributed agentic AI 1104 principles, the ADTSA module 2300 provides a self-learning, multi-agent forecasting architecture that continuously predicts future analytic conditions, anomalies, and KPI trends.

In embodiments, the system comprises a plurality of temporal-analysis agents 2302, each responsible for monitoring and predicting time-series behavior within a designated analytic domain or dimension. For example, separate agents 2302 may handle supplier cost fluctuations, inventory levels, revenue trajectories, or compliance violations. Each agent 2302 observes historical data and real-time feeds, builds a local predictive model, and generates forecasts with associated confidence intervals and entropy measures representing forecast uncertainty and informational value.

Each temporal agent 2302 may employ a different forecasting methodology depending on domain characteristics. For high-frequency signals, the agent may apply autoregressive integrated moving-average (ARIMA) or exponential-smoothing techniques; for non-linear patterns, recurrent neural networks (LSTM, GRU), transformer-based temporal models, or hybrid statistical-neural architectures may be used. Agents 2302 can also leverage exogenous variables such as market indices or external benchmarks to improve forecast context 2304.

A cross-agent collaboration framework 2306 allows temporal agents 2302 to exchange intermediate forecasts and confidence metadata 2304. This collaboration 2306 enables multi-domain synchronization and reduces redundancy in forecasting effort. In certain embodiments, messages transmitted among agents 2302 are weighted by an entropy score that quantifies forecast uncertainty and expected information gain. Agents whose forecasts carry higher entropy values (e.g., indicating novel or less certain conditions) receive greater collaborative attention 2306, promoting exploration of uncertain data regions. The collaboration framework 2306 may implement publish-subscribe protocols, secure message buses, or federated communication channels.

Forecast results from the temporal agents 2302 are aggregated by a forecasting engine 2304 that performs model fusion to produce composite multi-domain forecasts. The fusion may use Bayesian model averaging, attention-weighted combination, or ensemble stacking approaches that account for agent reliability and entropy scores. The resulting multi-domain forecast encapsulates short-term, medium-term, and long-term predictions for key KPIs and workflow indicators.

The contextual integration module 2308 receives the aggregated forecast and incorporates it into the Guided Page navigation map 1102. Forecasted values and anomalies are embedded as future-state nodes or predictive paths within the navigation graph. For instance, a forecast indicating a projected increase in supplier risk may trigger automatic generation of a predictive page displaying expected risk evolution over time and suggesting preventive actions. Likewise, anticipated margin declines could result in generation of a finance forecast dashboard integrated with the relevant workflows.

Each predictive page may include visual elements such as forecast curves, uncertainty bands, and entropy heat maps. The system can also generate natural-language summaries explaining forecast rationale (e.g., "Projected inventory shortage in Q3 due to seasonal demand increase and supplier lead-time extension"). These pages are available for proactive user review or may serve as inputs to Predictive Guided Page Synthesis 1900 and Entropy-Weighted Query Optimization 2100 modules.

A feedback learning component 2310 monitors forecast accuracy by comparing predicted and actual outcomes. Forecast errors generate learning signals 2310 that update agent models in real time using reinforcement learning or incremental gradient updates. The feedback mechanism 2310 also incorporates user interaction data—such as whether users acted upon the forecasted insights—to refine model reward functions and improve practical relevance. Agents 2302 may periodically exchange learned parameters to synchronize improvements across the network.

In some embodiments, a multi-horizon coordination agent manages alignment across different time scales, ensuring that short-term forecasts are consistent with longer-term trends. The coordination agent may compute temporal coherence scores and adjust model weights to maintain logical continuity across forecast intervals. Other embodiments introduce a hierarchical learning structure, where lower-level agents handle domain-specific data and upper-level meta-agents learn cross-domain temporal dependencies.

Alternative implementations use event-driven triggers to initiate forecast updates upon detection of data changes, external events, or workflow transitions identified by the Semantic Workflow Translator 1500. Federated deployments permit each organization or data node to train temporal agents locally and share entropy summaries or model gradients with a global controller without exposing sensitive data.

Figure 24:
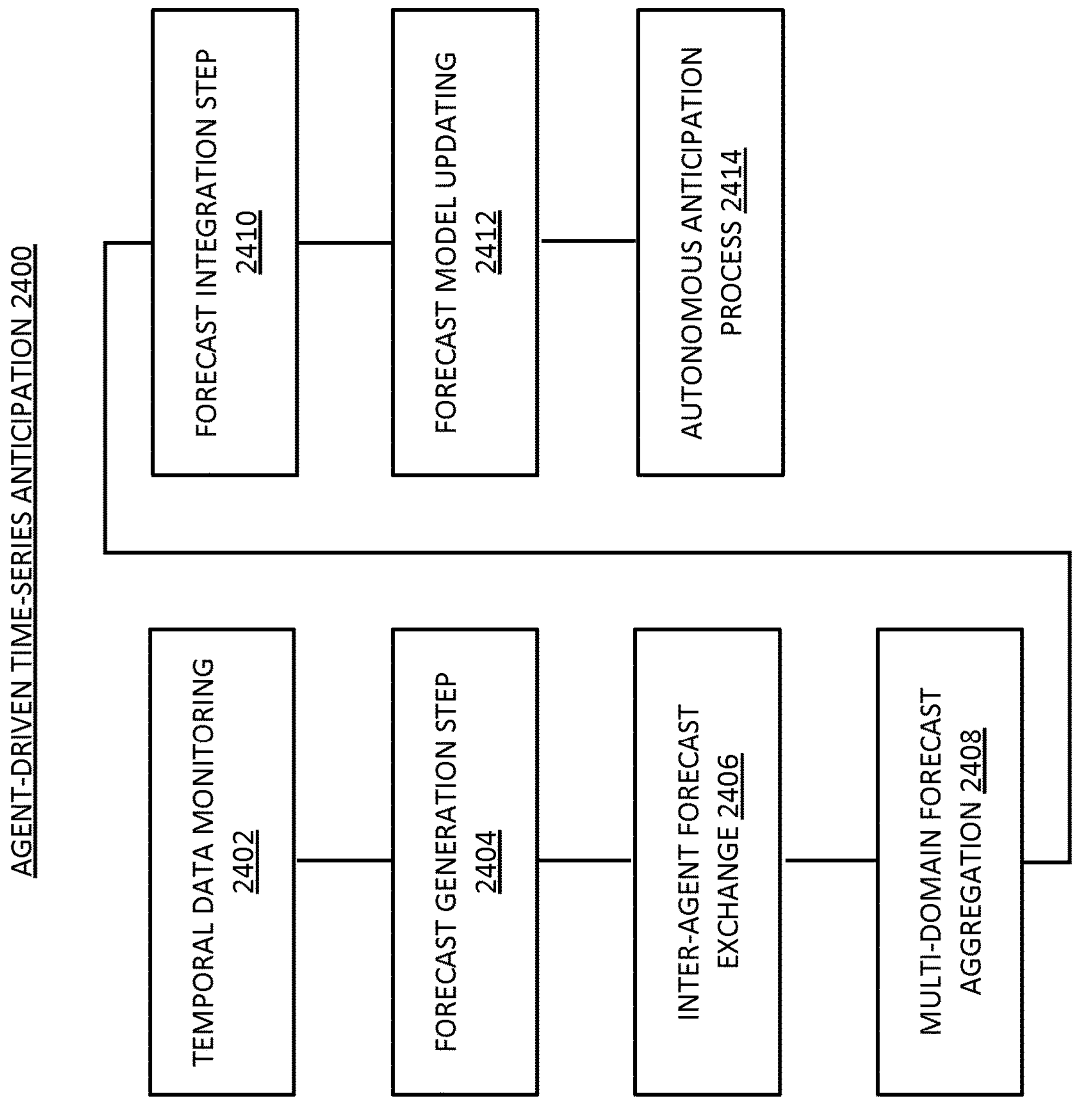
FIG. 24 depicts a flow diagram of agent-driven time-series anticipation.

From a method standpoint, as depicted in FIG. 24, the process comprises monitoring time-series data 2402, producing forecasts 2404, sharing entropy-weighted updates among agents 2406, aggregating and integrating results into the navigation framework 2408, and performing continuous feedback-driven learning. Optionally, the method includes detecting forecast divergence events 2412 and triggering model reconciliation tasks to restore accuracy.

The Agent-Driven Time-Series Anticipation subsystem provides the GPN environment with a temporal dimension of agentic intelligence. By forecasting future states and propagating anticipatory insights throughout guided navigation, the system enables proactive decision support, reduces response latency, and enhances the overall informational entropy of the analytic ecosystem. When combined with Predictive Guided Page Synthesis 2000 and Entropy-Weighted Query Optimization 2200, the ADTSA module forms a core component of a self-evolving, time-aware analytic fabric that continuously learns, predicts, and adapts to emerging data conditions across this technology stack.

Figure 25:
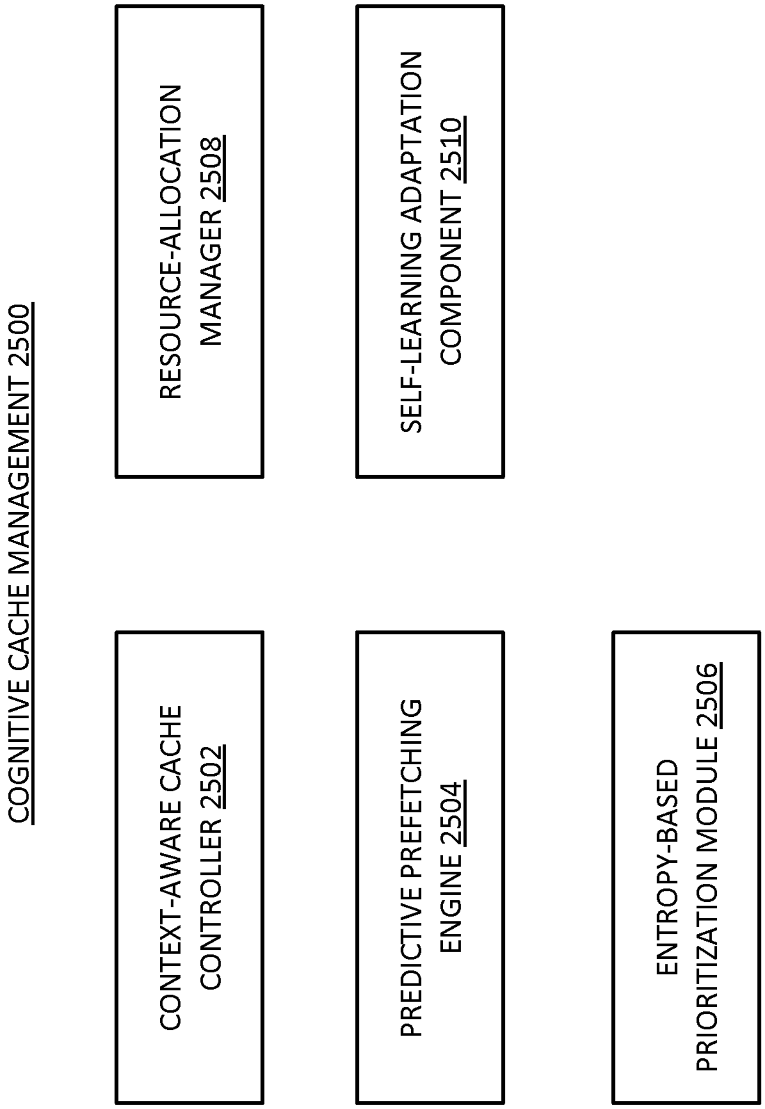
FIG. 25 depicts a block diagram of cognitive cache management.

Referring to FIG. 25, the following detailed description pertains to embodiments of a Cognitive Cache Management (CCM) subsystem 2500 that autonomously manages caching, prefetching, and data-retention behaviors in the Guided Page Navigation environment. The CCM system 2500 applies contextual learning, predictive modeling, and entropy-based reasoning to optimize access latency, reduce redundant computation, and enhance informational diversity within analytic workflows.

In embodiments, the CCM system includes a context-aware cache controller 2502 integrated with the guided-navigation engine. The cache controller 2502 monitors user interactions, page traversal sequences, and data queries, collecting contextual signals such as user role, domain, time of access, and prior navigation behavior. This information may be used to build a behavioral usage profile that informs cache decisions.

A predictive prefetching engine 2504 operates in conjunction with the controller 2502 to anticipate future data and page requests. The engine 2504 may employ time-series forecasting models, Markov transition models, or reinforcement-learning policies that learn optimal prefetch strategies through experience. By analyzing navigation histories and workflow sequences, the engine 2504 can prefetch data objects—such as KPI metrics, visualization fragments, or page templates—before they are explicitly requested, ensuring low-latency access.

An entropy-based prioritization module 2506 evaluates each cacheable object (e.g., datasets, guided pages, API responses) for its potential contribution to information entropy. Objects associated with novel data, rare queries, or high predictive uncertainty are assigned higher priority, while static or redundant data receive lower weights. The module 2506 computes an entropy score based on statistical metrics (data variance, freshness) and contextual metrics (relevance to active workflows, novelty of relationships). These scores drive the cache-retention and eviction strategy.

A resource-allocation manager 2508 dynamically apportions cache memory according to the entropy-weighted priority scores. In distributed or multi-tenant architectures, this manager 2508 coordinates memory allocation across multiple nodes, ensuring that high-entropy data is available close to the point of analytic computation. Cache partitions may be automatically resized in response to workload shifts or forecasted demand, enabling elasticity of memory usage.

The system further includes a self-learning adaptation component 2510 that continuously refines caching behavior through feedback. Cache performance metrics such as hit ratio, load latency, and eviction frequency are analyzed to update the predictive models. Reinforcement-learning techniques may be applied, with reward signals based on user satisfaction, query efficiency, or realized entropy gain. Over time, the system learns which caching policies yield the most efficient and information-rich analytic experiences.

In operation, consider a scenario where an analyst repeatedly explores supplier-risk metrics during quarterly reviews. The CCM engine 2500 detects the recurring pattern and proactively prefetches risk-related datasets and page structures during subsequent sessions. If the agentic forecasting system predicts an upcoming interest in supplier-cost variance, the CCM system 2500 anticipates and caches the relevant data in advance, effectively reducing page-load latency and increasing readiness for discovery.

The CCM subsystem may be also capable of cross-module coordination with other agentic AI 1104 components. It may prefetch data identified by the Predictive Guided Page Synthesis engine as relevant for upcoming predictive pages or retrieve time-series segments highlighted by the Agent-Driven Time-Series Anticipation module 2300. In this cooperative arrangement, caching decisions are informed not only by user history but also by predictive and semantic intelligence distributed throughout this system.

A feedback-learning loop 2510 ensures adaptability. When cache performance drops or user behavior diverges from predictions, the system 2510 revises its prioritization weights6 and retrains the predictive prefetch model 2504. Over successive cycles, this feedback 2510 yields a self-tuning cache ecosystem optimized for responsiveness and entropy enhancement. Optional governance layers maintain audit logs and provenance records, documenting cache decisions, model versions, and performance metrics for transparency and compliance.

Alternative embodiments of the CCM 2500 may use different AI paradigms for cache optimization. In one version, the system employs Bayesian belief networks to quantify cache-hit probabilities. Another uses genetic algorithms to evolve caching policies over multiple generations, selecting for highest entropy-per-latency gain. Additional variants employ contextual bandit algorithms that dynamically balance between caching frequently used items (exploitation) and new, potentially informative items (exploration).

Figure 26:
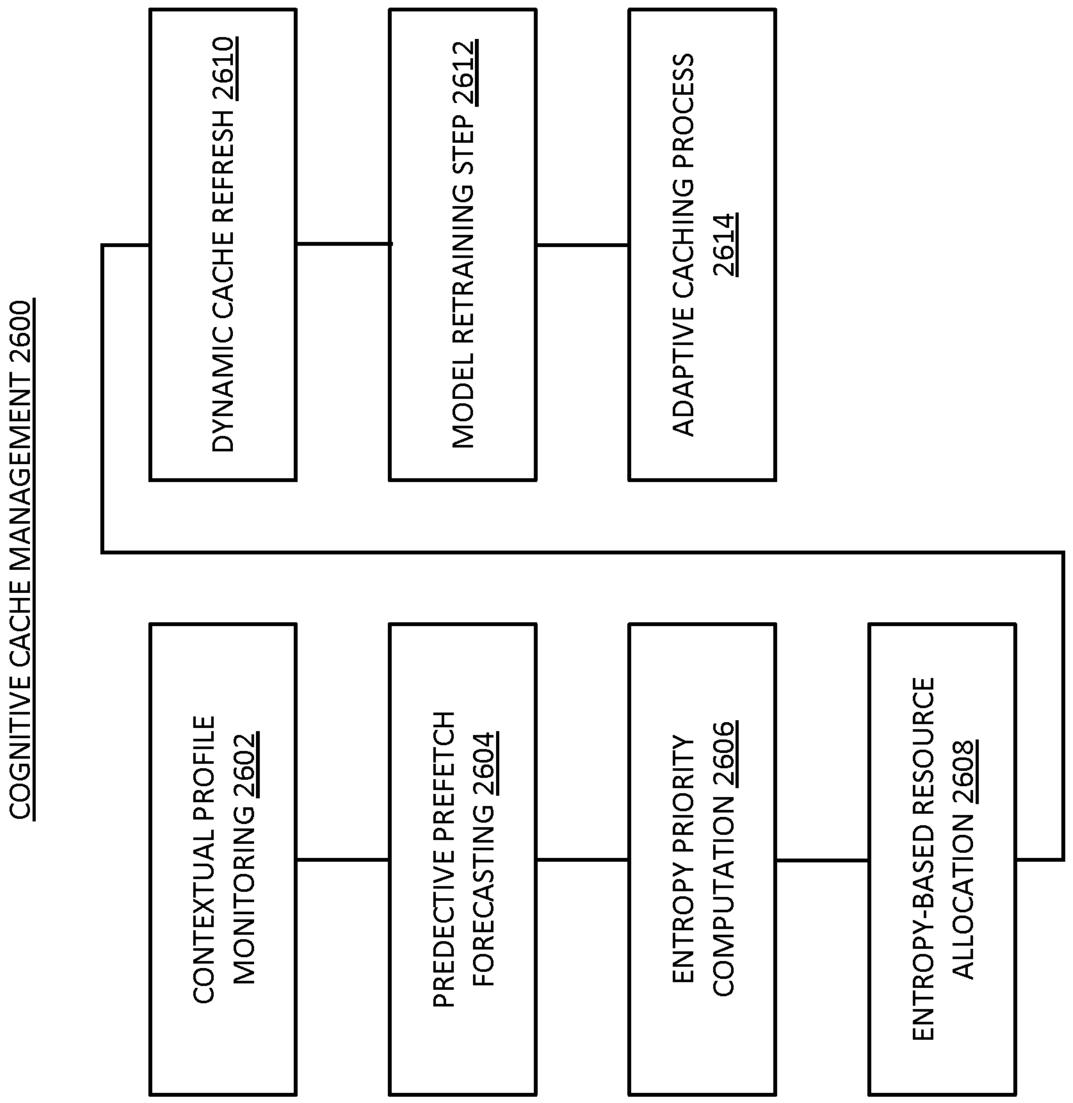
FIG. 26 depicts a flow diagram of cognitive cache management.

A corresponding method embodiment depicted in FIG. 26 includes monitoring access patterns 2602, forecasting cache requirements 2604, computing entropy-based priority scores 2606, allocating memory resources 2608, performing predictive prefetching 2604, dynamically evicting or refreshing data 2610, and retraining models based on performance feedback 2612. The method may be implemented continuously as a background process 2614 or periodically in scheduled maintenance cycles2.

The CCM subsystem can operate in both centralized and distributed environments. In a cloud implementation, caching nodes may communicate via federated coordination, sharing entropy metrics and performance data to balance cache loads across clusters 8. In edge-deployed analytic devices, lightweight local caches synchronize with cloud-based predictive controllers to ensure responsiveness in disconnected or bandwidth-constrained conditions.

Through these embodiments, Cognitive Cache Management transforms the traditional static cache into a living, adaptive memory system 2614—one that continuously learns from user behavior, anticipates analytic needs, and aligns data accessibility with the evolving entropy landscape of the guided-analytics environment. The result is a system that not only accelerates performance but also increases discovery potential, supporting the overall goal of maximizing informational entropy through adaptive, agentic intelligence4.

Figure 27:
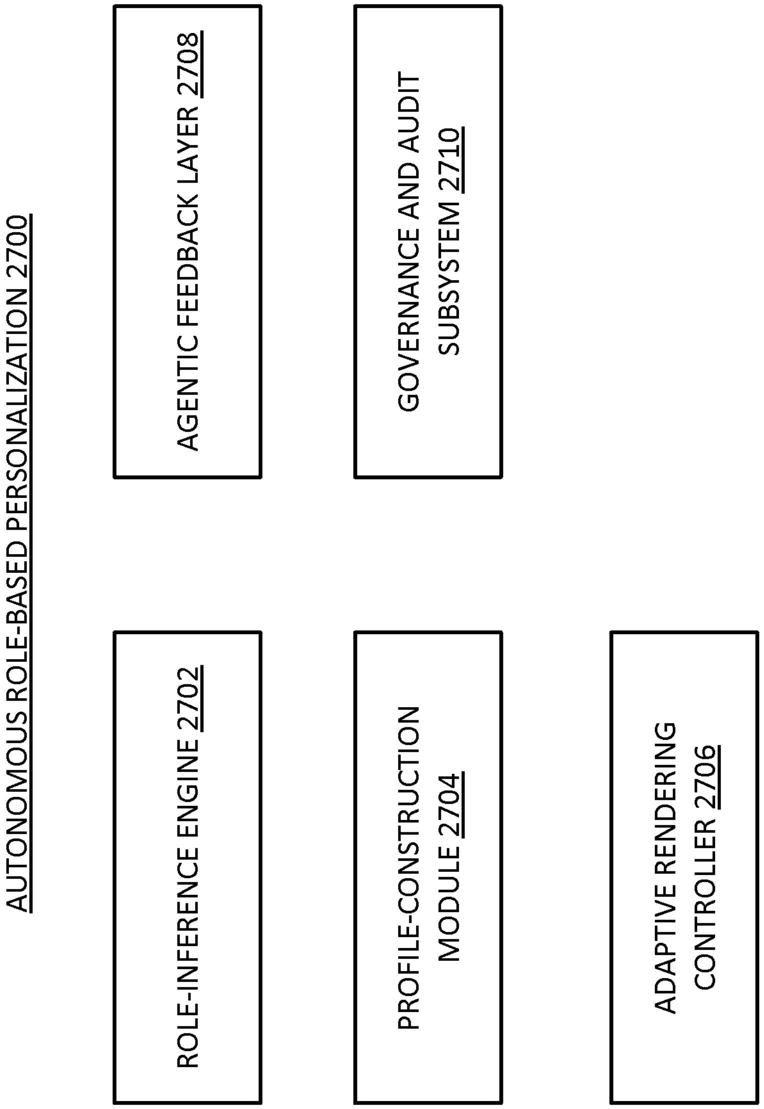
FIG. 27 depicts a block diagram of autonomous role-based personalization.

Referring to FIG. 27, the following detailed description relates to embodiments of an Autonomous Role-Based Personalization (ARBP) subsystem 2700 that learns, adapts, and personalizes the analytical environment for each user operating within the Guided Page Navigation (GPN) framework. By combining behavioral analytics with agentic intelligence 1104, the subsystem delivers individually optimized guided-analytic experiences without explicit configuration or manual role assignment.

In embodiments, the ARBP system includes a role-inference engine 2702 that continuously observes user interaction data generated within the guided-analytics environment. Such data may include navigation choices, dwell time on guided pages, query composition patterns, and frequency of domain transitions. Using this data, the role-inference engine 2702 applies machine-learning models such as clustering, Bayesian inference, or deep-embedding networks to infer an implicit role—for example, executive decision-maker, data analyst, or operations planner. Each inferred role 2702 captures behavioral characteristics, data-interaction depth, and preferred analytical style.

A profile-construction module 2704 maintains a dynamic representation of each user's personalization parameters. The profile 2704 may include KPI priorities, preferred visualization formats, typical analytical depth, and contextual preferences (e.g., summary views versus diagnostic detail). The profile 2704 evolves continuously: as the system collects new behavioral signals, weights assigned to KPIs and domains are updated using reinforcement or continual-learning techniques. Profiles 2704 may also store entropy metrics quantifying the diversity of a user's interactions, enabling the system to encourage broader exploration for narrowly focused users or streamline complexity for generalists.

The adaptive rendering controller 2706 applies the user profile 2704 to modify the presentation and navigation structure of guided pages. For example, an executive user may see high-level KPI dashboards with simplified visualizations and narrative summaries, while a data scientist receives detailed multidimensional tables and correlation analyses. When a workflow is initiated, the controller 2706 consults the profile 2704 to determine which guided pages to emphasize, which to suppress, and how to order the navigation path for maximum relevance and entropy efficiency. In certain embodiments, the controller 2706 communicates with the Predictive Guided Page Synthesis 1900 and Entropy-Weighted Query Optimization 2100 subsystems to request generation or prioritization of content aligned with user-role expectations.

An agentic feedback layer 2708 monitors post-render interactions to assess the effectiveness of personalization. Metrics such as navigation speed, session duration, corrective navigation actions, and satisfaction ratings are interpreted as reinforcement signals. These signals drive real-time refinement of the role-inference model, allowing the system to recognize evolving user behavior—such as an analyst transitioning into a managerial role—and adjust personalization accordingly. The feedback layer 2708 may also aggregate data across multiple users to identify emergent archetypes or role clusters.

A cross-user generalization engine may operate in enterprise deployments to share personalization patterns across similar users or teams. For instance, if multiple finance analysts demonstrate consistent KPI preferences, the system generalizes those patterns into a "Finance Analyst Archetype," which can be applied automatically to new users in the same department. In federated environments, anonymized personalization parameters can be shared across organizations to improve model accuracy without revealing individual data.

The governance and audit subsystem 2710 ensures transparency and compliance. It records all personalization decisions, including model versions, thresholds, and rationale for adaptations. Audit trails can be viewed through explainable-AI dashboards showing how each change in layout or workflow was derived from specific behavioral evidence. Access rights and privacy boundaries are enforced to ensure that personalization does not expose unauthorized data.

In practice, the ARBP subsystem 2700 operates as follows. Upon initial login, a new user interacts with the guided-analytics interface. The role-inference engine 2702 quickly categorizes the user's behavior patterns and generates an initial profile 2704. As the user navigates pages, the system refines this profile, adjusting display formats and suggesting workflows aligned with the inferred objectives. If the user begins issuing more complex queries or engaging in cross-domain navigation, the system 2700 transitions the user's role classification to a more advanced persona, dynamically increasing analytical depth and information diversity presented.

Alternative embodiments of ARBP 2700 include different learning and control strategies. One variant employs graph-neural-network embeddings to model relationships among users, roles, and domains. Another utilizes evolutionary learning to explore alternative personalization strategies, selecting those with the highest reinforcement rewards. Other implementations introduce contextual-bandit models that balance exploitation of known user preferences with exploration of new analytical experiences to sustain engagement and entropy growth.

Figure 28:
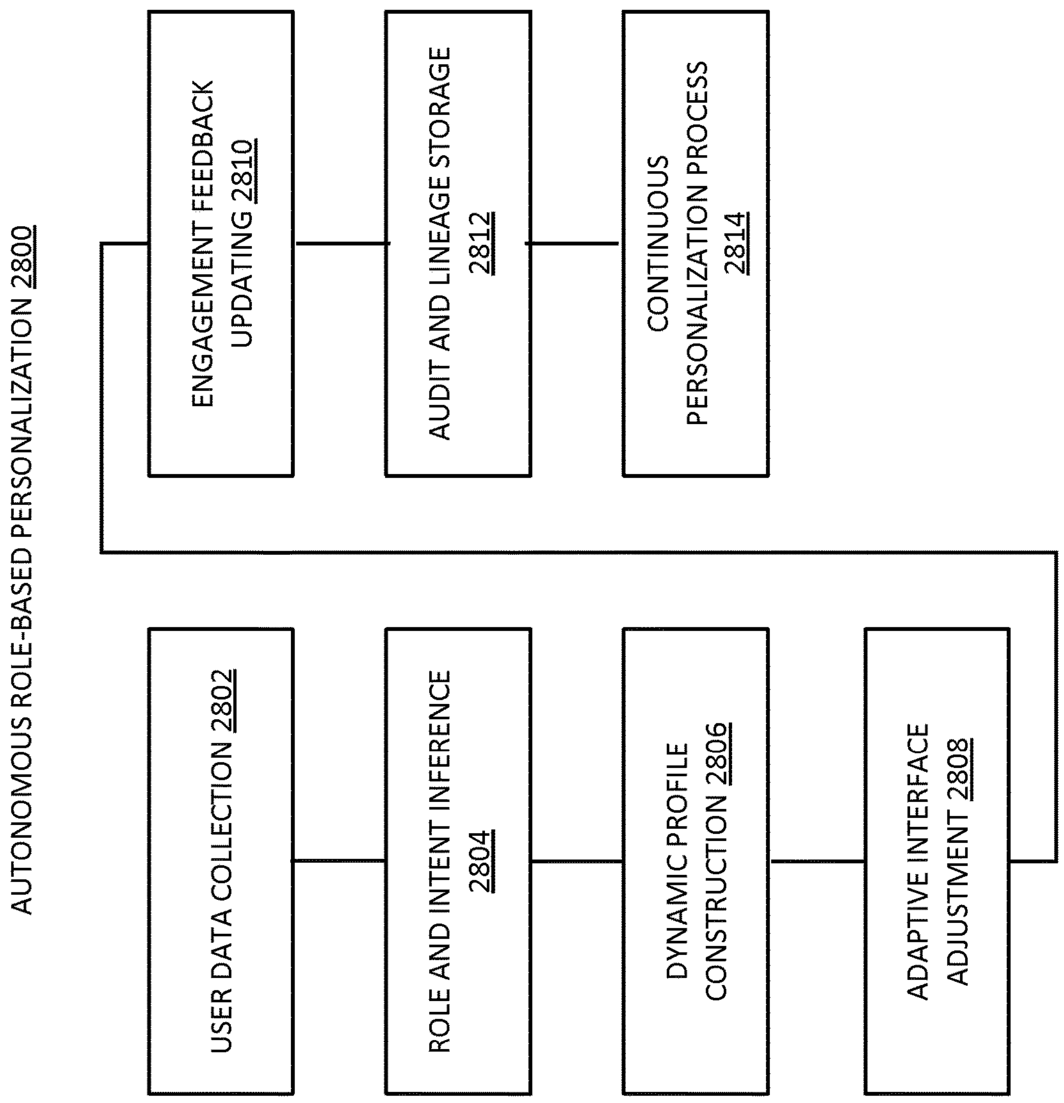
FIG. 28 depicts a flow diagram of autonomous role-based personalization.

A corresponding method embodiment depicted in FIG. 28 comprises collecting and analyzing user-interaction data 2802, inferring roles 2804, generating dynamic profiles 2806, adapting interfaces 2808, monitoring feedback 2810, and updating personalization models. Optional steps include merging inferred roles with enterprise directory information, applying entropy-weighted KPI relevance adjustments, and producing narrative explanations of personalization outcomes.

When deployed in concert with the Cognitive Cache Management 2600 and Agent-Driven Time-Series Anticipation 2400 modules, ARBP allows the system not only to predict data and analytic needs but also to present them in the format and complexity most suitable for each user persona. This tight coupling of personalization with predictive and entropy-driven intelligence 2810 transforms the GPN environment into a self-adapting analytical ecosystem 2814 that optimizes both system performance and user experience.

Through these embodiments, Autonomous Role-Based Personalization provides an adaptive, self-learning mechanism for tailoring guided-analytics content. It advances this technology family toward a truly agentic human-machine collaboration layer—one that understands each participant's cognitive style, anticipates informational needs, and continuously maximizes discovery entropy and engagement across analytical domains.

Figure 29:
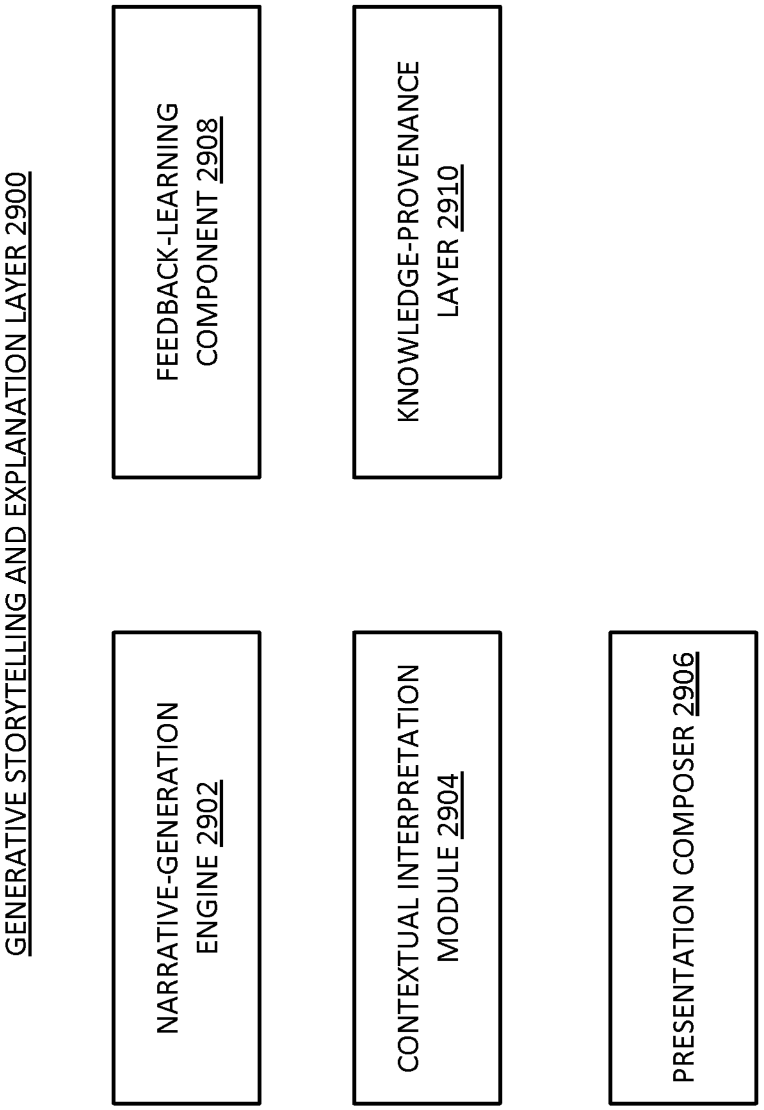
FIG. 29 depicts a block diagram of a generative storytelling and explanation layer.

Referring to FIG. 29, the following detailed description pertains to embodiments of a Generative Storytelling and Explanation Layer (GSEL) 2901 designed to automatically generate, contextualize, and present analytical narratives derived from guided-analytics workflows. The GSEL operates as a top-level interpretive interface within the Guided Page Navigation framework and leverages the generative and agentic capabilities.

In embodiments, the system includes a narrative-generation engine 2902 that converts structured analytical data—such as KPI values, trends, and anomalies—into human-readable narratives. The engine 2902 may employ a large-language model, a rule-based text generator, or a hybrid symbolic-neural framework trained on analytical summaries and prior reports. Inputs to the engine 2902 include data outputs from guided pages, workflow histories, user-role metadata, and contextual parameters such as time, domain, and business objectives.

Coupled to the narrative engine is a contextual interpretation module 2904 that analyzes analytic outputs to identify significant events, correlations, and causal relationships. For example, if the system detects a 15% decline in supplier margin accompanied by increased lead time, the contextual interpretation module 2904 may infer a probable causal link between procurement delays and profitability reduction. This inference may be represented in a semantic knowledge graph connecting metrics, causes, and effects, which provides structured input for narrative generation.

The GSEL further includes a presentation composer 2906 responsible for assembling narratives into guided-story pages that integrate textual explanations, data visualizations, and interactive controls. Each guided story may correspond to a workflow segment within the navigation map 1102, providing users with a narrated summary of key findings and next-step recommendations. In certain embodiments, the composer 2906 applies multimodal synthesis, combining written text with voice narration or visual animation for enhanced engagement. Narrative tone, vocabulary complexity, and layout are dynamically selected based on the user's role profile as inferred by the Autonomous Role-Based Personalization module.

To ensure trust and transparency, a knowledge-provenance layer 2910 records metadata linking each narrative element to its originating data source, query, or analytic model. For example, a statement such as "Regional revenue increased by 12%" is linked to the specific dataset, query ID, and time range from which the value was derived. This provenance 2910 enables users to drill back from any sentence in the narrative to the underlying evidence, fulfilling understandability requirements critical to enterprise and regulated environments.

A feedback-learning component 2908 continuously improves the quality and relevance of generated narratives. It captures engagement metrics such as reading time, scroll behavior, audio playback completion, and explicit feedback ratings. Reinforcement-learning or preference-learning algorithms use these metrics as reward signals to optimize narrative coherence, length, and informativeness. Over time, the GSEL adapts its storytelling strategies to align with user expectations and comprehension levels.

In operation, the process begins when the system completes an analytical workflow or guided-page sequence. The narrative-generation engine 2902 receives structured output describing results, context, and intermediate reasoning. The contextual interpretation module 2904 identifies causal patterns or anomalies, and the narrative engine 2902 generates explanatory sentences, summaries, and insights. The presentation composer 2906 renders these as narrative-guided pages, which may appear as a concluding summary, an interim explanation, or a continuously updating sidebar during analysis.

For example, after a user analyzes supplier-risk data, the GSEL may generate a story such as: "Supplier risk levels increased by 8% this quarter, primarily due to extended shipping lead times and raw-material volatility. The Procurement domain forecasts recovery within two months following recent supplier diversification." Such a narrative may include visual overlays illustrating the correlation between lead-time variance and risk index. The story may also link to predictive pages generated by the Agent-Driven Time-Series Anticipation module 2300 for forward-looking context.

Alternative embodiments support dialog-based storytelling, allowing users to request clarifications in natural language (e.g., "Why did the margin drop in Q3?"). In response, the system generates a tailored explanatory narrative citing specific data causes. Other versions employ real-time story updates, where the narrative evolves dynamically as the underlying dataset changes, ensuring that storytelling remains aligned with current information.

The GSEL can interoperate with multiple components of this architecture. For example, it may draw inputs from the Semantic Workflow Translator 1500 to understand user intent, from the Predictive Guided Page Synthesis 1900 to anticipate narrative needs, and from the Self-Training Digger Agents 1700 to incorporate learned explanatory structures. Integration across these modules 2900 allows the storytelling layer to operate as both a communication mechanism and an entropy amplifier—each new narrative not only informs but also increases conceptual diversity within the analytic ecosystem.

From an implementation perspective, the GSEL may be deployed as a cloud-based microservice or as an embedded component of the guided-navigation interface. The narrative-generation engine 2902 and contextual interpretation module 2904 may operate asynchronously0, allowing background story construction while users continue interacting with analytics pages. Generated narratives are stored in structured formats with embedded provenance links 2910, facilitating re-rendering across multiple output channels (web, mobile, voice assistant, or report export).

Figure 30:
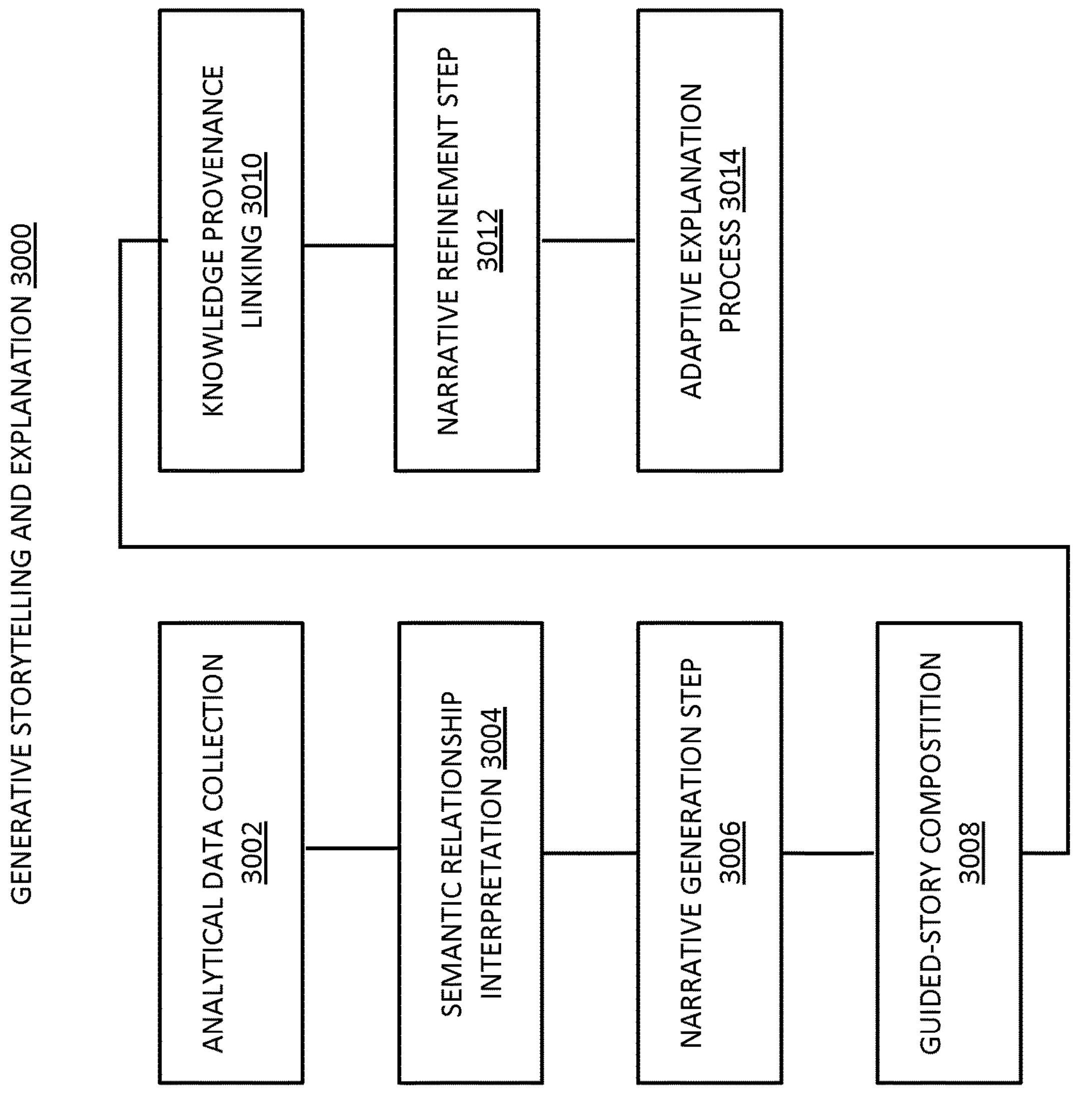
FIG. 30 depicts a flow diagram of generative storytelling and explanation.

A corresponding method embodiment depicted in FIG. 30 involves collecting analytic outputs 3002, identifying key semantic relations 3004, generating natural-language narratives 3006, composing guided-story presentations 3008, linking statements to data lineage 3010, and refining generation parameters via feedback 3012. Optionally, the method includes personalized adaptation based on user roles and real-time multimodal rendering.

Through these embodiments, the Generative Storytelling and Explanation Layer transforms static analytic results into interpretable, human-centric narratives. It provides continuity between machine reasoning and human understanding, turning complex, high-dimensional analytics into explainable stories. By embedding narrative generation into the Guided Page Navigation system, this disclosure converts analytic discovery into communicable knowledge, thereby extending informational entropy from data to meaning and establishing a self-explanatory intelligence layer within this data centric ecosystem.

Figure 31:
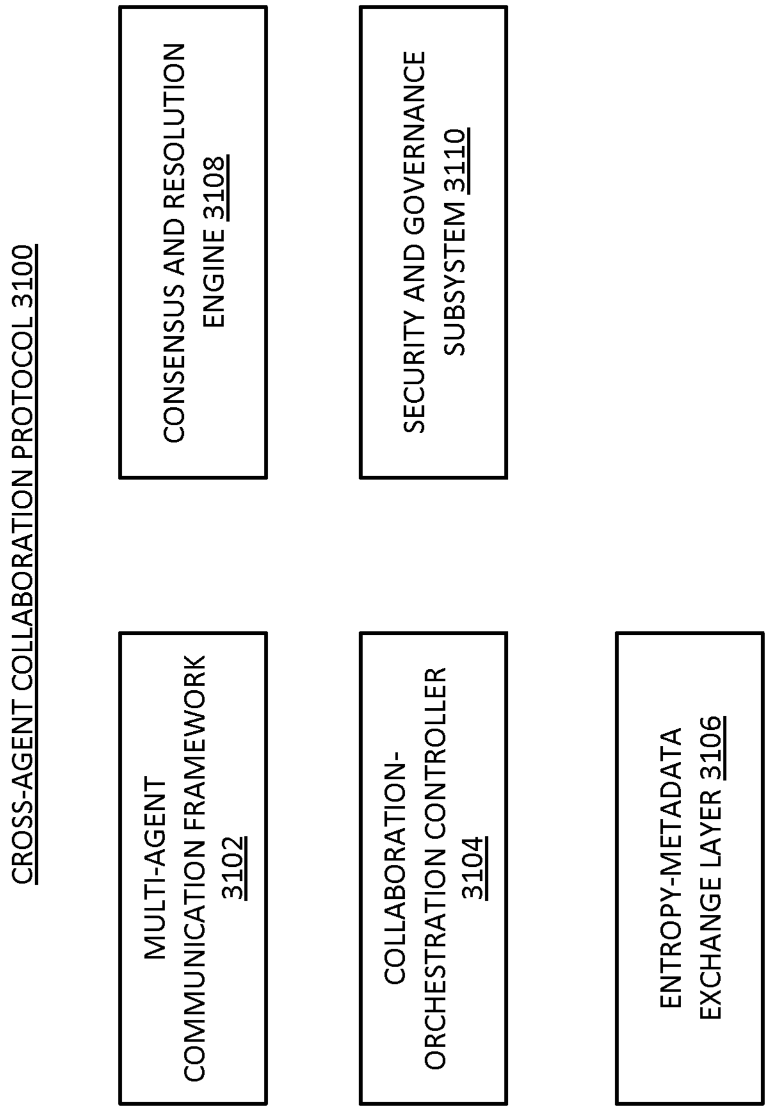
FIG. 31 depicts a block diagram of cross-agent collaboration protocols.

Referring to FIG. 31, the following detailed description pertains to embodiments of a Cross-Agent Collaboration Protocol (CACP) 3100 that enables distributed analytic agents within the Guided Page Navigation and agentic AI 1104 ecosystem to exchange intelligence, negotiate decisions, and cooperate in generating high-entropy analytical outcomes. This protocol defines the communication, governance, and learning mechanisms that allow heterogeneous agent types—such as navigation, KPI-generation, forecasting, storytelling, and cache-management agents—to function collectively as a coherent, self-optimizing analytic organism.

In embodiments, the system comprises a multi-agent communication framework 3102 that provides the messaging substrate for agent collaboration. The framework 3102 may use publish-subscribe messaging, gRPC, or event-stream architectures, enabling asynchronous communication among autonomous modules. Each agent registers with a collaboration-orchestration controller 3104, which maintains a directory of active agents, their domains, capabilities, and status indicators. The controller 3104 manages session scheduling, message routing, and communication bandwidth according to entropy-based priority metrics6.

An entropy-metadata exchange layer 3106 forms the analytical backbone of collaboration. Each agent periodically transmits metadata describing its internal entropy state, including measures of model uncertainty, novelty of discovered relationships, or diversity of generated outputs. These metadata packets 3106 are standardized through a shared schema so that agents with different architectures can interoperate. The layer 3106 aggregates these inputs to compute a global entropy index reflecting overall informational diversity across the analytic ecosystem. Agents may use this index as feedback to adjust their own exploration intensity or data-collection strategies.

The system further includes a consensus and resolution engine 3108 responsible for reconciling differing recommendations or forecasts generated by agents. When multiple agents produce competing interpretations—for example, one forecasting an upward trend while another predicts decline—the consensus engine 3108 applies decision-fusion algorithms such as weighted averaging, Bayesian inference, or fuzzy-logic reasoning to reach a unified analytic conclusion. Weighting factors may depend on agent trust ratings, domain relevance, and recent performance accuracy.

A meta-learning agent supervises the collaborative process by analyzing historical collaboration sessions. This agent learns which communication patterns yield higher entropy growth or analytic value and dynamically adjusts inter-agent communication weights, message frequencies, or trust parameters. Through meta-learning, the system evolves toward optimal communication topology and collaboration efficiency.

Security and understandability may be ensured by a governance subsystem 3110. All collaboration events may be recorded in a cryptographically signed ledger 3110 that captures message content summaries, entropy metrics, and participating agents. These logs support audit, reproducibility, and compliance with enterprise governance policies. The subsystem 3110 also generates explainable-AI (XAI) reports detailing how collective decisions were formed and which agent contributions influenced the outcome.

During operation, a typical collaboration cycle proceeds as follows. Agents submit entropy metadata and analytic proposals to the communication framework 3102. The controller 3104 aggregates and broadcasts summaries. Agents receive peer updates, adjust their models, and optionally form coalitions for joint tasks such as multi-domain forecasting or cross-dimensional KPI synthesis. The consensus engine 3108 synthesizes a collective result, which may trigger guided-page updates, new KPI creation, or narrative generation through the Generative Storytelling and Explanation Layer 2900. Feedback on the quality and entropy of results propagates back through the entropy-exchange layer 3106, reinforcing successful collaboration patterns.

Alternative embodiments vary the communication topology. Some systems employ hierarchical collaboration, where lower-tier agents communicate within domains while upper-tier "supervisor" agents consolidate results. Others use peer-to-peer federated structures, distributing consensus formation and entropy aggregation across nodes to eliminate single points of failure. In large-scale enterprise deployments, the CACP 3100 may operate across organizations, allowing federated analytic collaboration while maintaining privacy through encryption and differential-privacy protocols.

Figure 32:
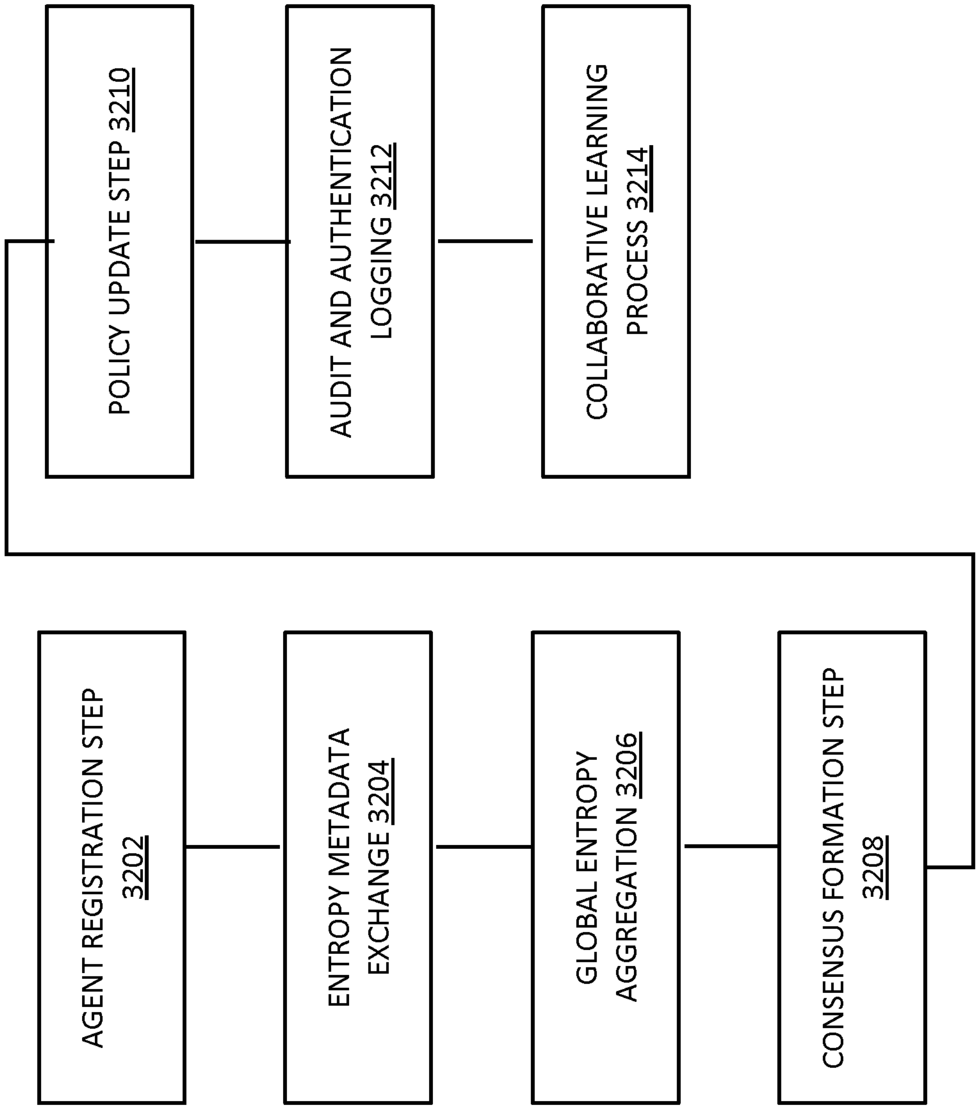
FIG. 32 depicts a flow diagram of cross-agent collaboration protocols.

A corresponding method embodiment depicted in FIG. 32 encompasses registering agents 3202, exchanging entropy metadata 3204, computing global indices 3206, performing consensus formation 3208, updating policies 3210, and maintaining audit logs 3212. Optional steps include dynamic weighting of agents, suppression of redundant communications, and issuance of collaborative performance reports. Over successive iterations, the protocol evolves a stable, self-governing ecosystem of cooperating analytic agents 3214 whose collective behavior increases overall informational entropy and decision accuracy.

Through these embodiments, the Cross-Agent Collaboration Protocol establishes the connective fabric that unites all agentic components of this technology family. It enables autonomous agents to reason cooperatively, share discovery signals, and align actions toward entropy maximization. The result may be a distributed analytic intelligence network—adaptive, transparent, and self-optimizing—that continuously expands the scope and depth of discoverable knowledge within the Guided Page Navigation framework.

Figure 33:
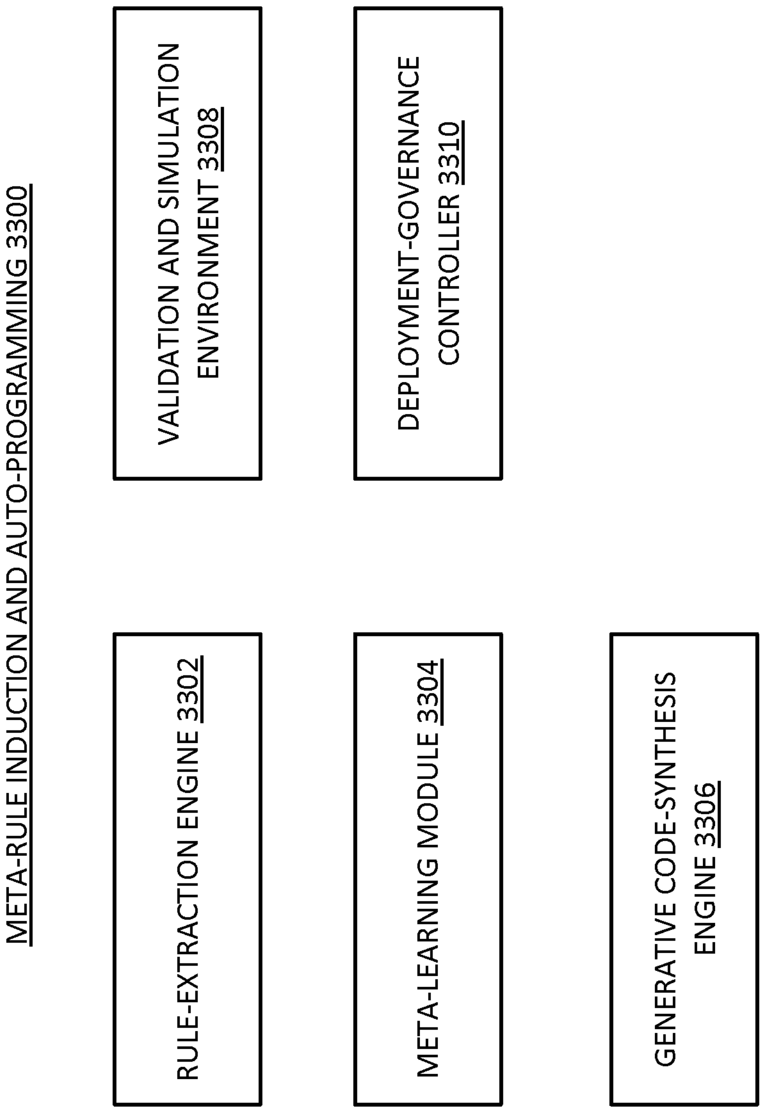
FIG. 33 depicts a block diagram of meta-rule induction and auto-programming.

Referring to FIG. 33, the following detailed description pertains to embodiments of a Meta-Rule Induction and Auto-Programming (MRIAP) subsystem 3300, which enables the Guided Page Navigation framework to autonomously generate and refine its own operational logic. The MRIAP subsystem forms the final layer of the agentic intelligence hierarchy, closing the loop between learning, reasoning, and code evolution.

In embodiments, the system includes a rule-extraction engine 3302 that continuously monitors logs, analytics outcomes, and inter-agent communications. These logs capture navigation sequences, entropy metrics, query outcomes, and user-feedback events. Using sequence-mining, pattern-recognition, and causal-inference algorithms, the engine 3302 identifies recurring patterns—such as consistent navigation optimizations or frequent corrective user actions—that indicate potential opportunities for system improvement. Each discovered pattern may be encoded as a candidate rule hypothesis.

The extracted rule candidates may be passed to a meta-learning module 3304, which evaluates their generality and relevance. The module 3304 employs reinforcement learning, evolutionary computation, or meta-gradient optimization to test whether a rule improves overall performance or entropy growth. Rules demonstrating consistent benefit across domains and contexts may be formalized into higher-order representations—meta-rules—that govern how lower-level agents behave or interact. For example, a meta-rule may specify that "navigation paths yielding a 20% increase in entropy gain should be preserved as reusable templates."

A generative code-synthesis engine 3306 translates validated meta-rules into executable forms. The engine 3306 may leverage large-language-model technology or domain-specific generative coders trained on historical scripts and workflow definitions. The synthesis process produces configuration files, analytic functions, or executable logic in appropriate scripting or configuration languages. Each generated artifact may be annotated with provenance information referencing the source data and model context from which it was derived.

Before deployment, all generated code may be processed within a validation and simulation environment 3308. This sandboxed environment executes new rules against historical or synthetic datasets to assess correctness, performance, and entropy contribution. The environment 3308 ensures that emergent logic does not degrade system stability or violate compliance constraints. Metrics such as navigation efficiency, resource utilization, and entropy-gain per cycle may be monitored and compared to baseline conditions.

Upon successful validation, a deployment-governance controller 3310 manages the controlled release of new rules into production. The controller 3310 performs versioning, dependency resolution, and rollback management to maintain operational safety. Each deployed rule may be logged with complete lineage metadata—including originating agents, validation metrics, and governance approvals—stored within an audit framework. In distributed environments, deployment may occur incrementally across nodes, with feedback on performance collected for further refinement.

The MRIAP subsystem may operate continuously or periodically under control of a self-optimization scheduler. This scheduler monitors system drift—defined as decreasing entropy gain or declining analytic efficiency—and triggers meta-rule induction cycles when optimization potential is detected. As such, the system behaves as a continuously self-improving organism, autonomously authoring the next iteration of its analytic logic.

Alternative embodiments incorporate varying approaches to meta-rule generation. In one variant, the system uses symbolic regression to derive interpretable mathematical relationships representing discovered optimization rules. Another employs neuro-symbolic architectures, combining neural-network pattern recognition with symbolic rule synthesis to balance creativity and constraint. Further versions support human-in-the-loop validation, allowing domain experts to review, annotate, or veto induced rules before deployment.

In a practical scenario, the system might observe that guided-page sequences achieving higher user engagement tend to include cross-domain transitions. The MRIAP engine 3300 induces a meta-rule instructing navigation agents to preferentially explore cross-domain linkages in similar contexts. The code-synthesis engine 3306 implements this rule as an update to the navigation algorithm and deploys it automatically after successful simulation testing. Subsequent analytics sessions benefit from improved discovery diversity, confirming positive entropy gain and reinforcing the learned policy.

Figure 34:
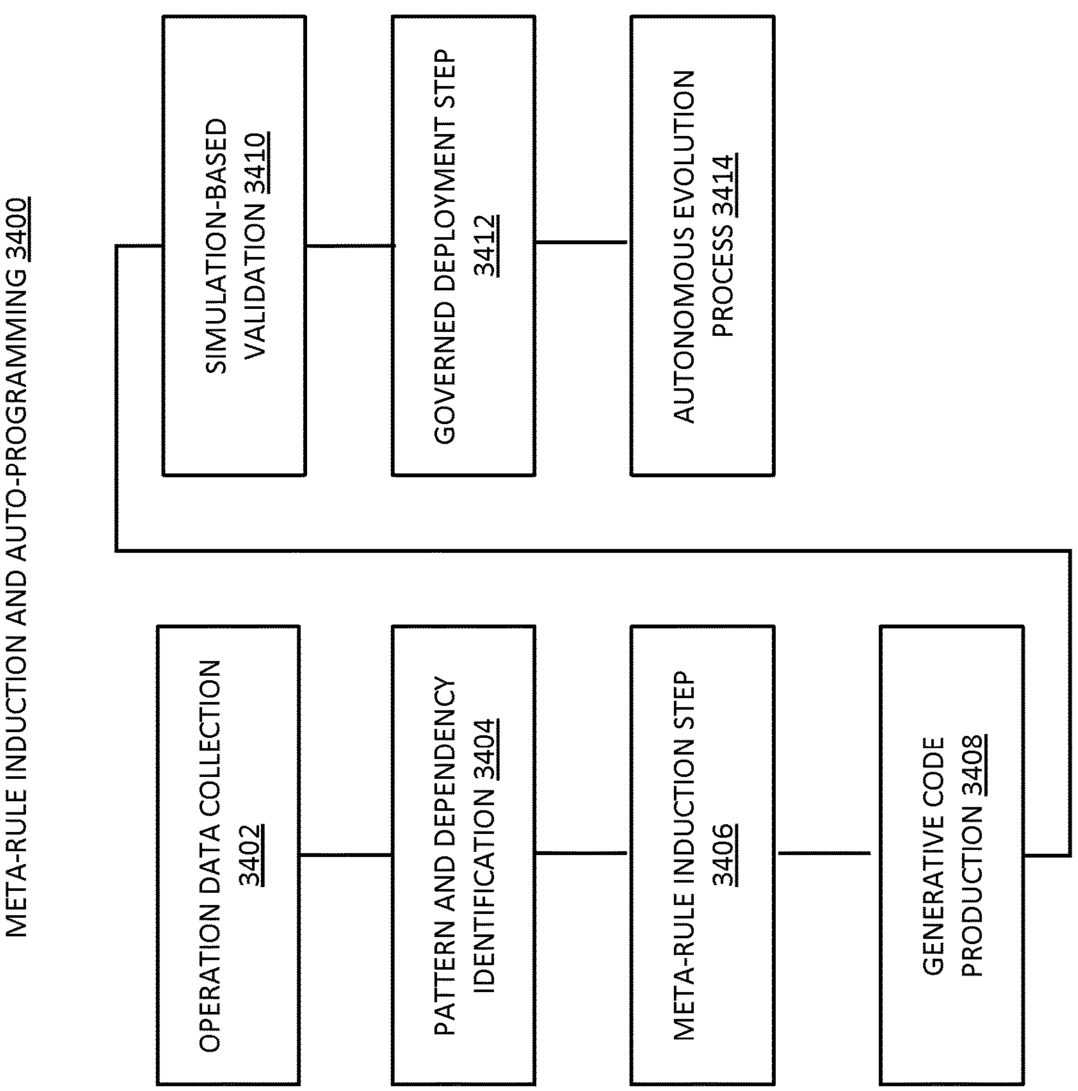
FIG. 34 depicts a flow diagram of meta-rule induction and auto-programming.

A corresponding method embodiment is depicted in FIG. 34 and comprises the steps of collecting operational logs 3402, identifying recurring patterns and dependencies thereof 3404, inducing generalized rules 3406, generating executable code 3408, validating outputs through simulation 3410, and deploying verified governance logic 3412. Optional steps include ranking rules by entropy-weighted utility, performing sandbox simulations, generating understandability documentation, and configuring this autonomous evolution process 3414. Each induction cycle enriches the system's operational repertoire, progressively transforming the GPN framework into a self-programming analytic platform.

Through these embodiments, the Meta-Rule Induction and Auto-Programming subsystem completes the evolution of a guided-analytics architecture into a fully agentic, self-governing intelligence. By autonomously learning from its own operations, codifying that learning into executable logic, and redeploying improved workflows, the system achieves continuous self-optimization. The result may be a living analytic ecosystem—capable not only of interpreting data but also of rewriting its own rules—thereby achieving maximal informational entropy and sustained inventive capability within this technology family.

In one illustrative use case, a healthcare-sector deployment of the guided-page navigation system integrates an entropic agentic-AI framework to autonomously expand analytic discovery pathways within a hospital-operations environment. This use case illustrates how the integration of guided-page navigation with agentic, generative, and entropy-based learning systems provides a continuously self-improving analytic framework.

A healthcare administrator interacts with the system to review operational performance through an initial sequence of guided analytical pages associated with hospital readmission rates, physician performance metrics, and patient-demographic distributions. The navigation preferences, investigative sequences, and dwell-time patterns expressed by the administrator constitute interaction signals that are monitored by an agentic artificial-intelligence module in accordance with the learning mechanisms described herein. These signals are interpreted as workflow context and as indicators of domain intent and are stored within a short-term and long-term learning memory for use in subsequent navigation optimization cycles.

A reinforcement-learning engine coupled to the navigation map assigns an information-entropy gain score to each navigation transition made during the administrator's exploratory sequence. For example, transitions from readmission-rate pages to physician-performance views yield positive entropy scores because they expand dimensional diversity and expose multi-factor causal structures across distinct healthcare domains. Transitions from physician-performance metrics to demographic distributions similarly increase informational diversity by integrating clinical outcome data with population-specific characteristics. The reinforcement-learning engine updates the graph-based navigation map accordingly, increasing the weights of edges corresponding to transitions that historically yield high contextual discovery value.

Concurrently, a domain-leaping generative-AI module analyzes the columnar-database relationships underlying readmission records, physician activity logs, population health descriptors, and visit history tables. Through generative synthesis, the module identifies latent correlations—for example, specific demographic groups exhibiting disproportionate readmission deltas across particular specialties—representing a cross-domain relationship that is not explicitly modeled in the underlying schema. Based on these emergent relationships, the system autonomously proposes a new intermediate analytic context, which the page-generation engine instantiates as a guided page titled "Patient Flow Efficiency." The newly generated guided page aggregates readmission variability, physician scheduling performance, patient-demographic correlations, and temporal flow patterns into a unified analytic construct.

A KPI-generation AI module then evaluates the dimensional structures associated with the newly synthesized guided page and automatically constructs a derived metric representing an average readmission-rate delta per demographic segment. The module uses generative-model embeddings, semantic metadata, and column-lineage information to synthesize a formula that normalizes readmission changes across age, diagnosis, socio-economic category, or comorbidity clusters. This derived KPI is stored within the KPI metadata layer for reuse across future workflows and becomes available within the hospital's analytic domain as a first-class metric.

The presentation-layer generative-AI module consumes the outputs of the navigation engine, KPI-generation module, and domain-leaping module to automatically generate a contextual narrative summarizing the analytic findings. The narrative may describe, for example, that "Patients aged 65-74 exhibited a statistically significant increase in readmission deltas for cardiology discharges during weeks with high physician-scheduling volatility," or that "Demographic group C shows improved flow-efficiency when routed to clinics with lower physician-transition counts." The narrative is provided through a guided-story page that includes visual dashboards, structural flow diagrams, and causal explanations linked to underlying data provenance.

The inventive concepts described herein may be adapted to a wide range of industries where the integration of agentic artificial-intelligence modules with guided-navigation architectures produces self-generating, entropy-expanding analytical pathways that autonomously reveal relationships, metrics, and insights not explicitly modeled in underlying datasets. In a financial-services environment, the agentic system may observe analyst transitions across credit behavior, market exposure, and fraud-signal indicators and apply entropy-maximizing reasoning to autonomously synthesize guided pages showing emergent risk clusters, generatively derived KPIs, and narrative explanations highlighting latent causal drivers. In a logistics and supply-chain domain, the agentic AI may track user exploration patterns among shipment delays, inventory imbalances, and vendor performance and, through information-entropy optimization, generate new cross-domain workflow pages that expose hidden fulfillment bottlenecks or systemic inefficiencies while proposing novel flow-efficiency metrics. In a retail analytics context, the agentic system may identify entropically rich relationships among promotional timing, customer-segment behavior, and product performance, automatically generating guided pages that reveal emerging demand-shift phenomena and generatively constructing KPIs capturing unexpected cross-category correlations. In an energy-grid or utilities environment, the agentic AI may detect high-entropy transitions among outage events, weather patterns, asset-failure signatures, and consumption variability, thereby producing autonomous predictive-maintenance guided pages and newly inferred reliability metrics derived from generative dimensional synthesis. In a manufacturing domain, the agentic system may follow analytic paths spanning machine telemetry, operator behavior, quality deviations, and production throughput, and through reinforcement-driven entropy maximization may generate guided pages exposing non-obvious causal chains or operational instabilities together with derived KPIs quantifying emergent sources of variation. In an insurance-analytics setting, the agentic AI may identify high-entropy patterns linking claimant behavior, geospatial trends, actuarial signals, and policy structure, autonomously synthesizing guided pages that surface novel fraud-propensity indicators or cross-segment risk gradients generated through model-driven dimensional abstraction. In a telecommunications environment, the agentic system may monitor analyst interaction flows across churn signals, network-performance metrics, customer-journey events, and device-usage profiles, and through entropy-weighted inference may create guided pages identifying latent churn precursors or network-load anomalies together with generative KPIs capturing cross-domain correlations. In a public-sector analytics context, the agentic AI may correlate navigation patterns among economic indicators, service-delivery metrics, demographic movements, and policy interventions and use information-entropy maximization to autonomously generate guided pages illuminating emergent societal patterns, cross-agency dependencies, or generatively inferred KPIs that quantify multi-factor policy outcomes.

What is claimed is:

1. A computer-implemented system for improving computational efficiency in adaptive guided page navigation, comprising:

a navigation map data structure stored in memory and implemented as a graph or adjacency matrix configured for low-latency access, the navigation map data structure representing a plurality of page nodes, each page node corresponding to an analytical context or data domain;

at least one agentic artificial intelligence module executed by one or more processors and configured to monitor user interactions, workflow sequences, and context signals associated with traversal of the navigation map data structure and to generate behavioral and contextual feature vectors for navigation map updates;

a reinforcement-learning engine coupled to the navigation map data structure and configured to calculate an information-entropy gain value for each potential navigation transition;

modification logic configured to update one or more edge weights or paths in the navigation map data structure through selective, local updates based on the information-entropy gain value and contextual information; and a page-generation engine configured to prerender or cache guided-navigation sequences for presentation to a user interface using predictions derived from the updated navigation map data structure, wherein the system reduces navigation-update latency and improves guided-page rendering performance during autonomous evolution of the navigation map data structure.

2. The system of claim 1, wherein:

the navigation map data structure comprises a graph-based model defining the plurality of page nodes and a plurality of edges interconnecting the page nodes, each edge comprising one or more transition parameters indicative of relevance, contextual association, or confidence weight;

the navigation map data structure is persisted in the memory or a columnar database using a compressed or sparse-matrix format to reduce access overhead; and the system comprises logic configured to instantiate, serialize, or replicate the navigation map data structure across distributed computing instances to enable synchronized evolution among analytic devices.

3. The system of claim 1, wherein:

the at least one agentic artificial intelligence module is configured to monitor user interactions and workflow context during traversal of guided pages and to generate behavioral and contextual models indicative of user intent;

the at least one agentic artificial intelligence module comprises a plurality of cooperating sub-agents including a context agent, a behavior-tracking agent, and a domain-correlation agent; and the at least one agentic artificial intelligence module maintains a short-term learning memory capturing recent interaction sequences and a long-term learning memory maintaining aggregated behavioral patterns across sessions.

4. The system of claim 1, wherein:

the reinforcement-learning engine calculates the information-entropy gain value or an equivalent discovery-potential measure for one or more navigation transitions;

the reinforcement-learning engine employs a reinforcement-learning architecture selected from deep Q-learning, actor-critic learning, Bayesian reinforcement learning, or hybrid statistical-heuristic learning; and the reinforcement-learning engine computes reward signals derived from data diversity, novelty, user satisfaction, or predictive improvement and uses the reward signals to update the navigation map data structure in real time.

5. The system of claim 1, wherein:

the modification logic increases, decreases, creates, or removes edges within the navigation map data structure based on the calculated information-entropy gain value;

the modification logic operates in a continuous, event-driven, or periodic optimization mode;

the modification logic employs probabilistic or Bayesian routing techniques to maintain adaptive transition probabilities among the page nodes; and the modification logic generates latent or virtual nodes representing predicted analytical states or future navigation outcomes.

6. The system of claim 1, wherein:

the page-generation engine generates or renders guided pages in accordance with the navigation map data structure and surfaces updated guided-navigation sequences to the user interface;

the page-generation engine employs template-driven, rule-based, or generative artificial intelligence methods to assemble guided pages using domain data, metadata definitions, and key-performance-indicator relationships; and the page-generation engine performs predictive or anticipatory rendering of pages expected to be accessed next based on learned user behavior or system context.

7. The system of claim 1, wherein the navigation map data structure, the at least one agentic artificial intelligence module, the reinforcement-learning engine, the modification logic, and the page-generation engine collectively operate as an information-entropy-adaptive analytic network configured to evolve autonomously in response to user interaction data.

8. The system of claim 1, wherein the reinforcement-learning engine employs GPU tensor cores, vectorized SIMD instructions, or parallel-matrix-computation hardware to accelerate entropy-gain calculation.

9. The system of claim 1, wherein the navigation map data structure is stored in a cache-aware hierarchical memory arrangement that reduces traversal latency.

10. The system of claim 1, wherein selective in-place updates to the navigation map data structure reduce navigation-update computation time by at least a threshold percentage relative to a full-map recalculation baseline.

11. The system of claim 1, wherein the page-generation engine employs predictive caching that stores prerendered fragments of guided pages to reduce user-interface latency upon navigation.

12. A computer-implemented method for improving computational efficiency in adaptive guided page navigation, comprising:

receiving data indicative of user interactions with a plurality of guided analytical pages;

maintaining a navigation map data structure stored in memory and implemented as a graph or adjacency matrix optimized for low-latency traversal;

calculating, by a learning engine executing on a hardware processor, an information-entropy gain value for one or more navigation transitions between page nodes;

updating one or more edge weights or navigation paths within the navigation map data structure using selective local modification based on the calculated information-entropy gain value; and generating and presenting, by a page-generation engine, an updated guided-navigation sequence using prerendering or predictive caching to reduce response latency.

13. The method of claim 12, further comprising:

defining the navigation map data structure as a graph-based model in which each page node stores metadata identifying a domain, workflow state, or data context, and each edge stores transition parameters indicating confidence or relevance; and serializing the navigation map data structure in memory or a columnar database.

14. The method of claim 12, further comprising:

monitoring user behavior and workflow context during traversal of guided pages, including recording navigation selections, dwell times, and query activity;

generating a context profile representing user intent; and maintaining short-term and long-term learning memories to guide subsequent navigation recommendations.

15. The method of claim 12, further comprising:

applying a reinforcement-learning algorithm to associate reward signals with navigation transitions based on the calculated information-entropy gain value, data diversity metrics, or user satisfaction metrics;

employing a reinforcement-learning algorithm selected from deep Q-learning, actor-critic learning, Bayesian reinforcement learning, or a hybrid model; and updating navigation policies to maximize cumulative entropy over time.

16. The method of claim 12, further comprising:

modifying one or more edge weights or creating, removing, or re-routing edges within the navigation map data structure in accordance with the information-entropy gain value;

executing continuous, periodic, or event-driven updates;

employing probabilistic or Bayesian routing updates; and generating latent or virtual nodes representing predicted analytical states.

17. The method of claim 12, further comprising:

generating guided pages in accordance with the updated navigation map data structure and surfacing revised guided-navigation sequences to a user interface;

employing template-based, rule-based, or generative artificial-intelligence techniques to assemble page content; and anticipating user actions and prerendering pages likely to be accessed next.

18. The method of claim 12, wherein one or more of the receiving, maintaining, calculating, updating, and generating steps are performed iteratively such that the navigation map data structure and generated guided pages co-evolve over time.

19. The method of claim 12, wherein calculating the information-entropy gain value comprises executing parallelized numerical operations using GPU-based tensor accelerators.

20. The method of claim 12, wherein updating the navigation map data structure includes selectively invalidating only adjacency entries impacted by updated behavioral or contextual feature vectors.

21. The method of claim 12, wherein generating the guided-navigation sequence includes storing prerendered fragments of pages in a predictive cache to reduce interface latency.

* * * * *